(12) United States Patent
Pollak et al.

(10) Patent No.: US 11,995,709 B2
(45) Date of Patent: *May 28, 2024

(54) COMPUTER SYSTEM AND GRAPHICAL USER INTERFACE FOR DETERMINING DIAMOND AND RING ATTRIBUTES USING A PREDICTIVE COMPUTER MODEL

(71) Applicant: ENGAGE JEWELER, LLC, Denver, CO (US)

(72) Inventors: Michael Pollak, Denver, CO (US); Artur Kiulian, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,593

(22) Filed: Aug. 16, 2022

(65) Prior Publication Data

US 2023/0177584 A1  Jun. 8, 2023

Related U.S. Application Data

(63) Continuation of application No. 16/596,645, filed on Oct. 8, 2019, now Pat. No. 11,430,052, which is a
(Continued)

(51) Int. Cl.
*G06Q 30/06* (2023.01)
*G06F 16/538* (2019.01)
(Continued)

(52) U.S. Cl.
CPC ....... *G06Q 30/0643* (2013.01); *G06F 16/538* (2019.01); *G06F 16/908* (2019.01);
(Continued)

(58) Field of Classification Search
CPC .......... G06Q 30/0643; G06Q 30/0627; G06Q 30/0631; G06Q 30/0629
(Continued)

(56) References Cited

U.S. PATENT DOCUMENTS

| 5,774,121 A | 6/1998 | Stiegler |
| 7,805,339 B2 | 9/2010 | Ashkenazi |

(Continued)

FOREIGN PATENT DOCUMENTS

| CN | 101344949 | | 1/2009 | |
| EP | 1795888 A1 | * | 6/2007 | ............. G01N 21/87 |

(Continued)

OTHER PUBLICATIONS

Mamonov, Stanislav; Triantoro, Tamilla., "Subjectivity of Diamond Prices in Online Retail: Insights from a Data Mining Study"; publication Journal of Theoretical and Applied Electronic Commerce Research 13.2: 15-28. MDPI AG. (May 2018); retrieved from Dialog Jul. 28, 2023 (Year: 2018).*

(Continued)

*Primary Examiner* — Yogesh C Garg
(74) *Attorney, Agent, or Firm* — Brownstein Hyatt Farber Schreck, LLP

(57) ABSTRACT

Ring attributes may be predicted using a predictive model. A diamond selection system determines predicted ring attributes by obtaining and analyzing data related to a recipient, such as social media activity. The diamond selection system may determine search parameters based on predicted ring attributes and present a curated selection or list of candidate stones and/or settings that match the determined search parameters, for example, in a user interface of a mobile electronic device.

6 Claims, 46 Drawing Sheets

Related U.S. Application Data continuation-in-part of application No. 15/949,914, filed on Apr. 10, 2018, now Pat. No. 11,544,757.

(60) Provisional application No. 62/860,494, filed on Jun. 12, 2019, provisional application No. 62/743,846, filed on Oct. 10, 2018, provisional application No. 62/559,219, filed on Sep. 15, 2017, provisional application No. 62/484,120, filed on Apr. 11, 2017.

(51) Int. Cl.
*G06F 16/908* (2019.01)
*G06Q 30/0601* (2023.01)
*G06V 10/764* (2022.01)
*G06V 10/774* (2022.01)
*G06F 18/214* (2023.01)
*G06V 20/10* (2022.01)

(52) U.S. Cl.
CPC ..... *G06Q 30/0621* (2013.01); *G06Q 30/0627* (2013.01); *G06Q 30/0629* (2013.01); *G06Q 30/0631* (2013.01); *G06V 10/764* (2022.01); *G06V 10/774* (2022.01); *G06F 18/214* (2023.01); *G06V 20/10* (2022.01)

(58) Field of Classification Search
USPC .......................................... 705/27.1; 382/224
See application file for complete search history.

(56) References Cited

U.S. PATENT DOCUMENTS

| | | | |
|---|---|---|---|
| 10,204,152 B2 | 2/2019 | Kataria | |
| 10,290,062 B2 | 5/2019 | Arhin | |
| 10,417,686 B2 | 9/2019 | Watkins | |
| 10,475,099 B1 | 11/2019 | Nomula | |
| 10,796,321 B1 | 10/2020 | Balakrishnan | |
| 10,902,659 B2 | 1/2021 | Presley | |
| 2005/0149369 A1 | 7/2005 | Sevdermish | |
| 2009/0234754 A1* | 9/2009 | Lapa | G06Q 30/0278 705/26.1 |
| 2011/0134221 A1* | 6/2011 | Lee | G06T 7/593 348/46 |
| 2014/0052563 A1 | 2/2014 | Watkins | |
| 2016/0063547 A1 | 3/2016 | Ghosh | |
| 2018/0268458 A1 | 9/2018 | Popa et al. | |

FOREIGN PATENT DOCUMENTS

| | | | | |
|---|---|---|---|---|
| EP | 2336948 A1 * | 6/2011 | ........... | G06K 9/6255 |
| WO | WO2014124083 | 8/2014 | | |

OTHER PUBLICATIONS

Mondera.com brings over a century of jewelry experience to the web (Aug. 10, 1999) PR Newswire Retrieved from Dialog on Jan. 7, 2022.

Shijia, O., "E-shopping in the age of online celebrity," published on Dec. 11, 2017, China Daily, Hong Kong ed., Aberdeen China, retrieved from Dialog databased on Mar. 16, 2022.

Xiwang Yang et al., "A survey of collaborative filtering based social recommender systems," Jul. 22, 2013, Computer Communications (Year: 2013).

International Search Report and Written Opinion, PCT/US2018/026931, filed Apr. 10, 2018, 11 pages.

International Search Report and Written Opinion, PCT/US2019/055388, filed Oct. 9, 2019, 11 pages.

* cited by examiner

| compare | shape | cut | color | clarity | carat | price | favorite |
|---|---|---|---|---|---|---|---|
| ☐ | ◯ ROUND | ID | D | FL | 0.9 | $6,345 | ♡ |
| ☐ | ◯ ROUND | ID | D | FL | 0.9 | $6,425 | ♡ |
| ☐ | ◯ ROUND | ID | D | FL | 0.9 | $6,470 | ♡ |
| ☐ | ◯ ROUND | ID | D | FL | 0.95 | $6,525 | ♡ |
| ☑ | ◯ ROUND | ID | D | FL | 0.95 | $6,582 | ♡ |
| ☐ | ◯ ROUND | ID | D | FL | 0.95 | $6,599 | ♡ |
| ☐ | ◯ ROUND | ID | D | FL | 1.0 | $6,611 | ♡ |
| ☐ | ◯ ROUND | ID | D | FL | 1.0 | $6,667 | ♡ |
| ☐ | ◯ ROUND | ID | D | FL | 1.05 | $6,679 | ♡ |
| ☐ | ◯ ROUND | ID | D | FL | 1.05 | $6,735 | ♡ |
| ☐ | ◯ ROUND | ID | D | FL | 1.07 | $6,799 | ♡ |
| ☐ | ◯ ROUND | ID | D | FL | 1.08 | $6,815 | ♡ |
| ☐ | ◯ ROUND | ID | D | FL | 1.08 | $6,850 | ♡ |
| ☐ | ◯ ROUND | ID | D | FL | 1.1 | $6,874 | ♡ |
| ☐ | ◯ ROUND | ID | D | FL | 1.1 | $6,885 | ♡ |
| ☐ | ◯ ROUND | ID | D | FL | 1.1 | $6,917 | ♡ |
| ☐ | ◯ ROUND | ID | D | FL | 1.1 | $6,924 | ♡ |

10,230 diamond result(s)

SUBMIT  RESET SEARCH

FIG. 24

COMPUTER SYSTEM AND GRAPHICAL USER INTERFACE FOR DETERMINING DIAMOND AND RING ATTRIBUTES USING A PREDICTIVE COMPUTER MODEL

CROSS-REFERENCE TO RELATED APPLICATIONS

This application is a continuation patent application of U.S. patent application Ser. No. 16/596,645, filed Oct. 8, 2019, and titled "Computer System and Graphical User Interface for Determining Diamond and Ring Attributes Using a Predictive Computer Model," which claims the benefit of U.S. Provisional Patent Application No. 62/743,846, filed Oct. 10, 2018, and titled "Computer System and Graphical User Interface for Determining Diamond and Ring Attributes Using a Predictive Computer Model," and U.S. Provisional Patent Application No. 62/860,494, filed Jun. 12, 2019, and titled "Computer System and Graphical User Interface for Determining Diamond and Ring Attributes Using a Predictive Computer Model," and this application is a continuation-in-part application of U.S. patent application Ser. No. 15/949,914, filed Apr. 10, 2018, and titled "System and Graphical Interface for Diamond Selection," which claims the benefit of U.S. Provisional Patent Application No. 62/484,120, filed Apr. 11, 2017, and titled "System and Graphical Interface for Diamond Selection," and U.S. Provisional Patent Application No. 62/559,219, filed Sep. 15, 2017, and titled "System and Graphical Interface for Diamond Selection," the disclosures of which are hereby incorporated herein by reference in their entirety.

FIELD

The described embodiments relate generally to systems and graphical interfaces for predicting customer preferences. More particularly, the present embodiments relate to a system and graphical interface for determining predicted ring attributes for a recipient of a stone and/or a setting.

BACKGROUND

Purchasers of stones, such as diamonds, or settings, often find that there are many options for types and styles of diamonds and settings. Often, an early step in the purchasing process is determining which types and styles to consider in more detail. Traditionally, users purchasing stones and/or settings for themselves or other users may be required to guess their own preferences or the preferences of a recipient. The need to provide preferences as part of a purchasing process presents a challenge to customers desiring to simplify the diamond or setting selection process.

SUMMARY

A diamond selection system is provided for determining predicted ring attributes and presenting diamonds and/or settings that are available for sale to a user of the search system. The diamond selection system may analyze user data, such as social media data, to predict ring attributes. The diamond selection system includes a graphical interface through which the user may input search parameters corresponding to gemological features. The graphical interface may be capable of searching a database of diamond listings for any listings which match or are within a range of matching the search parameters.

In an example embodiment, a method for automatically determining search parameters for a diamond selection system having an interactive search interface includes displaying, on a personal mobile device, a user interface for selecting a diamond. The method further includes receiving, via the user interface, a username for an account of a user of a social media network. The account is associated with an image set accessible using the username. The method further includes determining a set of user classification labels by analyzing images in the image set. The method further includes obtaining a group of training data sets. Each training data set in the group of training data sets corresponds to a social media account and includes a set of classification labels that matches the set of user classification labels and a set of ring attributes. The set of classification labels and the set of ring attributes are determined by analyzing data from the social media account. The method further includes determining a set of predicted ring attributes for the user based on the set of ring attributes for one or more training data sets of the group of training data sets. The method further includes determining search parameters for the interactive search interface based on the set of predicted ring attributes. The method further includes displaying a diamond listing based on the search parameters.

In another example embodiment, a method for training and using a predictive model for determining search parameters for a diamond selection system includes obtaining training data from a social media network. The training data comprises training image sets. Each training image set is associated with an account on the social media network. The method further includes determining one or more groups of training image sets by analyzing similarities among the training image sets. For each group of the one or more groups, the method includes determining group ring attributes by analyzing images of the training image sets in the group. The method further includes obtaining user data from the social media network. The user data comprises a user image set associated with a user account of the user on the social media network. The method further includes determining a matching group of the one or more groups of training image sets by analyzing similarities between the user image set and the training image sets of the one or more groups of training image sets. The method further includes determining predicted ring attributes from the group ring attributes of the matching group. The method further includes determining, based on the predicted ring attributes, a set of diamond listings for presentation in a user interface of a personal mobile device. The method further includes displaying at least a portion of the set of diamond listings in the user interface of the personal mobile device.

In another example embodiment, a diamond selection system includes a database, a device operating an access portal, and an application server. The application server may be configured to generate a diamond selection interface for display using the access portal. The application server may receive, from the access portal, a username for an account of a user of a social media network. The account is associated with an image set accessible using the username. The application server may also be configured to obtain the image set from the social media network. The application server may determine a set of user classification labels by analyzing images in the image set. The application server may obtain group ring attributes from a group of training data sets having a set of classification labels that matches the set of user classification labels and determine predicted ring attributes based on the group ring attributes. The application server may also be configured to determine search parameters for the interactive search interface based on the predicted ring attributes and determine, based on the search parameters, a set of diamond listings for presentation in the diamond selection interface. The application server may also be configured to determine a presentation order of the set of diamond listings based on the search parameters and display at least a portion of the set of diamond listings in the diamond selection interface.

BRIEF DESCRIPTION OF THE DRAWINGS

The disclosure will be readily understood by the following detailed description in conjunction with the accompanying drawings, wherein like reference numerals designate like elements.

FIG. 24 depicts an example list of search results that may correspond to a search initiated using the user interface of FIG. 23.

Figure 1:
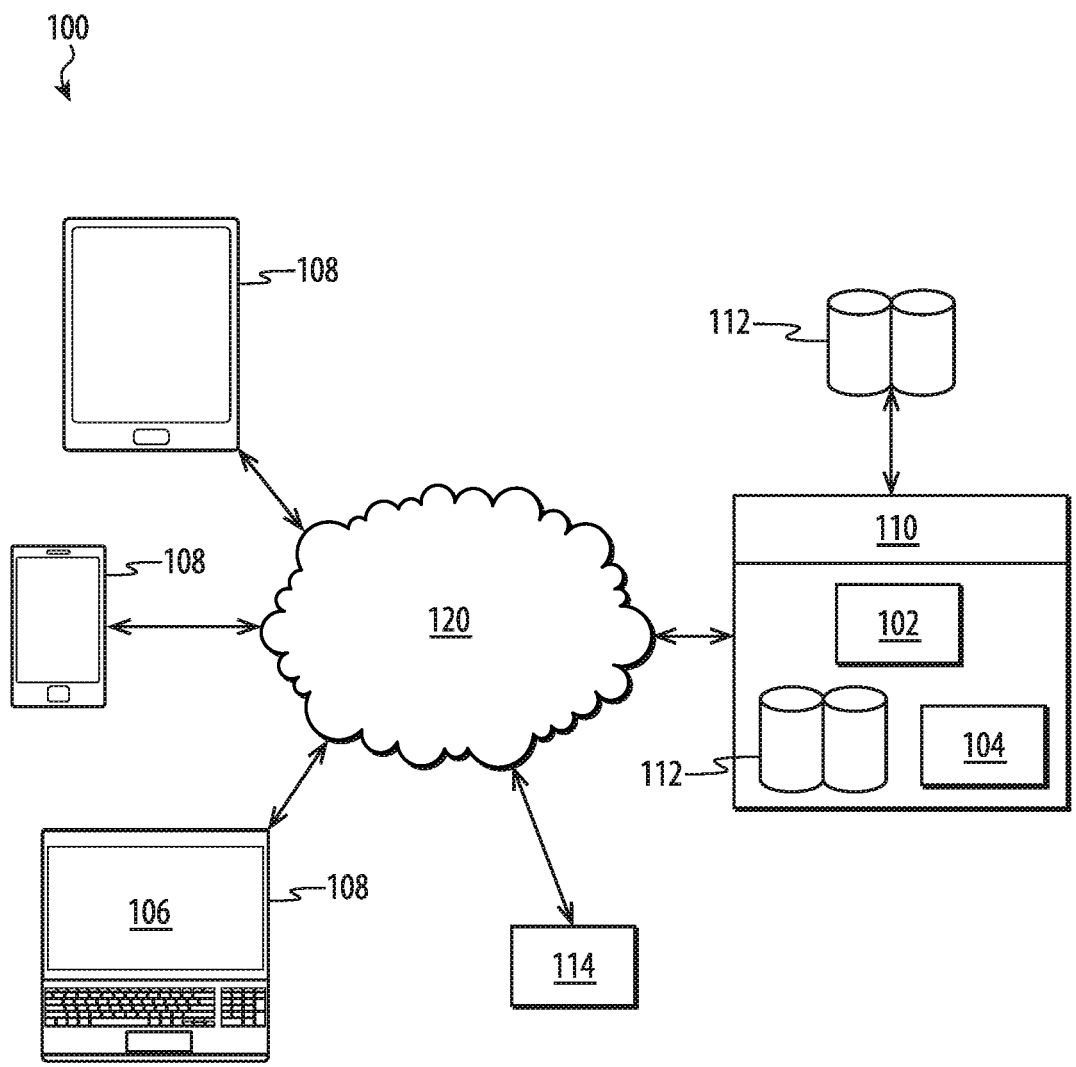
FIG. 1 depicts an example system for implementing the diamond selection system over a network.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Embodiments of the present disclosure are directed to a diamond selection system for determining predicted ring attributes (e.g., stone and/or setting attributes or preferences) and identifying and presenting stones (e.g., diamonds) and/or settings to a user through a graphical user interface. Diamond selection is a particularly challenging problem because each diamond is different having a unique set of features (e.g., shape, cut quality, color, clarity, weight) that may be graded along a scale or continuum. Similarly, setting selection is a challenging problem because there are many different possible combinations of style and materials. To compound the challenges discussed above, a purchasing user (e.g., a customer) may be shopping for a diamond and/or setting for another person (e.g., a recipient), such as a significant other. Purchasing users may not be familiar with the stone and/or setting preferences of recipients, so they may be left to guess the recipient's preferences. Traditional diamond and setting selection methods typically are not adapted to take all of these factors into consideration to present the best possible diamond and/or setting from a vast number of potential options.

The systems and techniques described herein may be used to determine predicted ring attributes using a predictive model. As used herein "ring attributes" may refer to qualities, features, and characteristics of a stone (e.g., a diamond), a setting, a ring (e.g., a diamond and a setting), or some combination thereof. Broadly, the diamond selection system determines predicted ring attributes by obtaining and analyzing data related to a recipient (e.g., recipient data). In various embodiments, recipient data may include social media data, demographic data (e.g., income, age, occupation, location), data regarding interests, data regarding buying capacity, birthdays, data regarding influencers, data regarding stage of life/relationship, and the like. As used herein, the terms "social media" or "social media network" may refer to any interactive computer network services or technologies that allow users to post or otherwise interact with content, such as posting images, text, classifiers (e.g., hashtags), videos, links, biographical data, and the like. The terms "social media activity" or "social media data" may refer to the content itself and/or users' interactions with content, including posting, commenting, liking, saving, adding to favorites, adding to a feed, album, or other collection of content, adding to a friend/follower group, or the like. Examples of social media networks are FACEBOOK, INSTAGRAM, PINTEREST, TWITTER, GOOGLE+, LINKEDIN, SNAPCHAT, TUMBLER, and the like. In various embodiments, users have user accounts associated with social media networks. The accounts may have associated content, activity, a username or other identifier, and/or biographical information, some of which is viewable via the social media network.

In some cases, predicted ring attributes are determined by analyzing a recipient's social media activity. For example, the system may use a trained machine learning model to classify a set of images posted to a customer's social media account to determine a set of user classification labels that correspond to qualities or attributes of the customer (e.g., dog lover, world traveler, outdoorsperson, fashion-focused). The system may use these classification labels to identify one or more matching or corresponding training groups of other sets of posts having similar post characteristics or classification labels (e.g., sets of posts or images that seem to indicate a similar lifestyle or interests). Ring attributes for each training group may be known and stored by the system, for example, as a result of training the machine learning or predictive model using training data. As a result, the predicted ring attributes for the customer can be determined based on the stored attributes for the assigned group(s). The predicted ring attributes can be used by the system in a variety of ways including, for example, determining search parameters to prepopulate a search interface and/or to present suggested rings and/or settings to the user.

Predicted ring attributes may be determined in a variety of ways in addition to the example above. For example, the system may use image processing tools (e.g., computer vision object recognition) to identify predicted ring attributes directly from images related to the customer's social media activity (e.g., images of stones and/or settings).

In some cases, the diamond selection system may determine prediction metrics as part of determining predicted ring attributes. Prediction metrics may indicate a measure of confidence or strength of a determination of whether a ring attribute is a predicted ring attribute. For example, prediction metrics may include a percentage, with 0% corresponding to a lowest level of prediction confidence for a ring attribute and 100% being a highest level of prediction confidence for a ring attribute. In some cases, a ring attribute may be selected as a predicted ring attribute if a prediction metric for the ring attribute exceeds a predetermined threshold. For example, ring attributes having greater than 5%, 15%, or 50% prediction confidence may be selected as predicted ring attributes. In some cases, predicted ring attributes may be displayed in a user interface, such as a portion of a search interface. Prediction metrics for predicted ring attributes may also be displayed in the user interface.

As discussed above, the diamond selection system may determine search parameters based on predicted ring attributes. As used herein, "search parameters" may refer to any search operator, query, string, character, or other function for use as an input in performing a search using the diamond selection system. In some cases, search parameters specify desired stone features and/or setting features. As used herein, "stone features" may refer to any feature or quality of a stone (e.g., a diamond), such as shape, quality of cut, color, clarity, and the weight of the stone and the like, and "setting features" may refer to any feature or quality of a setting, with or without a stone, including material, size, dimensions, styles, and the like. Search parameters may also include a relative ranking of stone features and/or setting features.

In some cases, the system may present a curated selection or list of candidate stones and/or settings that match the determined search parameters. The selection or list of candidates may draw on a vast inventory that may be otherwise too large to effectively search using some traditional techniques. Additionally, the curated selection may be more likely to present one or more candidate stones and/or settings that closely match the user's unique preferences. The curated selection or list of candidate stones and/or settings may be displayed in a presentation order or sub-set that is determined in accordance with search parameters and the relative ranking between search preferences. In some cases, users can change or modify the search parameters, the ranking, or both, which results in a reordering or subset grouping of the candidate stones and/or settings according to the modified ranking. In some embodiments, the customer can indicate preferences regarding stone and/or setting listings. Search parameters, the presentation order, or some combination thereof may be modified or updated in response to indicated preferences or series of indicated preferences.

Accordingly, in some cases, the system may determine a set of search parameters based on predicted ring attributes and may present the user with a prepopulated search interface with search preferences preselected based on the search parameters. As described herein, the system may use a graphical user interface to present the search interface to the user, collect preferences from the user, and present a highly tailored set of candidate stones and/or settings. In particular, in some embodiments the system presents a graphical search interface to allow a user (e.g., a customer) to make adjustments to the search parameters (e.g., desired stone features and/or setting features determined based on the predicted ring attributes). Generally, stone features (e.g., gemological features) other than shape have scaled values along multiple grades or a continuum, such that multiple values of a given diamond feature may potentially be suitable to a user.

In some cases, a user may adjust and/or select a range of suitable values for a given search parameter. For example, a user may enter into the graphical search interface a range of 1.0-1.5 carat weight, and the diamond selection system may search for diamonds within that range. In other embodiments, a user may select a single value for a given feature and the search system may also include in the results diamonds and/or settings having similar values for the given feature. For example, a user may select a clarity value of IF through the graphical search interface, and the diamond selection system may present diamonds with IF clarity values, along with diamonds with FL and VVS1 values.

In some implementations, once search parameters have been determined using the predicted ring attributes, the system may search a database of diamond and/or setting listings having features that match or nearly match the search parameters. The system may be further adapted to apply the user's adjustments to the search parameters to further curate a list of candidate diamonds and/or settings by determining a subset or presentation order of the matching diamonds and/or settings. In some cases, the listings are sorted according to the ranking. For example, if the relative ranking ranks clarity above weight, a diamond most closely matching a center of the range of desired clarity values and less closely matching the desired weight may be placed in order above a diamond more closely matching the desired weight and having less closely matched clarity.

The diamond selection system then presents a graphical representation of the search results to the user. The search results may be presented in an appropriate format, such as an array of icons or thumbnails representing search results, an ordered list of the results, or a series of diamond and/or setting listings displayed sequentially (e.g., one at a time). Search result entries may represent distinct diamond and/or setting listings, and a user may obtain additional details about a particular listing by selecting the corresponding result entry.

In some embodiments, the search results list may enable further interactions with the user. For example, the user may select "favorite" diamonds and/or settings for further inspection. In other examples, the user may be able to select multiple results from the search and compare those results side-by-side. In still other examples, the user may seek a price comparison with other diamond vendors or distributors to compare the diamonds and/or settings available through the diamond selection system with diamonds and/or settings having similar features available from other sources. In further examples, the user may indicate a preference (e.g., positive or negative) regarding one or more diamond and/or setting listings. In still further examples, the user may indicate additional information regarding a diamond and/or setting listing, including one or more reasons corresponding to an indicated preference. In some embodiments, the search parameters, the presentation order, or some combination thereof may be modified or updated in response to indicated preferences or series of indicated preferences.

In some cases, the diamond selection system may present ring listings that include a diamond and a setting (e.g., a ring listing). Ring listings may include similar information and functionality provided by diamond listings and setting listings. In some cases, the diamond selection system may provide one or more user interfaces for users to customize diamonds and/or settings and/or view additional details regarding particular diamond listings, setting listings, and/or ring listings.

The diamond selection system may display information about competitor diamonds and/or settings. In some cases, the diamond selection system may determine and/or present comparison information in a portion of the user interface. Comparison information may indicate differences between a diamond and/or setting presented in the search interface and one or more competitor diamonds and/or settings. In some cases, the comparison information includes advantages of a diamond and/or setting presented in the search interface compared to one or more competitor diamonds and/or settings.

These and other embodiments are discussed below with reference to FIGS. 1-24. However, those skilled in the art will readily appreciate that the detailed description given herein with respect to these figures is for explanatory purposes only and should not be construed as limiting.

FIG. 1 depicts an example system 100 for implementing a diamond selection system, as described herein. As shown in FIG. 1, the system includes a diamond selection system 102 that is operably coupled to other devices via the network 120. The network 120 may include local area networks and/or large area networks that are configured to relay data to the various devices of the system 100. The network may include, for example, the Internet, an intranet, an Ethernet network, a wired network, a wireless network, or the like. The network 120 may be operably connected to one or more databases 112, which may be implemented on one or more computing and/or data storage devices. In some cases, the network 120 is operably connected to the databases 112 via the diamond selection system 102.

In general, a portal (e.g., a remote portal) 106 is an application or software program executed on a user computing device 108. The user computing device 108 is generally any form of computing device, such as a personal mobile device, a personal computer, work station, terminal, mobile computer, mobile device, smartphone, tablet, a multimedia console, or the like. The portal 106 may be implemented via an application executing on the user computing device 108, a web browser, or other Internet- and/or network-enabled interface. The portal 106 provides an interface for a user to access a diamond selection system 102 executed or otherwise embodied on the network 120. The portal 106 may further establish a communication channel between the user computing device 108 and the diamond selection system 102. In some embodiments, a component or portion of the diamond selection system 102 is executed on an application server 110 or other network device(s) connected via the network 120. The diamond selection system 102 may also be operably connected to one or more databases 112. Thus, at least one component or portion of the diamond selection system 102 may be executed on the application server 110 and/or one or more portions may be executed on the user computing device 108 of the user (e.g., through the portal 106).

In general, the application server 110 hosts the diamond selection system 102. In some implementations, the application server 110 also hosts a web server 104 or an application that users may use to access components of the system 100. The application server 110 may include a single server, a plurality of servers with each such server being a physical server or a virtual machine, or a collection of both physical servers and virtual machines. In another implementation, a distributed network (e.g., a cloud computing system) hosts one or more components of the system 100. The user computing device 108, the application server 110, and other resources connected to the network 120 may access one or more other servers to access one or more websites, applications, web services interfaces, storage devices, computing devices, etc., that are used to generate a framework for displaying a compiled content set for a particular project. The application server 110 may also host a search engine that the diamond selection system 102 uses for accessing, searching for, and modifying content files.

The diamond selection system 102 may also communicate with other systems utilizing the network 120. For example, the diamond selection system 102 may communicate with one or more databases 112 available to access and store information via the network 120. For example, diamond and/or setting listings may be stored in the database 112. Each diamond and/or setting listing may include data indicating stone features and/or setting features, as well as price, certification information, one or more images associated with the diamond and/or setting, and so on.

The gemological features of a diamond listing may include, but are not limited to, shape, cut, color, clarity, and weight (typically measured in carats). In some embodiments, each diamond listing may include additional gemological features, such as symmetry, polish, and fluorescence. Each diamond listing may be entered into the database 112 as an electronic record having searchable categories and/or fields representing the gemological features, price, certification information, and related data.

In some embodiments, the database 112 may have one or more indices of the diamond and/or setting listings in order to facilitate faster searching according to the search parameters of the user. The diamond selection system 102 may configure or otherwise manage the diamond and/or setting listings and/or indices within the database 112, including storing listing information and retrieving the information according to search parameters.

In some cases, the diamond selection system 102 may communicate with one or more third-party systems 114 connected to or otherwise in communication with the network 120. In some cases, a third-party system 114 may include a computing network associated with diamond vendors. The diamond vendors may be associated with the diamond selection system 102, or the diamond vendors may be competitors or otherwise not associated with the diamond selection system 102. In some embodiments, a third-party system 114 may provide diamond and/or setting listings to be included in the database 112 or otherwise searchable by the diamond selection system 102. In some cases, the diamond selection system 102 may interface with a third-party system 114 to find diamond and/or setting information for comparison with diamond and/or setting listings within the database 112. For example, the diamond selection system 102 may search a competitor's information hosted on a web page or otherwise publicly available in order to construct listings for comparison.

In some cases, the third-party system 114 may include a computing network associated with a social media network. The diamond selection system 102 may obtain (e.g., access and/or store) social media data for use in determining predicted ring attributes. In various embodiments, the diamond selection system 102 may analyze social media data (e.g., postings, images, hashtags) to determine predicted ring attributes and/or search parameters. For example, social media data may be used as training data and/or input data for one or more predictive models as discussed in more detail below with respect to FIGS. 2-5.

In general, the portal 106, executed on one or more user computing devices 108, provides access to the diamond selection system 102 to facilitate user searches for diamonds and/or settings in the database 112 or accessible through third-party systems 114. The diamond selection system 102 may communicate with any number of users through any number of portals 106 connected to the network 120. In some cases, the portal 106 may present diamond and/or setting listings based on determined predicted ring attributes. For example, the portal 106 may receive a user input, such as a social media handle or username, and use that information to receive input data for a predictive model from a social media network associated with the handle or username. In response to determining predicted ring attributes, the diamond selection system 102 may present one or more diamond and/or setting listings.

Additionally or alternatively, the diamond selection system 102 may present one or more search parameters that are preselected based on the predicted ring attributes. In some cases, a user may enter and/or update search parameters through a portal 106, and the portal 106 may transmit the search parameters to the diamond selection system 102 for execution through the application server 110 in conjunction with the database 112.

For example, the portal 106 may provide graphical representations of search options (e.g., search parameters) to the user. The search options may include various stone and/or setting features, and the user may be prompted to select a value or range of values for some or all features included as search options. The user may further be prompted to select a ranking of the features. Once the features are selected and ranked, the portal 106 may transmit the search parameters to the diamond selection system 102.

After determining search parameters based on predicted ring attributes and/or receiving search parameters from the portal 106, the diamond selection system 102 may perform a search of the database 112. The diamond selection system 102 may search for diamond and/or setting listings which match all the entered search parameters, diamond and/or setting listings which match some of the entered search parameters, and/or diamond and/or setting listings with values within a range of the entered search parameters. The diamond selection system 102 may populate a search results list and store all or a portion of the search list in memory, such as memory on the application server 110.

Once a search results list has been populated, the diamond selection system 102 may further organize the search results in accordance with the relative ranking entered by the user and/or determined using the predicted ring attributes. For example, the search results may be ordered with listings matching the highest ranked stone and/or setting feature first, followed by listings matching the second highest ranked feature. The ordered search results list may then be used to generate a graphical representation of the results list. The graphical representation of the results list may be displayed on the user computing device 108 through the portal 106.

The portal 106 may facilitate further interactions with the diamond selection system 102. For example, the user may request a price comparison with third parties, in which case the diamond selection system 102 may interact with third-party systems 114 in order to generate a price comparison. The user and/or the diamond selection system may further refine the results, change the rank order of the results, and so forth. Various features and options available to a user through the use of the portal 106 and the diamond selection system 102 are discussed in more detail below.

In some cases, the portal 106 may present ring listings that include a diamond and a setting (e.g., a ring listing). Ring listings may include similar information and functionality provided with respect to diamond listings and setting listings. In some cases, the portal 106 may provide one or more user interfaces for users to customize diamonds and/or settings and/or view additional details regarding particular diamond listings, setting listings, and/or ring listings.

As noted above, the portal 106 may display information about competitor diamonds and/or settings. In some cases, the diamond selection system 102 may determine and/or present comparison information via the portal 106. Comparison information may indicate differences between a diamond and/or setting presented in the search interface and one or more competitor diamonds and/or settings. In some cases, the comparison information includes advantages of a diamond and/or setting presented by the portal 106 compared to one or more competitor diamonds and/or settings.

Figure 2A:
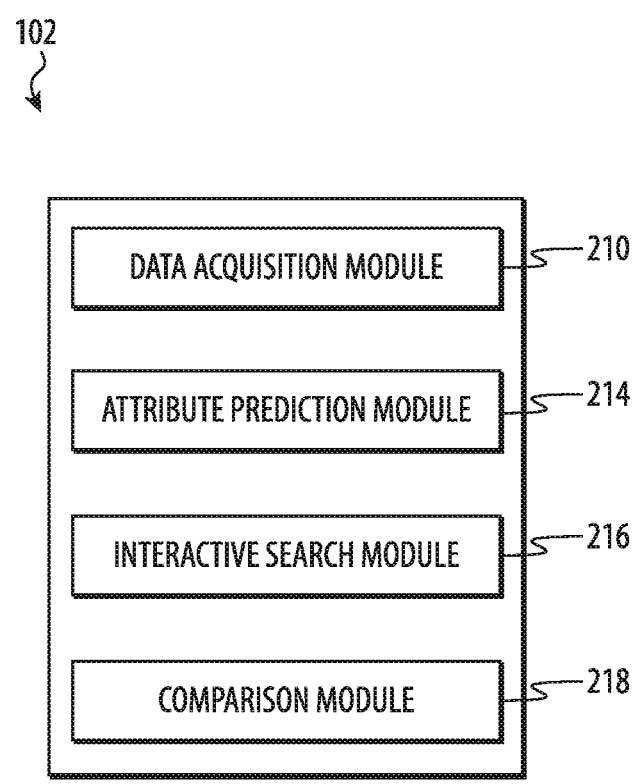
FIG. 2A is an illustrative block diagram of the diamond selection system of FIG. 1.

FIG. 2A is an illustrative block diagram of the diamond selection system 102. The diamond selection system 102 can include a data acquisition module 210, an attribute prediction module 214, an interactive search module 216 and/or a comparison module 218. Broadly, the data acquisition module 210 obtains data for use in determining predicted ring attributes, the attribute prediction module 214 determines predicted ring attributes, and the interactive search module 216 determines diamond listings and/or search preferences to provide in a user interface (e.g., a diamond selection interface) of the diamond selection system 102. The comparison module 218 may determine comparison information, such as differences between diamond(s) and/or setting(s) of the diamond selection system and competitor diamond(s) and/or setting(s) for presentation in the user interface.

In some cases, the data acquisition module 210 obtains data for use by the diamond selection system 102. The data acquisition module 210 may obtain training data for training a predictive model of the diamond selection system 102.

In some cases, the data acquisition module 210 obtains data from a social media network. For example, the data acquisition module 210 may obtain images and/or other social media data associated with an identified social media profile to use as input data for a predictive model that determines predicted ring attributes for a user associated with the social media profile. As another example, the data acquisition module 210 may obtain images and/or other social media data for use as training data to perform training of a predictive model that determines predicted ring attributes for a user associated with the social media profile.

In some cases, the data obtained by the data acquisition module 210 may be a set of data, such as a set of images, that corresponds to a single profile or account. For example, the data acquisition module 210 may download a set of images and a set of captions that correspond to some or all of the content that a user has posted to a social media account.

The data acquisition module 210 may obtain data in response to the diamond selection system 102 receiving a user input, such as an input at a user interface. For example, a user may provide a social media handle or username associated with a social media account, and the data acquisition module 210 may obtain social media data related to the social media account. In some cases, the data acquisition module 210 obtains data by accessing the social media network and scraping data. In some cases, data is publically available. In some cases, users may provide authentication information, such as a password, that allows the data acquisition module 210 to retrieve data that is not publically available.

The data acquisition module 210 may obtain data using searching or other techniques. For example, the data acquisition module 210 may perform a metadata tag (e.g., a hashtag) search using a predetermined metadata tag to retrieve social media data associated with the metadata tag. The data acquisition module 210 may perform a metadata tag search to find sets of images for use in training a predictive model. For example, the data acquisition module may search for images having one or more metadata tags that may indicate that the images contain pictures of diamonds and/or settings. Using one or more searching techniques, the data acquisition model 210 may obtain ring images corresponding to one or more accounts at a social media network, and the data acquisition module 210 may obtain a training data set (e.g., a training image set) for one or more of the ring images that includes the ring image and one or more additional images from the same account as the ring image for use in a supervised training process for the predictive model. Ring images may include a stone, a setting, or both, and may be used to determine ring attributes for a training image set. In some embodiments, training data sets include ring data, which includes descriptors or identifiers of a stone, a setting or both, and may not include an image. Ring data may be used similarly to ring images to determine ring attributes.

In some cases, the data acquisition module 210 may retrieve competitor information, such as ring attributes for competitor diamond(s) and/or setting(s) for use by the comparison module 218 in determining comparison information.

In various embodiments, data obtained by the data acquisition module 210 may be stored in short-term and/or persistent memory of the diamond selection system 102. Additionally or alternatively, the data may be provided to one or more other components of the diamond selection system 102, such as the attribute prediction module 214. Many embodiments described above reference obtaining and subsequently analyzing data obtained from a social media network. In some embodiments other types of data may be used. For example, users may provide data directly to the diamond selection system 102, or the diamond selection system 102 may obtain data from additional or alternative sources.

In some cases, the attribute prediction module 214 determines predicted ring attributes, for example, using data sets obtained by the data acquisition module 210. The attribute prediction module 214 may include one or more predictive models for analyzing data sets obtained by the data acquisition module 210 and determining predicted ring attributes. In some cases, the predictive models may be trained, for example, using supervised learning techniques or other suitable training techniques. The attribute prediction module 214 may classify and/or group data sets obtained by the data acquisition module 210 as part of training the predictive model(s) (e.g., training operations) and/or as part of predicting ring attributes (e.g., prediction operations).

In various embodiments, the attribute prediction module 214 classifies data sets. In some cases, the attribute prediction module 214 applies classification labels to data sets. In some cases, the attribute prediction module 214 may perform image recognition to determine the content of images. The attribute prediction module 214 may apply one or more classification labels to an image or a set of images based on recognized content. In some cases, the attribute prediction module 214 uses one or more image processing tools (e.g., computer vision object recognition) to recognize objects in an image or image set and applies classification labels that correspond to the recognized objects. In some cases, the attribute prediction module 214 may classify and/or apply classification labels to additional types of data in addition to images. For example, the attribute prediction module 214 may classify biographical data and other types of recipient data.

As part of training operations, the attribute prediction module 214 may classify and/or group training data sets as part of a supervised, partially supervised, or unsupervised training or machine-learning process. In some cases, the attribute prediction module 214 generates training profiles based on analyzing training data sets. A training profile may include a set of classification labels and a set of ring attributes corresponding to a training data set. The attribute prediction module 214 may determine the set of classification labels as described above. In various embodiments, training data sets may include one or more images that include stones, settings, or both. The attribute prediction module 214 may determine the set of ring attributes using computer image analysis (e.g., computer vision object recognition), another type of computer model, and/or manual identification and input of ring attributes by a person. The training profile associates the classification labels that identify the images in the training data set with the ring attributes of the ring image(s) in the training data set for use in determining predicted ring attributes for data sets that may not include ring images. Training profiles may be generated periodically and/or as part of training operations and stored or otherwise maintained at the diamond selection system 102, or they may be generated as needed. As used herein, references to a training data set may refer to a training profile that includes data relating to the training data set (e.g., classification labels and/or ring attributes), but omits some data relating to the training data set (e.g., image data and/or other training data).

In some embodiments, the attribute prediction module 214 groups classified data sets. In some cases, data sets are grouped by grouping training profiles associated with data sets. In some cases, grouping data sets uses a cluster model, such as hierarchical clustering, but other forms of grouping data sets are envisioned. In some cases, data sets (e.g., image sets) are grouped according to a similarity between classification labels that apply to the data sets. In some embodiments, the attribute prediction module 214 performs cluster analysis to group data sets according to similarity. For example, the attribute prediction module 214 may determine a measure of similarity between classification labels of a training data set (or training profile) and one or more additional training data sets (or training profiles) and group the training data sets for which the measure of similarity exceeds a threshold. Similarly, the attribute prediction module 214 may determine a measure of similarity between classification labels of an input data set and one or more training data sets (or training profiles) and group the input data set with training data sets or profiles for which the measure of similarity exceeds a threshold.

In some cases, the attribute prediction module 214 may determine one or more group classification labels for a group of training data sets based on the classification labels of the training data sets. In some cases, the group classification labels may be a combination of all of the classification labels for the training data sets. In some cases, the attribute prediction module 214 may determine group classification labels by analyzing the classification labels of the group of training data sets. Analyzing the classification labels of the group of training data sets may include determining a mathematical average (e.g., a mean, median, and/or mode) for one or more classification labels among the group of training data sets, determining a statistical distribution for one or more classification labels among the group of training data sets, and the like. For example, in some cases, the most common classification labels represented in the training data sets are determined as the group classification labels.

In some cases, the attribute prediction module 214 may determine one or more group ring attributes for a group of training data sets based on the ring attributes of the training data sets. In some cases, the group ring attributes may be a combination of all of the ring attributes for the training data sets.

Figure 2B:
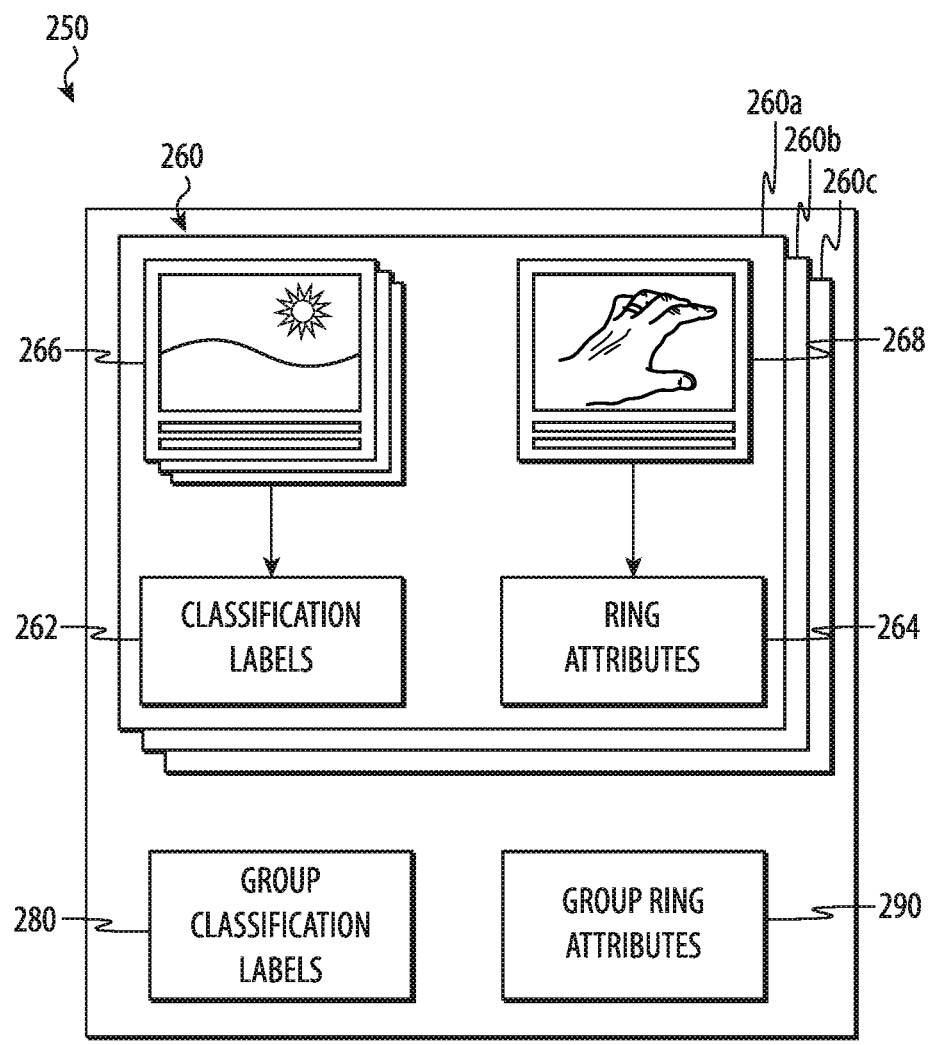
FIG. 2B illustrates an example group of training data sets.

FIG. 2B illustrates an example group 250 of training data sets. The group 250 includes multiple training data sets (e.g., training data sets 260*a*, 260*b*, and 260*c*, referred to collectively as training data sets 260). In some cases, each training data set 260 includes an image set 266, which may include any type of training data, including images, videos, captions, social media activity, and the like. In general, each training data set 260*a*, 260*b*, and 260*c* corresponds to a series of postings from a unique user of a social media network or social media application. As such, each training data set 260*a*, 260*b*, and 260*c* will have an image set (e.g., image set 266) that can be extracted from the series of postings or other social media activity. As discussed above, the image set 266 is analyzed to determine a set of classification labels 262 (e.g., training classification labels) that identify the images in the image set. The classification labels 262 generally correspond to a quality or attribute of the social media user that is unrelated or not directly related to the user's preference for jewelry or diamonds. In general, the classification labels 262 relate to a user's activities, interests, social media commentary, humor, literary interests, movie or book preferences, and other attributes that may be extracted or determined based on the user's social media activity. The classification labels 262 may correspond to, for example, personal qualities or attributes of the social media user (e.g., dog lover, world traveler, outdoorsperson, fashion-focused). The classification labels may also correspond to, for example, demographic data including, for example, sex, age, location, occupation, and/or income level. Each of the training data sets 260*a*, 260*b*, and 260*c* in the group 250 may share one or more classification labels 262. Thus, the group 250 may be identified by one or more shared or corresponding classification labels 262 identifying the group of social media users as sharing common interests, activities, or other qualities.

Also, in some cases, the training data set 260 includes a ring image 268, which may be analyzed to determine ring attributes 264 (e.g., training ring attributes). The ring attributes 262 may also be determined using text extracted from a social media posting including, for example, a catch phrase, hashtag, slogan, or other textual identifier. In some instances, the ring image 268 is not a posting but, instead, may be linked or shared from another user's social media account, a vendor's website, or other source. While FIG. 2B depicts a ring image 268, the same principle applies for any image including a diamond, jewelry stone, ring, bracelet, necklace, or other personal accessory.

As shown in FIG. 2B, the group 250 may include group classification labels 280 and group ring attributes 290. As discussed above, the group classification labels 280 and the group ring attributes 290 may be determined based on the classification labels 262 and the ring attributes 264 of one or more training data sets 260 in the group 250. For example, the group classification labels 280 and/or the group ring attributes 290 may be determined by aggregating, averaging, polling or otherwise combining the classification labels 262 and the ring attributes 264 of one or more training data sets 260 in the group 250.

Returning to FIG. 2A, users associated with data sets having similarly classified data may have similar preferences for ring attributes, so known ring attributes for training data sets or profiles that are grouped with input data may be used to determine predicted ring attributes for the input data. For example, for an input data set that is grouped with one or more training data sets, the attribute prediction module 214 may determine predicted ring attributes for the input data set from group ring attributes and/or the ring attributes of the training data sets.

In some cases, the attribute prediction module 214 may determine predicted ring attributes by analyzing the group ring attributes and/or the ring attributes of the group of training data sets. Analyzing the ring attributes of the group of training data sets may include determining a mathematical average (e.g., a mean, median, mode) for one or more ring attributes among the group of training data sets, determining a statistical distribution for one or more ring attributes among the group of training data sets, and the like. For example, in some cases, the most common ring attributes represented in the training data sets are determined as the predicted ring attributes.

In some cases, the attribute prediction module 214 may determine prediction metrics as part of determining predicted ring attributes. Prediction metrics may indicate a measure of confidence or strength of a determination of whether a ring attribute is a predicted ring attribute. For example, for a particular ring attribute, the predicted ring attributes may include a probability distribution of the ring attribute according to the statistical distribution of the ring attribute in the training data sets. Prediction metrics may include a percentage, with 0% corresponding to a lowest level of prediction confidence for a ring attribute and 100% being a highest level of prediction confidence for a ring attribute. In some cases, the attribute prediction module 214 may determine that a ring attribute is a predicted ring attribute if a prediction metric for the ring attribute exceeds a predetermined threshold. For example, ring attributes having greater than 5%, 15%, or 50% prediction confidence may be selected as predicted ring attributes. In some cases, multiple prediction metrics for a ring attribute may be determined. In some cases, predicted ring attributes may be displayed in a user interface, such as a portion of a search interface. Prediction metrics for predicted ring attributes may also be displayed in the user interface, as discussed in more detail with respect to FIG. 8C.

In some cases, the interactive search module 216 determines search parameters based on the predicted ring attributes and determines diamond and/or setting listings and/or search preferences for providing to users of the diamond selection system 102. In various embodiments, the search parameters may represent the predicted ring attributes. For example, if the predicted ring attributes include a particular stone shape, the search preferences may include the particular stone shape. Similarly, if the predicted ring attributes include a numerical value or range for a particular stone or setting feature, the search preferences may include the value or range for the feature and/or a different value or range selected based on the value or range in the ring attributes.

The comparison module 218 may determine comparison information, such as differences between diamond(s) and/or setting(s) of the diamond selection system and competitor diamond(s) and/or setting(s) for presentation in the user interface. The comparison module 218 may use competitor information obtained by the data acquisition module 210. As noted above, the competitor information may include ring attributes for one or more competitor diamonds and/or settings. The comparison module 218 may determine differences between one or more competitor diamonds and/or settings and one or more diamonds and/or settings of the diamond selection system. The comparison module 218 may compare ring attributes of one or more competitor diamonds and/or settings with ring attributes of one or more diamonds and/or settings of the diamond selection system to determine comparison information. In some cases, the comparison module 218 determines advantages of one or more diamonds and/or settings of the diamond selection system compared to one or more competitor diamonds and/or settings.

The comparison information may include advantages of the diamond and/or setting of the diamond selection system that explain differences in other ring attributes, such as price. For example, a diamond and/or setting of the diamond selection system may cost more than a competitor diamond and/or setting, but the diamond and/or setting of the diamond selection system may feature a higher quality cut or clarity that accounts for the difference in price. The comparison module 218 may select diamonds and/or settings for comparison based on similar ring attributes. For example, the comparison module 218 may select a competitor diamond having a similar weight or other ring attributes compared to a diamond of the diamond selection system.

The modules of the diamond selection system 102 may be defined by any combination of hardware and/or software components, and may interact with a processing unit and any other suitable components of the devices discussed herein. The modules are described for illustrative purposes and are not meant to be exhaustive. Functions of the diamond selection system 102 may be performed by more or fewer modules, and functions may be performed by different modules or groups of modules than the particular modules described herein. In some cases, the diamond selection system 102 may execute on multiple devices. For example, modules of the diamond selection system 102 may be located on different devices and/or functionality of the diamond selection system 102 may be performed on multiple different devices.

Figure 3:
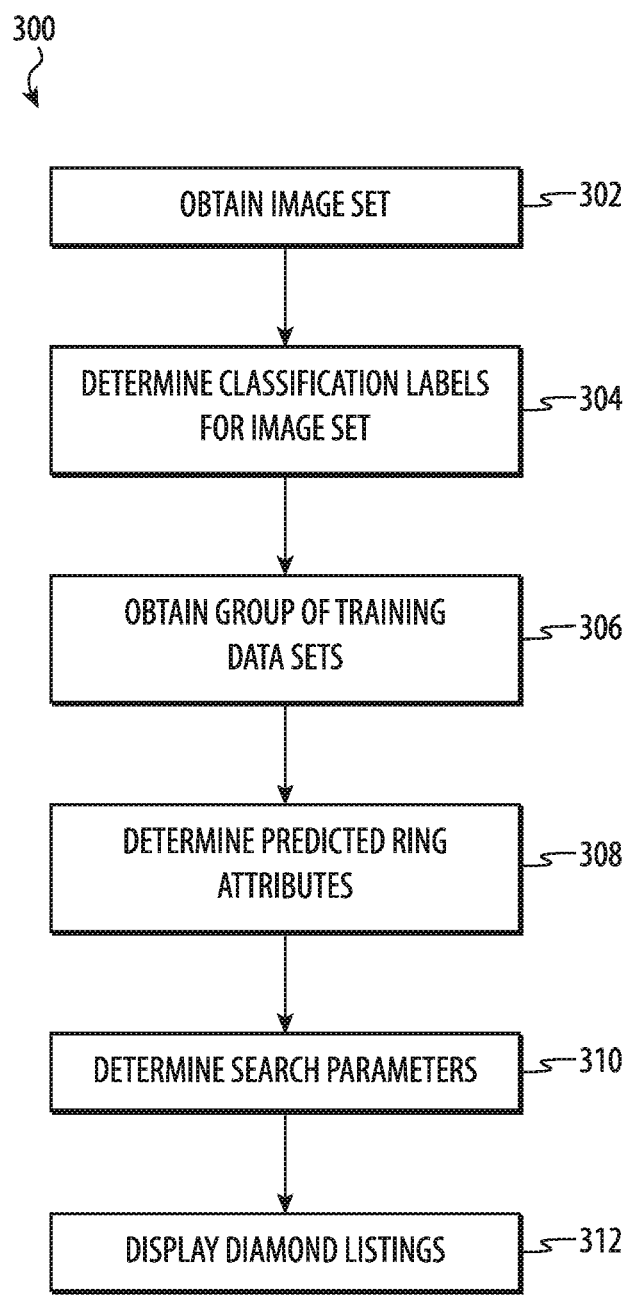
FIG. 3 is a flowchart of an example method for using a predictive computer model to present diamond listings in a diamond selection system.

FIG. 3 is a flowchart of an example method 300 for using a predictive model to present diamond listings in a diamond selection system. The method 300 may be performed by a diamond selection system, such as discussed above with respect to FIGS. 1 and 2.

As discussed herein, the diamond selection system may include an interactive search interface for retrieving and presenting diamond and/or setting listings to users. In various embodiments, the diamond selection system may display a user interface for selecting a diamond and/or setting. The user interface may be displayed on a personal mobile device or any other suitable device as discussed herein.

At operation 302, the diamond selection system obtains user data such as an image set (e.g., a user image set). In some cases, the user image set may be obtained from a social media network or another source. In some cases, the user image set is a feed, album, or other collection of content from a social media account. In some embodiments, the system receives, via the user interface, a user input, such as a username associated with a user account of a social media network that includes the user image set, and obtains the user image set in response to receiving the user input. In various embodiments, the system may identify the user account using the user name, user input, or other data obtained by the system. In some cases, the user image set is accessible using the user input (e.g., the username). In some cases, the user image set includes additional data, such as metadata, metadata tags, biographical data, captions, location data, or other information. In some cases, the operations of the example method 300 may be performed on user data (e.g., social media data) that does not include an image set.

At operation 304, the diamond selection system determines one or more user classification labels for the user image set by analyzing the user image set. In some cases, the system may perform image recognition to determine the content of images. The attribute prediction module may apply one or more classification labels (e.g., a set of user classification labels) to the user image set based on recognized content. As mentioned previously, the classification labels may correspond the user's interests, activities, or other qualities of the user that may be used to identify other social media users having similar qualities. Example classification labels include, without limitation, "world traveler," "animal lover," "fashion forward," outdoorsy," "sports fan," "artistic," and so on. The classification labels may also correspond to demographic data including, for example, sex, age, location, occupation, and/or income level. In some cases, the system uses computer image processing tools (e.g., computer vision object recognition) to recognize objects in an image or image set and applies classification labels that correspond to the recognized objects. In some cases, other types of classifiers are used to determine classification labels.

At operation 306, the diamond selection system obtains a group of training data sets (e.g., a matching group of training image sets). The training data sets in the group of training data sets may be determined from one or more groups of training image sets based on the training data sets having similar classification labels to the classification labels determined in operation 304. In some cases, the training data sets may be grouped as part of training operations and groups or other affiliations between training data sets may be stored by the diamond selection system and retrieved during use of the predictive model. In some cases, training data sets may be grouped as part of use of the predictive model (e.g., method 300). In some embodiments, each of the training data sets in the group corresponds to a social media account. The training data sets may include one or more classification labels that matches the one or more classification labels applied to the user image set. The training data sets may further include one or more ring attributes. In various embodiments, the training data sets may be training profiles that include only a subset of the original data obtained and/or determined by the diamond selection system, such as classification labels and ring attributes.

As described above, training profiles may be used to group training data sets. Training profiles associate classification labels that identify images in a training data set with ring attributes of one or more ring image(s) in the training data set for use in determining predicted ring attributes for data sets that may not include ring images. Training profiles may be generated periodically and/or as part of training operations and stored or otherwise maintained at the diamond selection system 102, or they may be generated as part of the method 300.

At operation 308, the diamond selection system determines predicted ring attributes based on ring attributes of the group of training data sets. As described above, the diamond selection system may determine predicted ring attributes by analyzing the ring attributes of the group of training data sets. Analyzing the ring attributes of the group of training data sets may include determining a mathematical average (e.g., a mean, median, mode) for one or more ring attributes among the group of training profiles, determining a statistical distribution for one or more ring attributes among the group of training data sets, and the like. For example, in some cases, the most common ring attributes represented in the training data sets are determined as the predicted ring attributes. In some cases, multiple predicted values for a ring attribute may be determined. For example, for a particular ring attribute, the predicted ring attributes may include a probability distribution of the ring attribute according to the statistical distribution of the ring attribute in the training data sets.

At operation 310, the diamond selection system determines search parameters for the interactive search interface based on the predicted ring attributes. In various embodiments, the search parameters may represent the predicted ring attributes. For example, if the predicted ring attributes include a particular stone shape, the search preferences may include the particular stone shape. Similarly, if the predicted ring attributes include a numerical value or range for a particular stone or setting feature, the search preferences may include the value or range for the feature and/or a different value or range selected based on the value or range in the ring attributes.

At operation 312, the diamond selection system displays diamond listings in the user interface. As discussed above, the system may determine and display diamond and/or setting listings based on the search parameters, as described in more detail below with respect to FIGS. 5 and 6. In some cases, the system displays the search parameters and allows users to adjust the search parameters prior to performing the search to determine the diamond and/or setting listings. Example diamond and setting listings are shown and described below with respect to FIGS. 11A-13K. Example search preference interfaces for displaying search parameters to the user are shown and described below with respect to FIGS. 9A-9B and 12.

The method 300 shown and described with respect to FIG. 3 is one example of a method for using a predictive model to present diamond listings in a diamond selection system. In various embodiments, the method 300 may include different and/or additional operations, and certain operations may be performed in different orders and/or omitted from the method.

Figure 4:
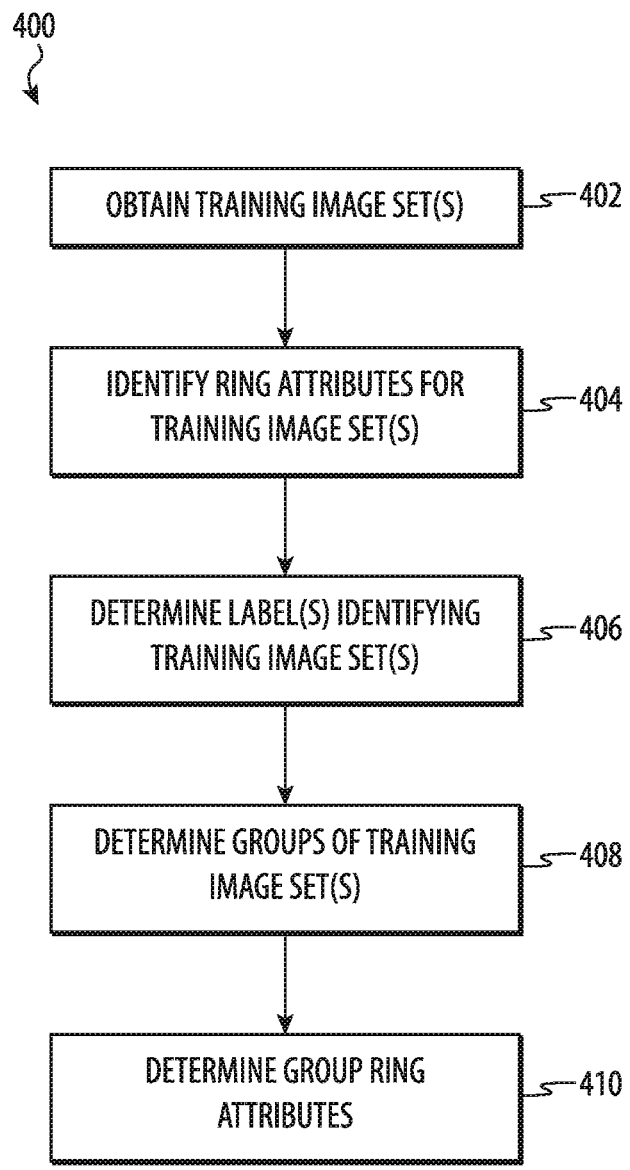
FIG. 4 is a flowchart of an example method for training a predictive model for determining predicted ring attributes.

FIG. 4 is a flowchart of an example method 400 for training a predictive model for determining predicted ring attributes. The method 400 may be performed by a diamond selection system, such as discussed above with respect to FIGS. 1 and 2A-2B.

At operation 402, the diamond selection system obtains one or more training image sets. As described above, the training image sets may be obtained from a social media network or another source. Each training image set may be associated with an account on the social media network. In some cases, each training image set is a feed, album, or other collection of content from a social media account. In some cases, the training image sets include additional data, such as metadata, metadata tags, biographical data, captions, location data, or other information. In some cases, the operations of the example method 400 may be performed on training data that does not include images.

At operation 404, the diamond selection system identifies ring attributes for the training image set(s). In various embodiments, a training image set may include one or more ring images that include a stone, a setting, or both, and may be used to determine ring attributes for the training image set. The diamond selection system may use image recognition, such as computer vision object recognition, to identify ring attributes in a ring image. For example, the system may identify a stone shape, a setting style, colors, and the like. In some embodiments, training data sets include ring data, which include descriptors or identifiers of a stone, a setting or both, and may not include an image. For example, ring data may be based on a text string (hashtag, slogan, description) that is associated with a training data set. By way of further example, ring data may be manually entered by a person reviewing ring images. Other (non-text and non-image) ring data may also be used in a similar fashion to determine ring attributes.

At operation 406, the diamond selection system determines one or more training classification labels identifying the training image set(s). As discussed above, the system may perform image recognition to determine the content of images of each training image set. The attribute prediction module may apply one or more training classification labels (e.g., a set of training classification labels) to the training image sets based on recognized content. As mentioned previously, the classification labels may correspond the user's interests, activities, or other qualities of the user that may be used to identify other social media users having similar qualities (e.g., "world traveler," "animal lover," "dog lover," "fashion forward," outdoorsy," "sports fan," "artistic,"). The classification labels may also correspond to demographic data including, for example, sex, age, location, occupation, and/or income level. In some cases, the system uses computer vision object recognition to recognize objects in an image or image set and applies training classification labels that correspond to the recognized objects. In some cases, other types of classifiers are used to determine training classification labels.

In some cases, the diamond selection system generates training profiles based on analyzing training data sets. A training profile may include a set of training classification labels and a set of ring attributes corresponding to a training data set. The training profile associates the training classification labels that identify the images in the training data set with the ring attributes of the ring image(s) in the training data set for use in determining predicted ring attributes for data sets that may not include ring images. Training profiles may be generated periodically and/or as part of training operations and stored or otherwise maintained at the diamond selection system 102, or they may be generated as needed. As a training profile is generated for a training data set, the system may delete or otherwise remove training data from storage so that the system does not need to maintain all training data, such as image sets.

At operation 408, the diamond selection system determines one or more groups of training image sets by analyzing similarities among the training image sets. As described above, the training data sets in the group of training data sets may be determined based on the training data sets having corresponding (e.g., similar or matching) classification labels to the classification labels determined in operation 406. In some cases, the training data sets may be grouped as part of training operations (e.g., method 400) and groups or other affiliations between training data sets may be stored by the diamond selection system and retrieved during use of the predictive model. In some cases, training data sets may be grouped as part of use of the predictive model (e.g., method 300).

As described above, training profiles may be used to group training data sets. Training profiles associate classification labels that identify images in a training data set with ring attributes of one or more ring image(s) in the training data set for use in determining predicted ring attributes for data sets that may not include ring images. Training profiles may be generated periodically and/or as part of training operations and stored or otherwise maintained at the diamond selection system, or they may be generated as part of the method 400.

At operation 410, the diamond selection system determines group ring attributes for the group(s) of training image sets. A group of training data sets may have many different ring attributes. As discussed above with respect to operation 404, the diamond selection system may determine group ring attributes by analyzing images of the training image sets in the group. In some cases, the diamond selection system may determine predicted ring attributes by combining and/or analyzing the ring attributes of the group of training data sets. In some cases, the group ring attributes are the combined ring attributes of one or more training data sets in the group. Analyzing the ring attributes of the group of training data sets may include determining a mathematical average (e.g., a mean, median, mode) for one or more ring attributes among the group of training data sets, determining a statistical distribution for one or more ring attributes among the group of training data sets, and the like. For example, in some cases, the most common ring attributes represented in the training data sets are determined as the predicted ring attributes. In some cases, multiple predicted values for a ring attribute may be determined. For example, for a particular ring attribute, the predicted ring attributes may include a probability distribution of the ring attribute according to the statistical distribution of the ring attribute in the training data sets.

In various embodiments, the ring attributes for a group may be determined as part of training operations (e.g., method 400) or as part of use of the predictive model (e.g., method 300). For example, the diamond selection system may determine ring attributes for a group of training data sets and store the ring attributes for later retrieval, or the diamond selection system may determine ring attributes for a group of training data sets as the group is obtained during use of the model to determine predicted ring attributes.

The method 400 shown and described with respect to FIG. 4 is one example of a method for training a predictive model for determining predicted ring attributes. In various embodiments, the method 400 may include different and/or additional operations, and certain operations may be performed in different orders and/or omitted from the method. In some cases, the method 400 is performed in combination with the method 300. For example, the method 400 may precede the method 300.

Figure 5:
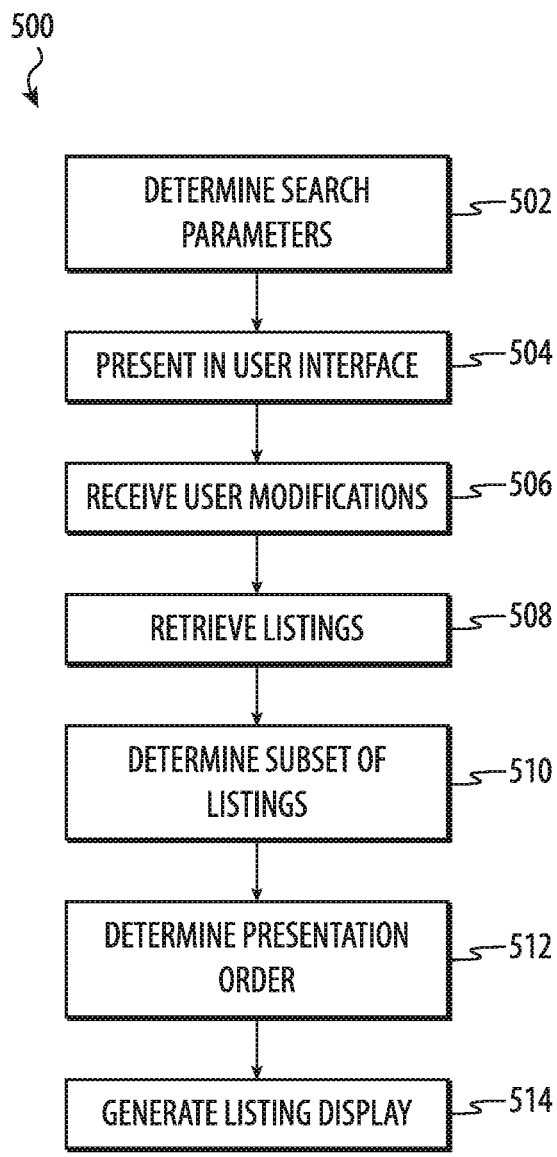
FIG. 5 is a flowchart of an example method for operating a diamond search interface using predicted ring attributes.

FIG. 5 is a flowchart of an example method 500 for operating a diamond search interface using predicted ring attributes. The method 400 may be performed by a diamond selection system, such as discussed above with respect to FIGS. 1 and 2.

At operation 502, the diamond selection system determines search parameters. As described above, some or all of the search parameters may be determined using predicted ring attributes. In some embodiments, some or all of the search parameters may be received by selection of one or more selectable options from one or more of the diamond features in a search interface. In some embodiments, some or all of the search parameters may be retrieved from another source, such as a user profile of the diamond selection system. In some embodiments, search parameters are determined for at least one diamond feature. In some embodiments, search parameters are determined for at least two diamond features. In some embodiments, the diamond selection system requires that search parameters for a diamond shape and at least one other diamond feature are determined. In some embodiments, the diamond selection system requires that search parameters for each diamond feature shown in the search interface are determined. Example search interfaces are described below with respect to FIGS. 9A-9B and 12.

In some embodiments, the search parameters include a ranking of the search categories or diamond features. For example, a user may select or the system may determine an option for one or more of price, diamond shape, cut, color, clarity, and weight. In some embodiments, the diamond features may be ranked in an order, such as color-clarity-cut-shape-price-weight, with color ranked first and weight ranked last. In some embodiments, the diamond features may be ranked in classes or tiers, such as indicating that cut and color are the most important while clarity, shape, price, and weight are less important. In some cases, not all of the search categories or diamond features are ranked. In some embodiments, at least two search categories are ranked with respect to each other. Example interfaces for receiving a user ranking of search categories or diamond features are described above with respect to FIGS. 9A-9B and 12.

At operation 504, the diamond selection system presents an interactive diamond search interface (e.g., a user interface) for receiving search parameters, displaying search parameters, and/or receiving modifications to search parameters (e.g., search parameters determined using predicted ring attributes). The search interface may be generated and/or presented on a user computing device, such as a personal mobile device, through a portal (e.g., a remote portal). The portal may be in communication with an application server, a database, a third-party system, and other components of a diamond selection system as described with respect to FIG. 1. The interactive diamond search interface may include graphical representations of stone features and/or setting features, along with selectable options for each stone and/or setting feature.

At operation 506, the diamond selection system receives user modification to the determined search parameters. Users may provide inputs in the interactive search interface to modify search parameters and/or provide search parameters that are not determined based on the ring attributes. For example, a user may specify a price range for a stone and/or setting.

At operation 508, a set of diamond listings (or stone and/or setting listings) is retrieved according to the search parameters. In some cases, the set of diamond listings is selected using the ranking of search categories or diamond features. In some examples, the search interface interacts with the diamond selection system to retrieve the set of diamond listings. Diamond listings (e.g., the set of diamond listings) may be retrieved by searching for diamond listings which match some or all of the search parameters, diamond listings which match some of the search parameters, and/or diamond listings with values within a predetermined range of the search parameters. A search results list may be populated with the set of diamond listings, and in some embodiments all or a portion of the search results list may be stored in memory, such as memory on the application server.

At operation 510, once a search results list has been populated, the search results may be grouped or further curated using the ranking of search categories or diamond features. For example, the diamond selection system may determine a subset of the set of diamond listings based on the ranking of search categories or diamond features. In one example, a subset of the search results is selected that more closely matches those diamond features or search categories that were highly ranked.

At operation 512, the diamond selection system may determine a presentation order based on the search parameters and/or a ranking of user-selected diamond characteristic preferences. As described herein with respect to FIG. 19, the user may provide a ranking of preferences that correspond to gemological features (e.g., diamond features) and which features the user prefers with respect to other features. Typically, the preference includes three or more gemological features that are ranked by the user to express a preference or order. In some embodiments, the search results may be organized or sorted into the presentation order based on the user ranking or preference of three or more gemological features. In some embodiments, the search results may be displayed according to the presentation order. For example, the search results may be ordered with listings most closely matching the highest ranked gemological feature higher in the order (e.g., color), followed by listings most closely matching the second highest ranked gemological feature (e.g., clarity), and so on.

At operation 514, a diamond listing display is presented. The diamond listing display may include one or more diamond listings for presentation in the user interface. In some embodiments, a graphical representation of the ordered search results may be displayed on the user computing device through the portal. In some embodiments, the search results are displayed sequentially (e.g., one at time) according to the updated presentation order (see, e.g., FIGS. 15A-15F). In some embodiments, multiple search results are displayed simultaneously (see, e.g., FIGS. 4A-4B. In some embodiments, the search results are displayed using a combination of sequential and simultaneous presentation. The search results list may be further interactive, such as to allow further comparisons between diamond listings in the search results, placing a diamond listing in a favorites list, seeking price comparisons, obtaining further details of a diamond listing, providing a user preference regarding a listing, providing additional information regarding a listing, and so on.

In some implementations, the user can change the ranking or preference of the search categories or diamond features and/or the search parameters after viewing the diamond listing display. After receiving an input from the user that indicates a preference and/or modifies or updates the search parameters, the search results may be changed (e.g., modified, resorted, regrouped, etc.) into a new set or subset of listings that are determined in accordance with the updated or modified search parameters.

The method 500 shown and described with respect to FIG. 5 is one example of a method for operating a diamond search interface using predicted ring attributes. In various embodiments, the method 500 may include different and/or additional operations, and certain operations may be performed in different orders and/or omitted from the method. For example, operations 504 and/or operation 506 may be omitted from the method 500. The diamond selection system may determine predicted ring attributes and proceed to retrieving listings or another operation of the method without presenting a search interface or receiving user modifications. Similarly, operation 510 may be omitted, and the presentation order may be determined using the set of diamond listings. The description of FIG. 5 refers generally to diamond listings, but the description is applicable to other types of stone and/or setting listings as well.

Figure 6A:
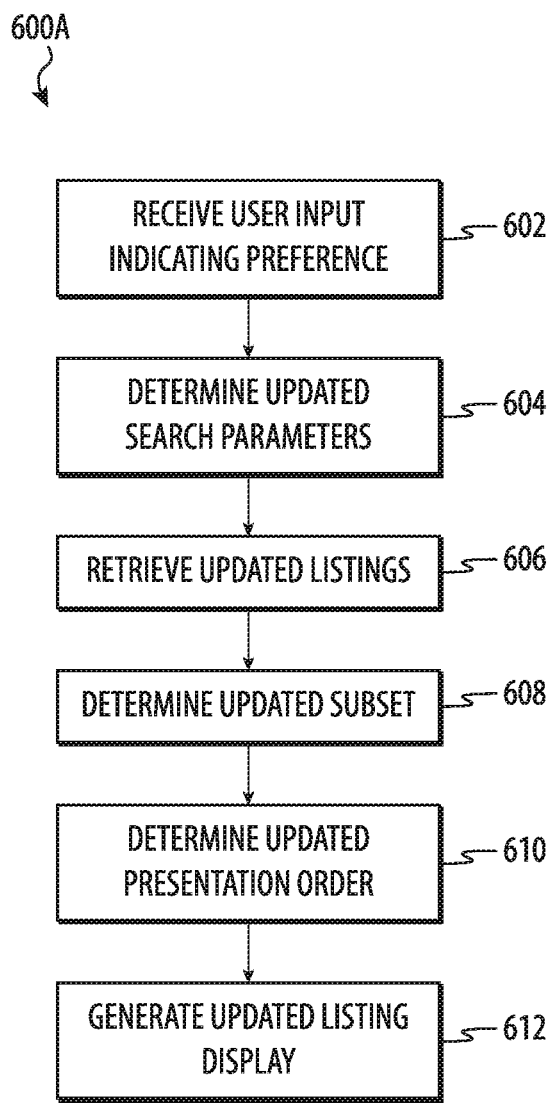
FIG. 6A is a flowchart of an example method for providing updated listings in response to receiving a user input.

FIG. 6A is a flowchart of an example method 600A for providing updated listings in response to receiving a user input. The method 600A may be operated on a diamond selection system, such as described above with respect to FIGS. 1 and 2. The method 600A may be a continuation of the method 500. At operation 602, a user input is received that indicates a preference regarding a listing displayed at the user interface. For example, the user input may be received based on a user interacting with the diamond listing display. At operation 604, the diamond selection system updates at least one of a modification metric or the search parameters based on the indicated preference or a series of preferences. In some embodiments, the user input may directly correspond to an update of the search parameters. In some embodiments, the diamond selection system determines whether one or more modification metrics exceeds a predetermined threshold, and updates the search parameters in response to determining that the one or more modification metrics exceed the predetermined threshold.

At operation 606, the diamond selection system may retrieve an updated set of diamond listings. In some cases, the set of diamond listings is selected using the updated search preferences. In some examples, the search interface interacts with the diamond selection system to retrieve the updated set of diamond listings. Diamond listings (e.g., the set of diamond listings) may be retrieved by searching for diamond listings which match all the updated search parameters, diamond listings which match some of the updated search parameters, and/or diamond listings with values within a predetermined range of the updated search parameters. An updated search results list may be populated with the updated set of diamond listings, and in some embodiments all or a portion of the updated search results list may be stored in memory, such as memory on the application server. In some embodiments, operation 606 is an optional step, and may be omitted from the method 600A. In some embodiments, the diamond selection system does not retrieve an updated set of diamond listings and one or more subsequent operations are performed on a previous set of diamond listings (e.g., the set of diamond listings retrieved in operation 508 of FIG. 5). In some embodiments, the diamond selection system combines a previous set of diamond listings with an updated set of diamond listings.

At operation 608, the search results or updated search results may be grouped or further curated using an updated ranking of search categories or diamond features. For example, the diamond selection system may determine an updated subset of the updated set of diamond listings based on the updated ranking of search categories or diamond features. In one example, an updated subset of the search results is selected that more closely matches those diamond features or search categories that were highly ranked according to the updated ranking. In some embodiments, the updated subset may be determined by adding and/or removing one or more diamond listings from a previous subset (e.g., the subset determined in operation 510 of FIG. 5).

At operation 610, the diamond selection system may determine an updated presentation order based on the updated search parameters. In some embodiments, the updated search results may be organized or sorted into the updated presentation order. In some embodiments, the search results may be displayed according to the updated presentation order.

At operation 612, an updated diamond listing display is presented. In some embodiments, the updated diamond listing display is combined with a previous diamond listing display (e.g., the diamond listing display of FIG. 5). In some embodiments, the updated diamond listing display replaces a previous diamond listing display. As described above, a graphical representation of the ordered updated search results may be displayed on the user computing device through the portal. In some embodiments, the search results are displayed sequentially (e.g., one at time) according to the updated presentation order. In some embodiments, multiple search results are displayed simultaneously. In some embodiments, the search results are displayed using a combination of sequential and simultaneous presentation. The updated search results list (e.g., the diamond listings) may be further interactive, such as to allow further comparisons between diamond listings in the search results, placing a diamond listing in a favorites list, seeking price comparisons, obtaining further details of a diamond listing, providing a user preference regarding a listing, providing additional information regarding a listing, and so on.

The method 600A shown and described with respect to FIG. 6A is one example of a method for providing updated listings in response to receiving a user input. In various embodiments, the method 600A may include different and/or additional operations, and certain operations may be performed in different orders and/or omitted from the method. For example, operation 608 may be omitted, and the presentation order may be determined using the set of diamond listings. The description of FIG. 6A refers generally to diamond listings, but the description is applicable to other types of stone and/or setting listings as well.

Figure 6B:
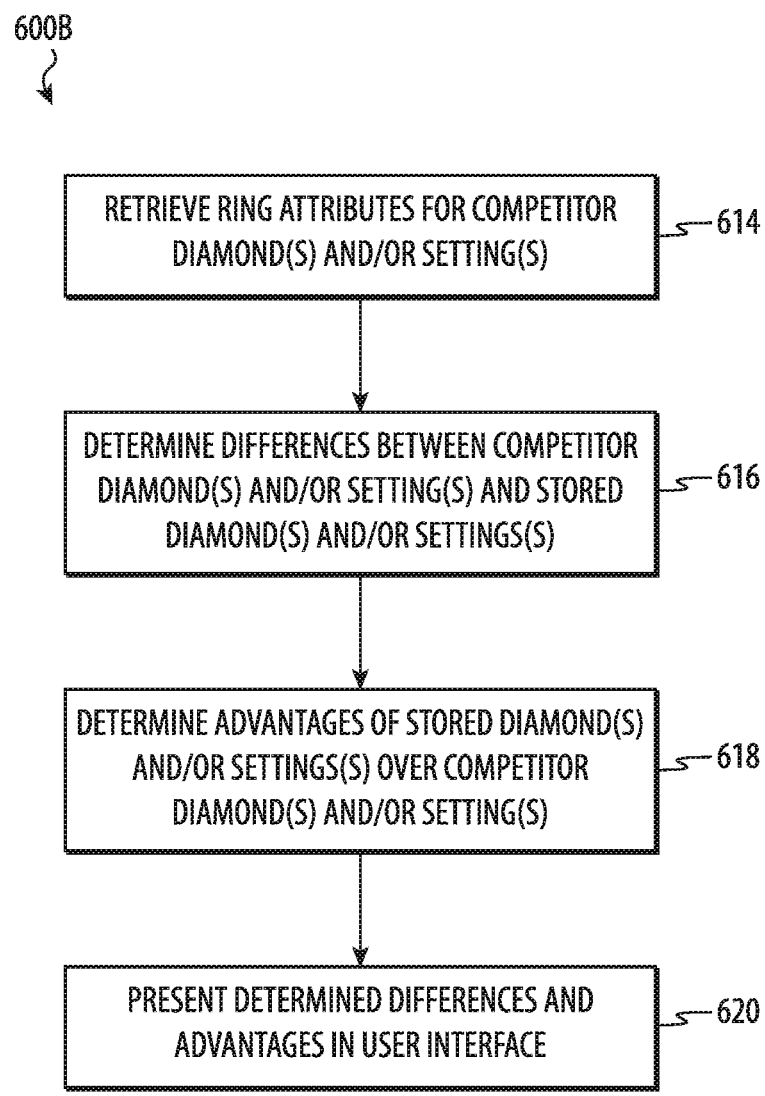
FIG. 6B is a flowchart of an example method for determining and presenting comparison information for diamonds and/or settings stored at the diamond selection system.

FIG. 6B is a flowchart of an example method 600B for determining and presenting comparison information for diamonds and/or settings stored at the diamond selection system. The method 600B may be operated on a diamond selection system, such as described above with respect to FIGS. 1 and 2. The method 600B may be a continuation of the methods 500 or 600A. At operation 614, the diamond selection system retrieves ring attributes for one or more competitor diamonds and/or settings. For example, the diamond selection system may retrieve competitor information from a third-party system.

At operation 616, the diamond selection system determines one or more differences between the one or more competitor diamonds and/or settings and one or more diamonds and/or settings of the diamond selection system. For example, the diamond selection system may determine differences between a diamond and/or setting of a displayed listing with one or more competitor diamonds and/or settings. The diamond selection system may determine differences by comparing ring attributes of the diamonds and/or settings. The diamond selection system may determine differences by determining if ring attributes of compared diamonds and/or settings differ by more than a predetermined threshold.

The diamond selection system may select diamonds and/or settings for comparison based on the diamonds and/or settings having similar ring attributes. For example, the diamond selection system may select a competitor diamond having a similar weight or other ring attributes compared to a diamond of the diamond selection system.

At operation 618, the diamond selection system determines advantages of the one or more diamonds and/or settings of the diamond selection system compared to the one or more competitor diamonds and/or settings. Additionally or alternatively, in operation 618, the diamond selection system may determine disadvantages or other relative comparison of the one or more competitor diamonds or settings. The advantages and/or disadvantages may be ring attributes that are associated with a higher quality diamond and/or setting. The advantages and/or disadvantages with regard to certain ring attributes may explain differences in other ring attributes, such as price. For example, a diamond and/or setting of the diamond selection system may cost more than a competitor diamond and/or setting, but the diamond and/or setting of the diamond selection system may feature a higher quality cut or clarity that accounts for the difference in price. Similarly, whole the competitor diamond and/or setting may be less expensive, there may be disadvantages or inferior qualities of the competitor's product that may be identified.

At operation 620, the diamond selection system presents the comparison information (e.g., the determined differences, advantages, disadvantages) in a user interface. In some cases, the comparison information is presented as part of a diamond, setting, or ring listing. In some cases, the comparison information is presented along with additional information about a competitor diamond or setting, as described in more detail with respect to FIG. 13K. The comparison information may be a short narrative that explains the difference in the products that may account for a difference in price. The narrative typically includes a qualitative description of the differences in a quantitative measure between two products. The comparison information may explain the various advantages and/or disadvantages of a variation or difference in the features of two or more diamonds and/or settings.

The method 600B shown and described with respect to FIG. 6B is one example of a method for determining and presenting comparison information for diamonds and/or settings stored at a diamond selection system. In various embodiments, the method 600B may include different and/or additional operations, and certain operations may be performed in different orders and/or omitted from the method. For example, operation 616 and/or 618 may be omitted, and the comparison information may include either differences or advantages. In some cases, one or more of the steps 614-620 of FIG. 6B may be performed in response to a diamond and/or setting listing being provided to a user. In some cases, one or more of the steps 614-618 of FIG. 6B may be performed as part of routine operations or in advance of display of a particular diamond and/or setting listing, and the differences and/or advantages may be stored or otherwise maintained by the diamond selection system until a diamond and/or setting listing is formulated.

One may appreciate that although many embodiments are disclosed above, the operations and steps presented with respect to methods and techniques described herein are meant as exemplary and accordingly are not exhaustive. One may further appreciate that alternate step order or fewer or additional operations may be required or desired for particular embodiments.

Figure 7:
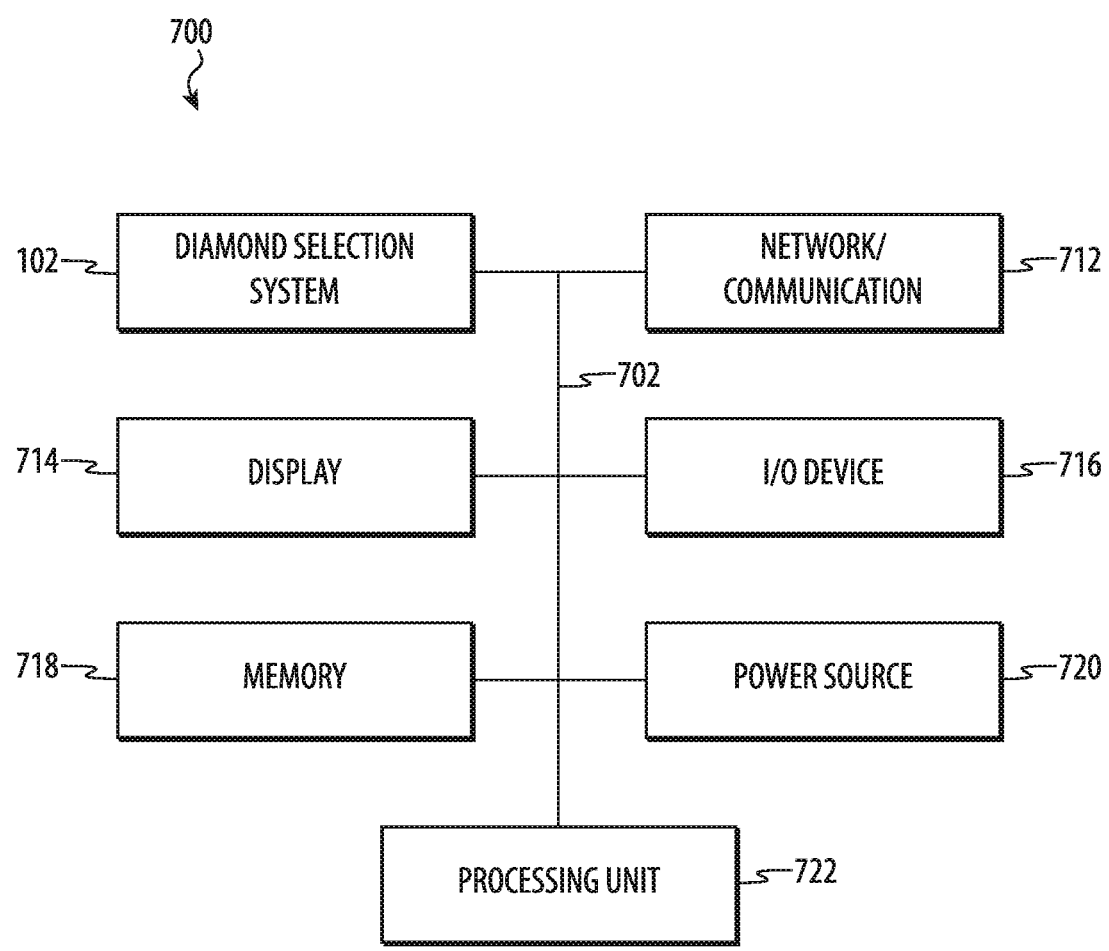
FIG. 7 is an illustrative block diagram of an electronic device.

FIG. 7 is an illustrative block diagram of an electronic device 700. The electronic devices (e.g., electronic devices 108) and/or the application servers (e.g., application server 110) described herein may include some or all of the components described with respect to the electronic device 700. The electronic device 700 can include a network communications interface 712, a display 714, one or more input/output (I/O) devices 716, memory 718, a power source 720, and/or one or more processing units 722. As shown in FIG. 7, the electronic device 700 may include one or more components of the diamond selection system 102 as described herein.

The display 714 may provide an image or graphical output (e.g., computer-generated image data) for the electronic device. The display may also provide an input surface for one or more input devices, such as, for example, a touch sensing device and/or a fingerprint sensor. The display 714 may be substantially any size and may be positioned substantially anywhere on the electronic device. The display 714 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. The display 714 provides a graphical output, for example, associated with an operating system, user interface, and/or applications of the electronic device 700. In some embodiments, the display 714 is configured as a touch-sensitive (e.g., single-touch, multi-touch) and/or force-sensitive display to receive inputs from a user. In some embodiments, the touch-sensitive display includes one or more sensors (e.g., capacitive touch sensors, ultrasonic sensors, or other touch sensors) positioned above, below, or integrated with the display. In various embodiments, a graphical output of the display 714 is responsive to inputs provided to the electronic device 700.

The processing unit 722 can control some or all of the operations of the electronic device. The processing unit 722 can communicate, either directly or indirectly, with substantially all of the components of the electronic device. For example, a system bus or signal line 702 or other communication mechanisms (e.g., electronic connectors) can provide communication between the processing unit(s) 722, the memory 718, the I/O device(s) 716, the power source 720, and/or the network communications interface 712. The one or more processing units 722 can be implemented as any electronic device capable of processing, receiving, or transmitting data or instructions. For example, the processing unit(s) 722 can each be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 718 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 718 can be configured as any type of memory. By way of example only, the memory can be implemented as random access memory, read-only memory, Flash memory, removable memory, or other types of storage elements, or combinations of such devices.

The one or more I/O devices 716 can transmit and/or receive data to and from a user or another electronic device. The I/O device(s) 716 can include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard.

The power source 720 can be implemented with any device capable of providing energy to the electronic device. For example, the power source 720 can be one or more batteries or rechargeable batteries, or a connection cable that connects the electronic device to another power source such as a wall outlet.

The network communication interface 712 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 7 is for illustrative purposes only. In other examples, an electronic device may include fewer or more components than those shown in FIG. 7. Additionally or alternatively, the electronic device can be included in a system, and one or more components shown in FIG. 7 are separate from the electronic device but included in the system. For example, an electronic device may be operatively connected to, or in communication with, a separate display. As another example, one or more applications can be stored in a memory separate from the wearable electronic device. The processing unit in the electronic device can be operatively connected to and in communication with the separate display and/or memory.

Figure 8A:
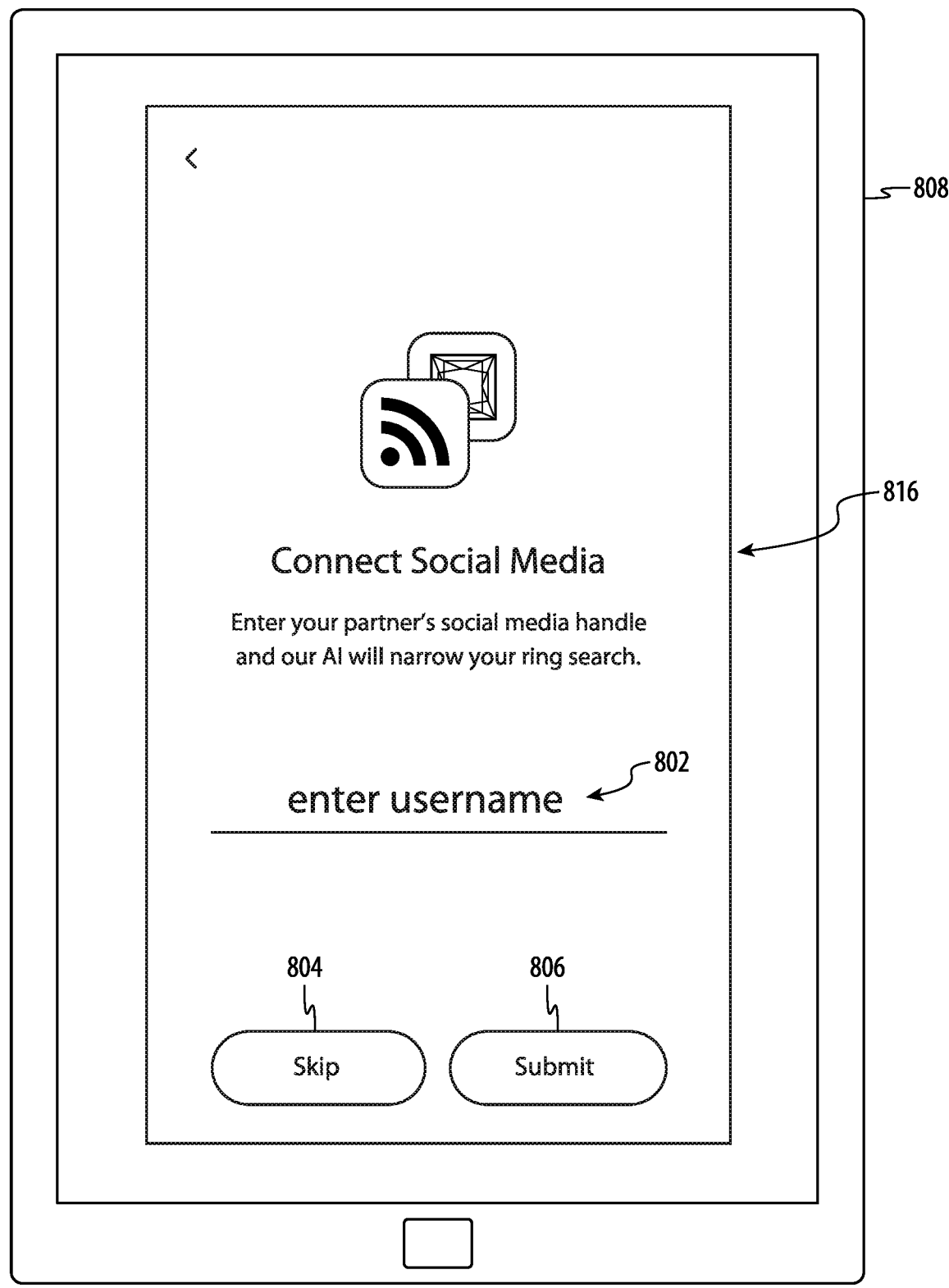
FIGS. 8A-8C depict an example portion of a user interface generated on a portal (e.g., a remote portal)
Figure 8B:
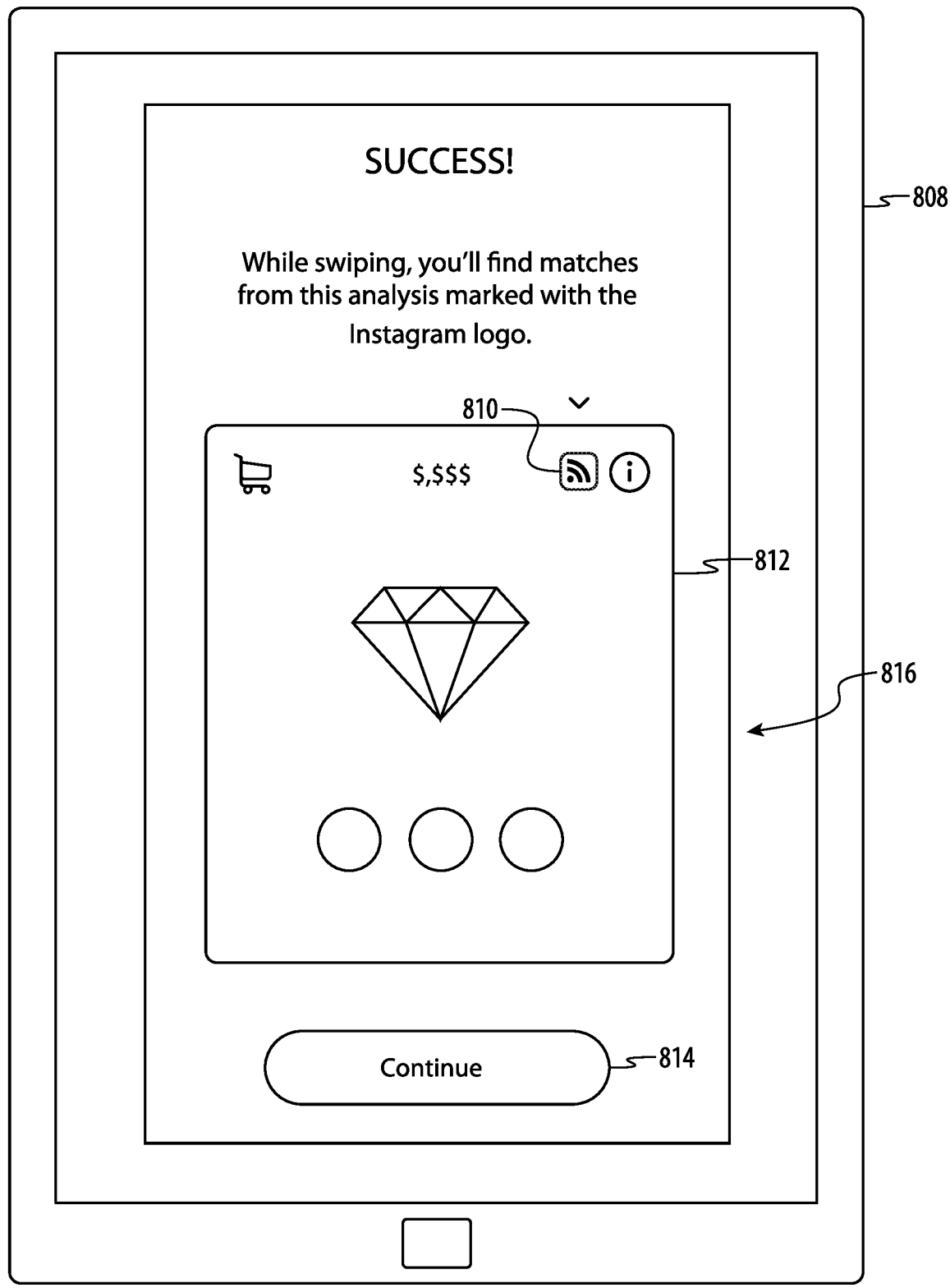
Figure 8C:
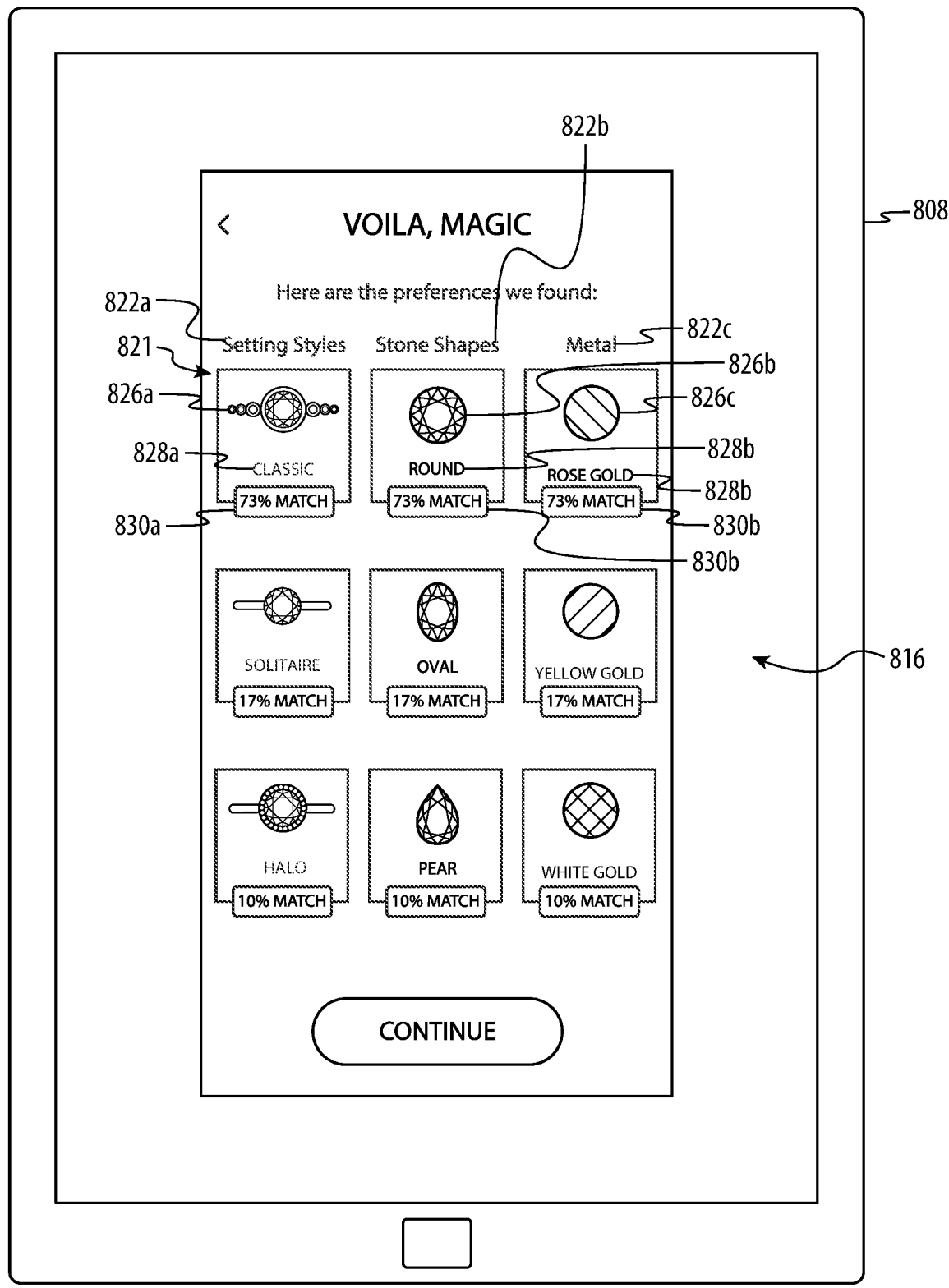

FIGS. 8A-8C depict an example portion of a user interface generated on a portal (e.g., a remote portal). The user interface may be used to implement the diamond selection system and/or diamond search interface. In particular, a user may access the diamond selection system or diamond search interface using the portal, operating on a computing device 808 similar to the computing devices discussed herein. In the implementation shown in FIGS. 8A-8C, the portal to the diamond selection system or diamond search interface may be an application running on a personal mobile device and/or may be accessed and/or displayed using a web browser or other similar Internet-enabled application. The portal may be used to access a website or may operate through another application executed on the computing device.

In the present example, the portal includes a portion of a user interface 816 on a display of the computing device 808. The computing device 808 may be a personal mobile device, such as a tablet or smartphone. This is provided as merely an illustrative example. In other embodiments, the computing device 808 may include, without limitation, a desktop computing system, a notebook computing system, a terminal, an electronic kiosk, or other computing device configured to operate a portal. In the present example, the user interface 816 may include one or more portions that allow for interaction with the portal, the diamond selection system and/or one or more third-party systems.

As shown in FIG. 8A, the portion of the user interface 816 may include an element 802 that allows a user to enter a social media username that is associated with a user account of a social media network. As described above, a user of the user interface 816 may be shopping a diamond and/or setting for themselves or for another person (e.g., a recipient), such as a significant other. The user may enter the social media username of the recipient of the diamond and/or setting so that predicted ring attributes may be determined based on the recipient's social media activity. In some cases, the user may connect a social media account (e.g., a user account of a social media network) or otherwise provide input data to the diamond selection system in alternate ways without having to provide an express username and/or password. For example, the user may connect a social media account using an API or other interface provided by a social media network associated with the user account. In some cases, the user may proceed by selecting a submit element 806. In some cases, the user may skip the step of providing social media information or other user input data, for example, using the skip element 804.

FIG. 8B depicts an example portion of the user interface 816 provided in response to a user successfully connecting a social media account with the diamond selection system. The user interface 816 provides a sample diamond listing 812 that includes an indicator 810 that identifies the diamond listing as determined using social media data associated with the social media account. The portion of the user interface 816 allows the user to continue using element 814.

FIG. 8C depicts an example portion of the user interface 816 provided in response to determining predicted ring attributes, such as described above with respect to FIGS. 2 and 3. The user interface 816 may provide one or more entries 821 for one or more categories of predicted ring attributes (e.g., setting style 822a, stone shape 822b, and metal 822c). Each entry 821 may include one or more of a ring attribute image 826a, 826b, 826c, a ring attribute descriptor 828a, 828b, 828c, or a prediction metric 830a, 830b, 830c. The entries may indicate a predicted ring attribute (e.g., a classic setting style) and a prediction metric for the predicted ring attribute (e.g., 73% prediction confidence). In some cases, the predicted ring attributes are sorted in order of a highest prediction metric, as shown in FIG. 8C. In some cases, not all determined predicted ring attributes are displayed.

Figure 9A:
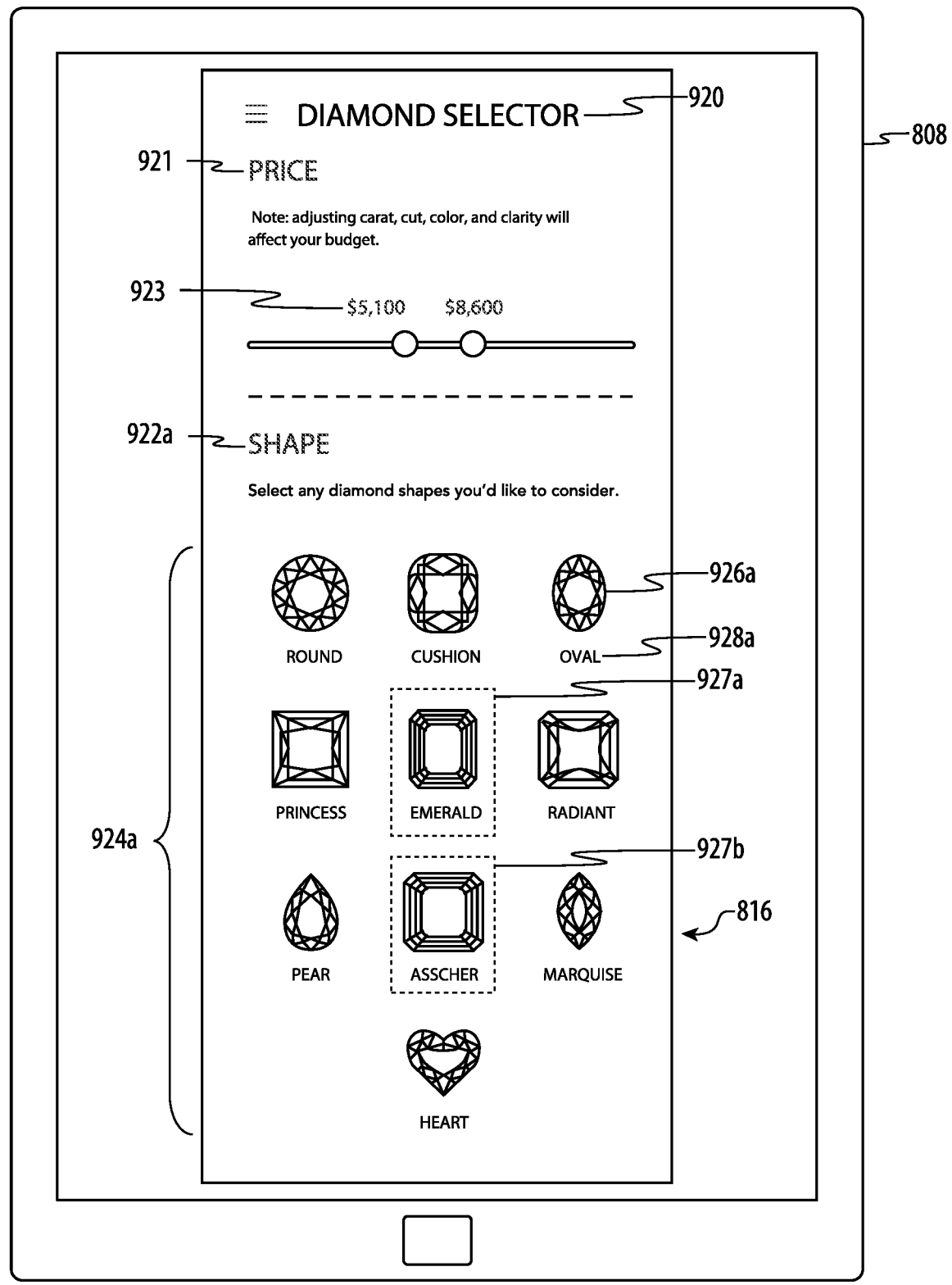
FIGS. 9A-9B depict an example user interface generated by the diamond selection system and displayed in the portal on a user computing device.

FIGS. 9A-11F depict portions of the user interface 816 for presenting diamond listings to users. As shown in FIG. 9A, one portion of the user interface 816 includes a title 920 of the diamond selection system and/or other information, such as instructions on interacting with the diamond selection system.

In some embodiments, another portion of the user interface 816 includes selectable items that may be used to present search parameters to users and/or receive modifications to the search parameters from users for a search of the diamond selection system.

Figure 9B:
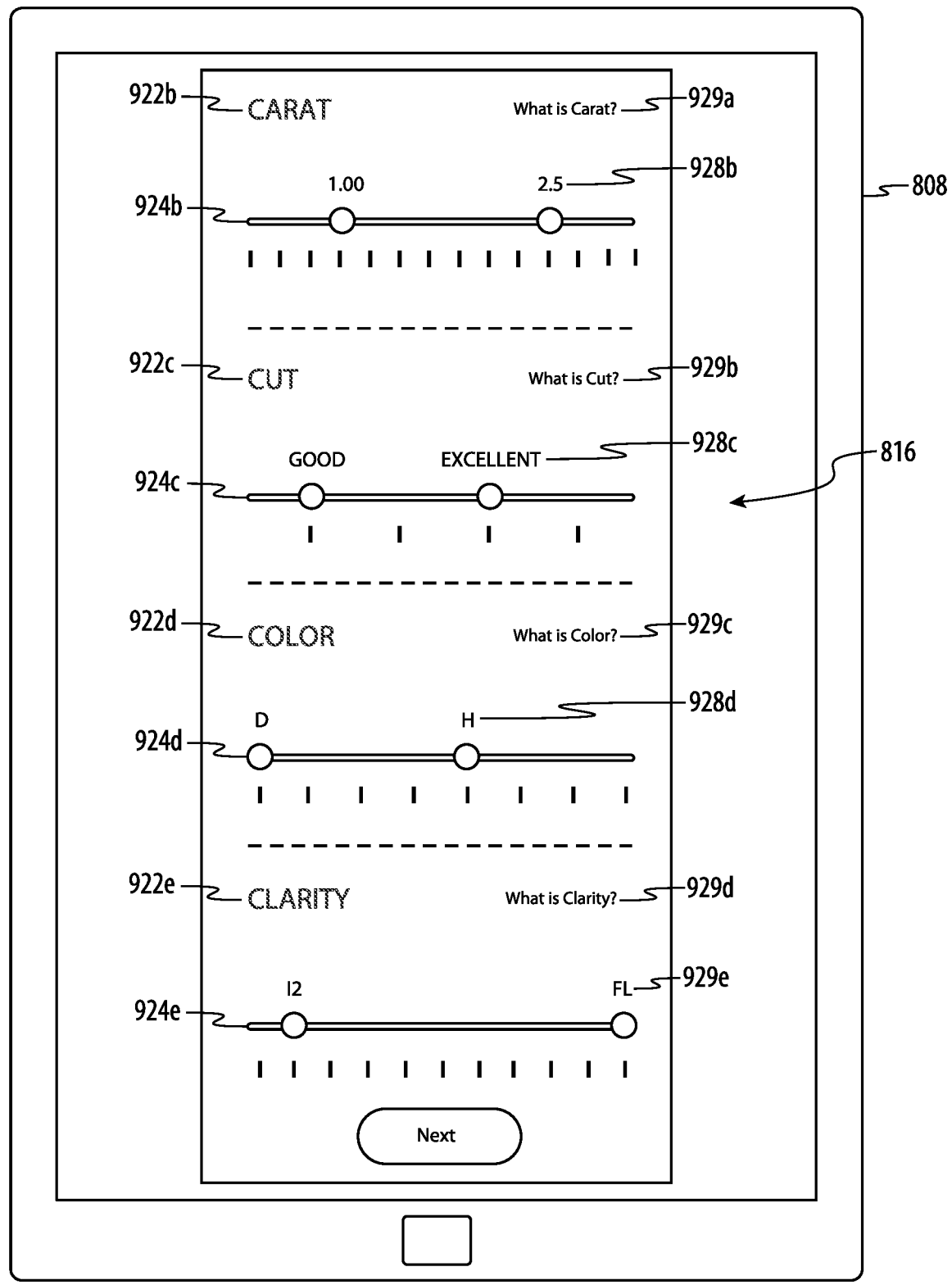

As discussed above, in some embodiments, some or all of the search parameters may be determined based on predicted ring attributes determined by analyzing input data, such as social media data. In some embodiments, some or all of the search parameters may be received from and/or modified by a user. In some embodiments, one or more search parameters may be pre-selected or pre-populated when the preference selection interface of FIGS. 9A-10 is curated to present search parameters to the user for modification and/or approval to proceed with the search. As shown in FIGS. 9A and 9B, search parameters may be pre-populated based on determined search parameters. For example, values, ranges, or other selectors may be pre-selected according to determined search parameters. In various embodiments, search parameters and/or modifications to determined search parameters may be received from the user and/or from a user profile that has been saved. In some embodiments, the user interface may include an option to save search parameters. Search parameters may be saved to a user profile, temporarily saved within a session, or otherwise stored for later retrieval. The saved search parameters may be stored and recalled during a subsequent session or later on during the same session. Accordingly, a user may use the save option to save search parameters, search results, or later modified search parameters and/or results. In some instances, the save option may store the search parameters, the search results, and/or other session-related activities or settings.

In some embodiments, the search parameters include a price and/or one or more search categories. A portion of the user interface 816 includes a price range 921 that may include a slider 923 that allows a user to select a price range for the search. Another portion of the user interface 816 includes searchable diamond features or search categories 922a-922e. In the present embodiment, the search categories 922a-922e are represented by one or more corresponding selectable graphical elements. Each diamond feature or search category 922a-922e includes selectable search options 924a-924e, that correspond to a diamond feature graded along a scale (e.g., set of values). The scale may be continuous, graduated, or may correspond to a series of grades or values associated with the particular diamond feature or search category. The user may enter the search parameters by selecting one or more of the selectable search options 924a-924e. The searchable diamond features or search categories 922a-922e may include the diamond shape 922a, weight (in carats) 922b, cut 922c, color 922d, and clarity 922e. In some embodiments, additional or fewer diamond features may be included in the user interface 816.

With respect to the searchable diamond feature or search categories 922a-922e, a first diamond feature or search category may be the shape of the diamond 922a. The user interface 816 includes the shape of the diamond 922a as an input category. The selectable search options 924a may include an image 926a representing the shape and/or text 928a. The image 926a included in the shape category 922a may be an image representative of the shape. The text 928a included in the shape category 922a may be text relevant to the shape category, such as text describing shapes and/or a selected shape.

The user may select one or more shapes from the selectable text and/or images by interacting with the corresponding text and/or image. For example, a user that wishes to search for round shaped diamonds may select (e.g., by touching a corresponding region of a touch-sensitive display) the text and/or image corresponding to the round shape. In some embodiments, the user may select one option for shape, while in other embodiments the user may select multiple options for shape. As shown in FIG. 9A, the user interface may display indicators (e.g., 927A and 927B) that indicate a selected shape (either by user selection or preselection). In some cases, users may select a selected shape to de-select the shape, which may remove the indicator.

Turning to FIG. 9B, a second diamond feature or search category may be the weight 922b of the diamond. The user interface 816 includes the weight of the diamond 922b as an input category. The selectable search options 924b may include a slider that allows a user to select a range of weights. The user interface 816 may further include text 928b that indicates the range of weights selected. In some embodiments, the user may select one option for weight, while in other embodiments the user may select multiple options and/or a range of options for weight.

A third diamond feature or search category may be the cut of the diamond 922c. The user interface 816 includes the quality of the cut 922c as a category or field to be searched. The selectable search options 924c may include a slider that allows a user to select a range of cut qualities. The user interface 816 may further include text 928c that indicates the cut qualities or range of cut qualities selected. In some embodiments, the user may select one option for cut, while in other embodiments the user may select multiple options and/or a range of options for cut.

A fourth diamond feature or search category may be the color of the diamond 922d. The user interface 816 includes the color 922d as a category or field to be searched. The selectable search options 924d may include a slider that allows a user to select a range of colors. The user interface 816 may further include text 928d that indicates the colors or range of colors selected. In some embodiments, the user may select one option for color, while in other embodiments the user may select multiple options and/or a range of options for color.

A fifth diamond feature or search category may be the clarity of the diamond 922e. The user interface 816 includes the clarity 922e as a category or field to be searched. The selectable search options 924e may include a slider that allows a user to select a range of clarity ratings. The user interface 816 may further include text 928e that indicates the clarity ratings or range of clarity ratings selected. In some embodiments, the user may select one option for clarity, while in other embodiments the user may select multiple options and/or a range of options for clarity.

In some embodiments, the categories or fields to be searched and the search parameters (e.g., search values) themselves may be represented in different ways, including using images, sliders, text, other graphical elements, or some combination thereof. In some embodiments, the user interface 816 may further include information elements 929a-d. In response to the information elements 929a-d being selected, the user interface 816 may display additional information about a category or field, including images, descriptions, and the like.

Figure 10A:
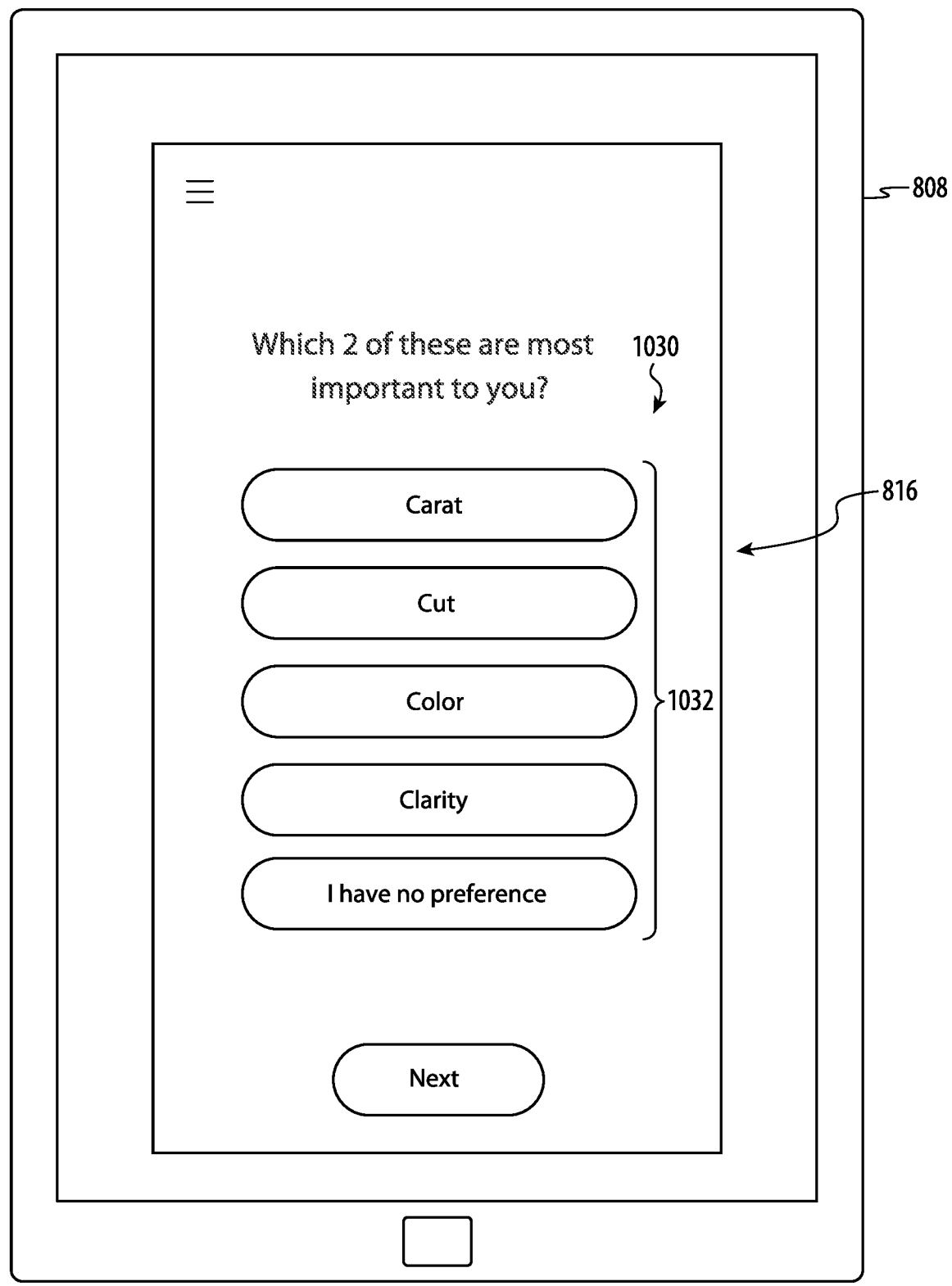
FIGS. 10A-10B depict an example user interface generated by the diamond selection system and displayed in the portal on a user computing device.
Figure 10B:
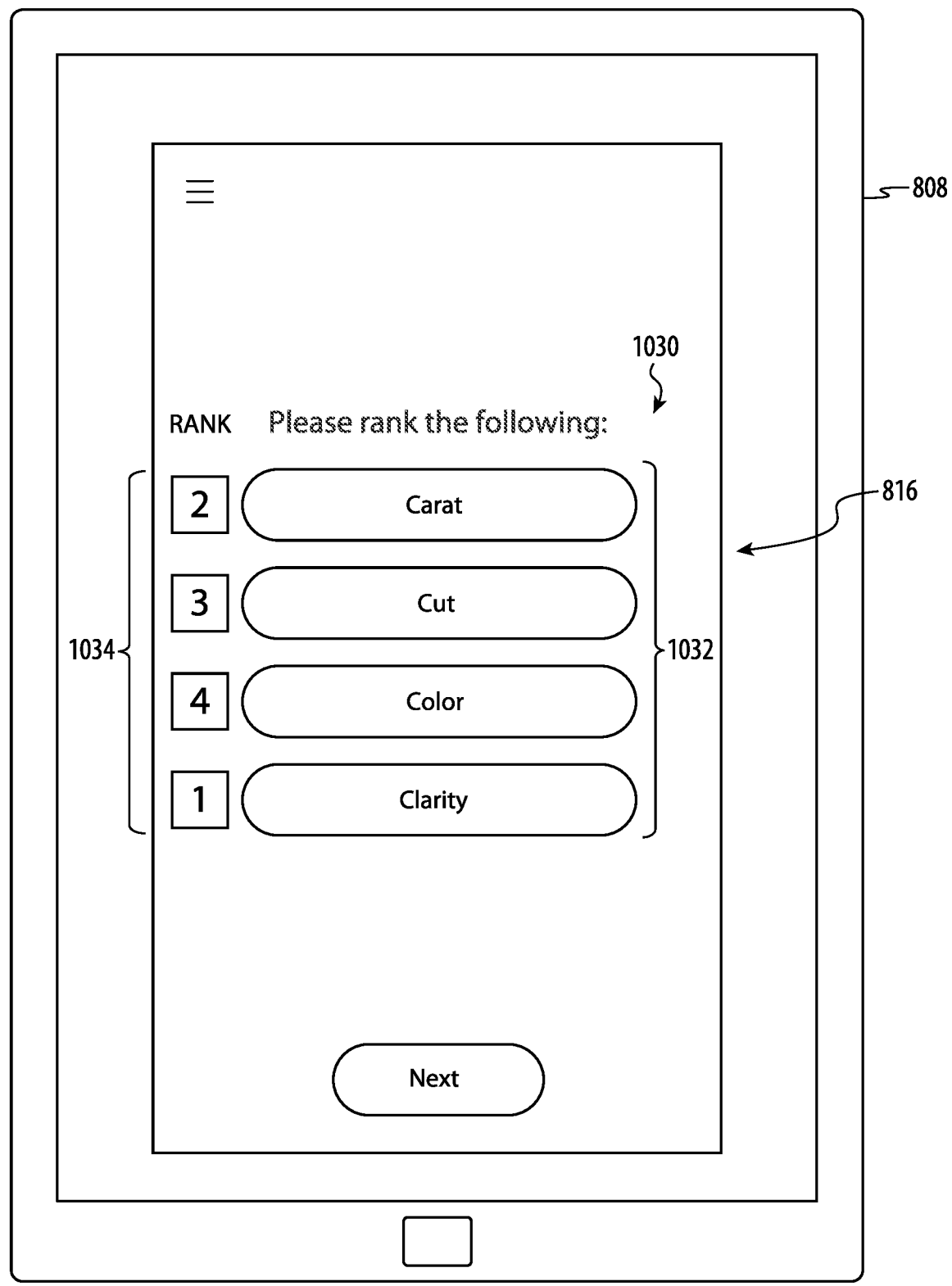

Turning to FIGS. 10A and 10B, another portion of the user interface may include a diamond feature ranking 1030. The diamond selection system may receive a ranking (e.g., a relative ranking) of diamond features and/or price, for example, by receiving a user input at the feature ranking 1030. The diamond feature ranking 1030 includes selectable options 1032 to rank the search results according to preferred diamond features 1034. In some cases, as shown in FIG. 10A, the diamond feature ranking 1030 requests that a user select one, two, or more of the options 1032 that are most important (e.g., ranked over other, non-selected features). In some cases, as shown in FIG. 10B, the diamond feature ranking 1030 requests that a user rank the options 1032 according to importance using ranking options 1034. The ranking may be applied by the user at any time during the selection process and may be updated or modified after receiving search results.

Some or all of the diamond features 922a-922e may be included as preferred or ranked diamond features. The user may select a preference for one or more diamond features over others. For example, as depicted, the user may indicate that weight and clarity are more important than cut and color. The selectable ranking options 1032 indicate to the diamond selection system that the user prefers diamonds according to the selected diamond features. Accordingly, when the search is submitted to the diamond selection system, search results may be populated in accordance with the selected diamond features.

As discussed above, the search parameters may be used to conduct a search of the database to determine search results (e.g., a set of listings to be provided via the portal). For example, the diamond selection system may retrieve a set of diamond listings according to the search parameters. In some cases, the set of listings consists of all of the diamond listings that match the search parameters. For example, the set of listings may consist of diamond listings that are retrieved from the database that match the search parameters. The set of listings may be further curated based on the ranking of the various search categories. In some embodiments, the diamond selection system determines a subset of diamond listings according to the search parameters and the ranking. In particular, those diamond listings of the set of listings that are more closely matched to search categories that the user indicated as having a higher rank or preference may be selected over diamond listings that are less closely matched to higher ranked search categories.

Furthermore, in some implementations, the search results may be presented according to a presentation order, in which listings are ordered in accordance with the rank or preference of the various search categories with diamond listings having the closest match for the highest ranked search category earlier or higher in the presentation order. In some embodiments, the diamond selection system determines a presentation order for the subset of diamond listings (or other search results) based on the search parameters and/or the ranking. In various embodiments, the search results are presented one at a time. In other embodiments, multiple search results are displayed simultaneously.

In various embodiments, the diamond selection system may receive and/or determine modified or updated search parameters, modified or updated ranking of diamond features, and/or modified or updated presentation order. The modified search parameters, ranking, or presentation order may be used to determine a modified set of listings from the database, a modified or updated subset of listings and/or a modified or updated presentation order. For example, users may indicate preferences, provide feedback or other user inputs in response to one or more search results that may be used to modify or update the search parameters, the rankings, and/or the presentation order as discussed in more detail below. In various embodiments, in response to the search parameters, the relative rank of diamond features, and/or the presentation order being modified or updated, the diamond selection system determines an updated set of diamond listings, an updated subset of diamond listings, and/or an updated presentation order. In response to the set and/or subset of diamond listings being modified or updated, the diamond selection system may update the presentation order.

In some embodiments, the diamond selection system may receive preferences (e.g., by user input) regarding a diamond listing or a series of preferences regarding multiple diamond listings. In some embodiments, the diamond selection system updates search parameters and/or the ranking in response to the received preferences or series of preferences. In some embodiments, the diamond selection system retrieves a new set of diamond listings, determines a new subset of diamond listings and/or determines a new presentation order in response to the received preferences or series of preferences.

Figure 11A:
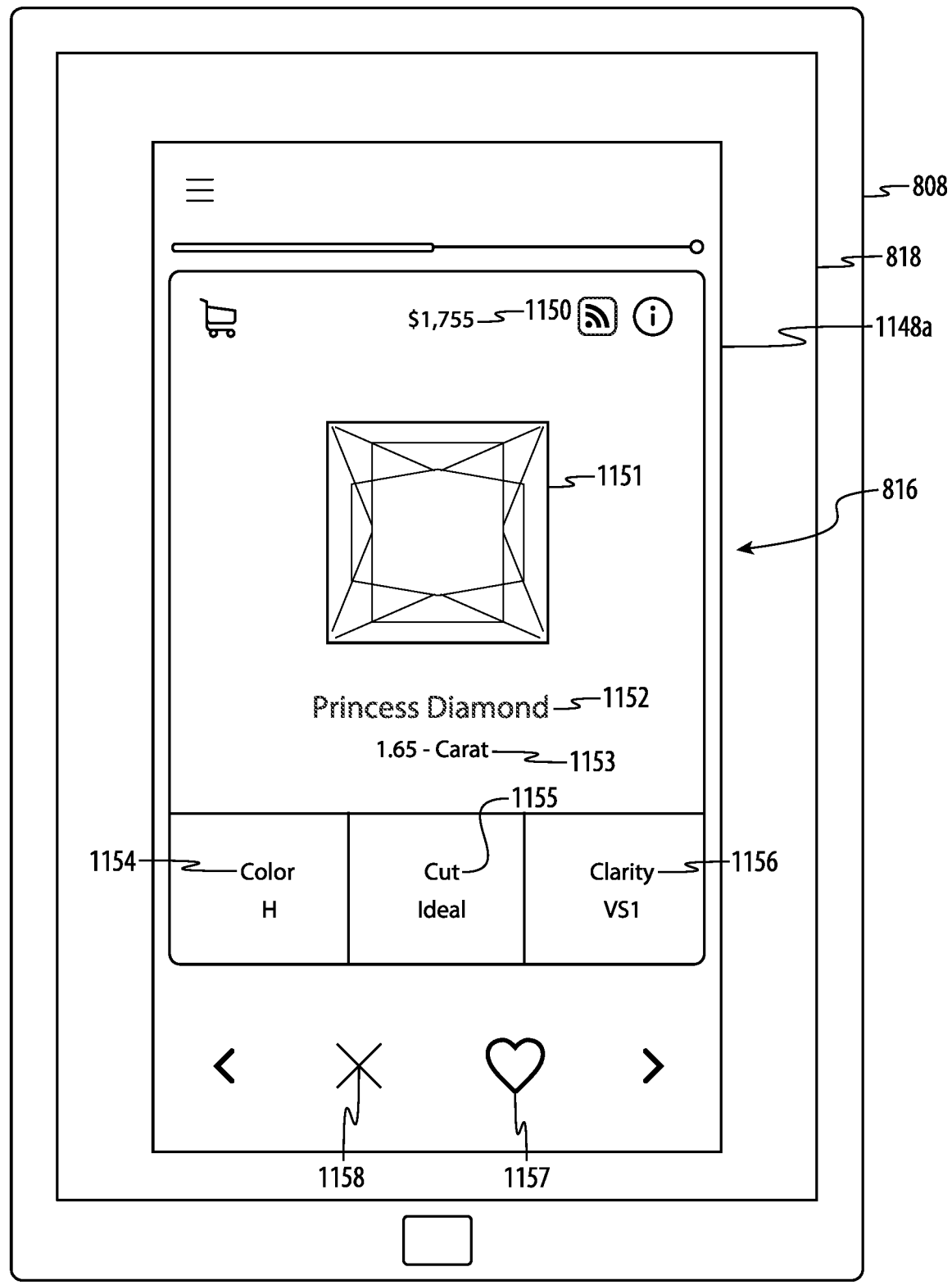
FIGS. 11A-11F depict example search results generated in response to search preferences received by the diamond selection system.

Turning to FIGS. 11A-11F, a portion of the user interface 816 for presenting diamond listings and receiving user preferences is shown. In various embodiments, the user interface 816 presents diamond listings in response to determining predicted ring attributes and/or a search. As depicted in FIG. 11A, a diamond listing 1148a is displayed by the diamond selection system on the display of a user computing device 808. In various embodiments, one or more diamond listings 1148a may be displayed in the user interface 816, for example, according to the presentation order. For example, the diamond listing 1148a may be a first listing in a presentation order of a subset of listings determined by the diamond selection system. In some embodiments, diamond listings are displayed sequentially (e.g., one after another). The diamond listing 1148a may include diamond features and/or information, including one or more of a price 1150, a diamond image 1151, a diamond descriptor 1152 (e.g., a shape), a diamond weight 1153, a color 1154, a cut 1155, and a clarity rating 1156.

The diamond listing 1148a may further include elements for users to provide user inputs regarding the diamond listing 1148a. For example, the diamond selection system may receive one or more user inputs indicating a preference regarding the diamond listing 1148a and/or additional diamond listings. For example, the diamond listing 1148a may include preference indicators 1157, 1158 for the user to indicate a preference regarding the diamond listing 1148a (e.g., that the user likes or does not like the diamond in the diamond listing 1148a). For example, a user may select or otherwise interact with the favorite indicator 1157 to indicate that the user likes the diamond in the diamond listing 1148a (e.g., a positive preference). Similarly, a user may select or otherwise interact with the discard indicator 1158 to indicate that the user does not like the diamond in the diamond listing 1148a (e.g., a negative preference).

In some embodiments, users may indicate a preference regarding the diamond listing 1148a using gestures, such as taps, swipes, or other interactions. For example, the user computing device 808 may include a touch-sensitive display, and a user may swipe or drag the diamond listing 1148a using the touch-sensitive display of the user computing device 808 to indicate a preference regarding the diamond listing 1148a. The direction of the swipe that corresponds to each preference may correspond to the preference indicators 1157, 1158. For example, swipe to the left may indicate that a user does not like the diamond, and a swipe to the right may indicate that the user does like the diamond. Alternatively or additionally, different swipe directions and/or gestures may be used to indicate preferences.

Figure 11B:
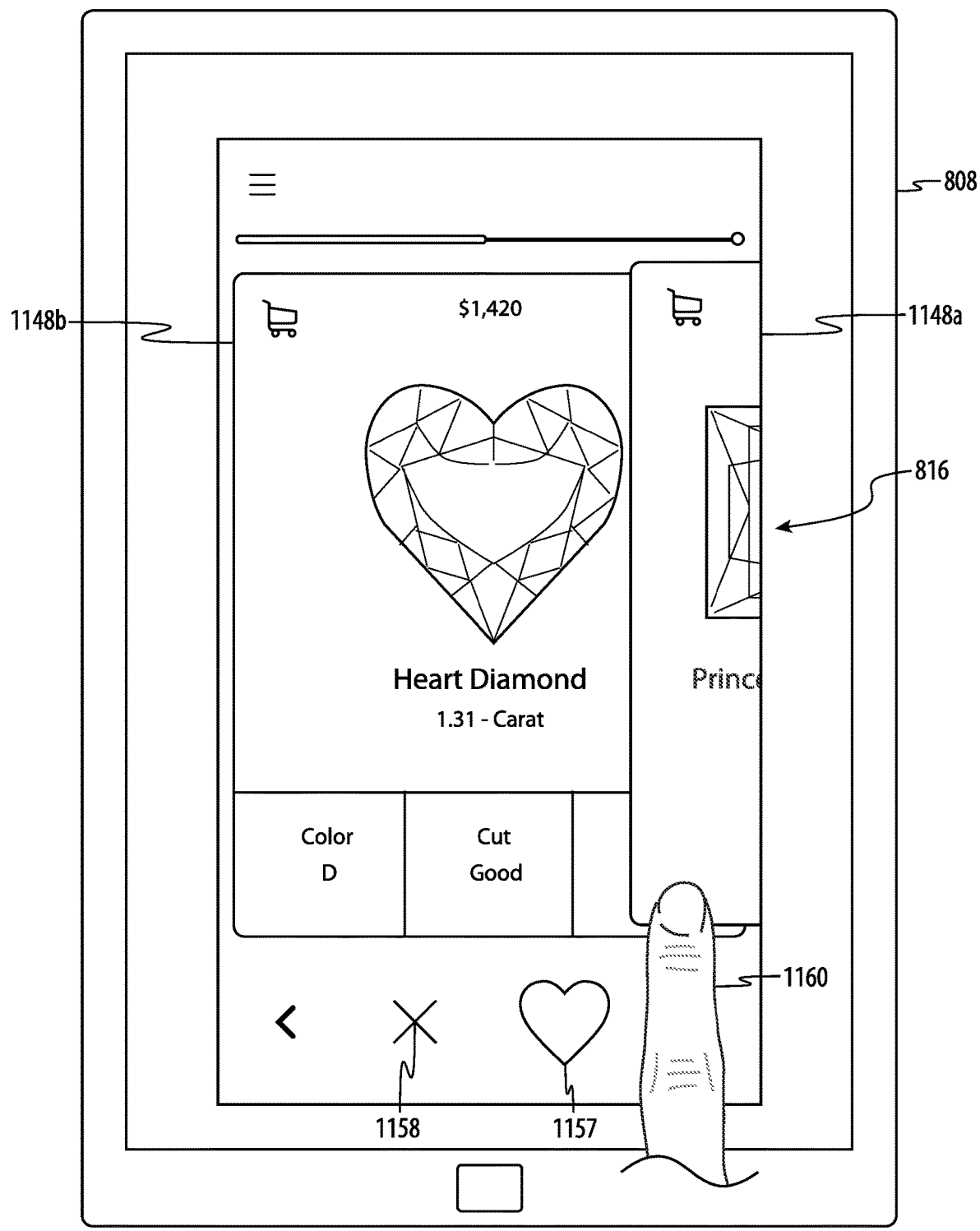
Figure 11C:
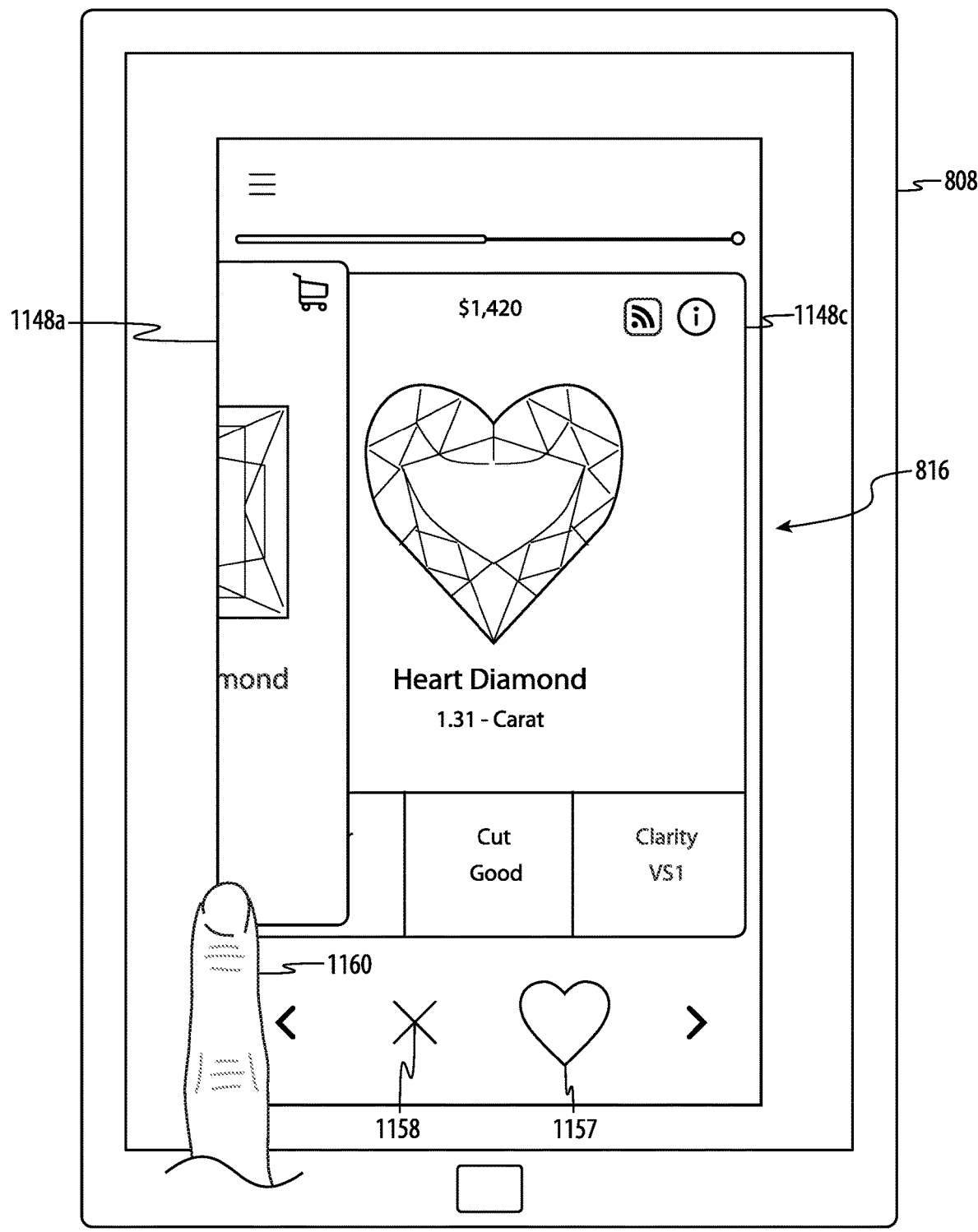

In some embodiments, in response to a user indicating a preference, the diamond listing 1148 is no longer displayed and a new diamond listing is displayed in the user interface 816. FIGS. 11B and 11C depict transitions from the diamond listing 1148a to another diamond listing 1148b. In the embodiments of FIGS. 11B and 11C, the diamond listing 1148a transitions off of the display (e.g., slides according to a swipe or in the direction of an indicator). For example, in FIG. 11B, a finger 1160 swipes to the right while the diamond listing 1148a is displayed, and the diamond listing 1148a appears to slide off the display to the right, revealing a new diamond listing 1148b. In some embodiments, the new diamond listing 1148b is the next diamond listing in a presentation order determined by the diamond selection system. Similarly, in FIG. 11C, a finger 1160 swipes to the left while the diamond listing 1148a is displayed, and the diamond listing 1148a appears to slide off the display to the left, revealing a new diamond listing 1148c.

In some embodiments, the diamond selection system may update or modify the search parameters, the ranking, and/or the presentation order in response to receiving preferences or series of preferences from the user. In some embodiments, the diamond selection system retrieves a new set of diamond listings, determines a new subset of diamond listings and/or determines a new presentation order in response to the received preferences or series of preferences.

In some embodiments, the diamond selection system receives a series of preferences that correspond to multiple diamond listings. For example, the diamond selection system may receive a series of preferences by a user swiping or otherwise interacting with multiple sequentially or simultaneously presented diamond listings. In some embodiments, the diamond selection system determines whether the series of preferences indicates that the search parameters, the ranking, and/or the presentation order should be modified or updated.

In some embodiments, the diamond selection system determines one or more modification metrics that correspond to one or more search parameters. In various embodiments, the modification metrics indicate whether one or more search parameters, the ranking, and/or the presentation order should be updated. For example, the diamond selection system may determine whether a modification metric meets or exceeds a predetermined threshold, and in response to a modification metric meeting or exceeding the threshold, the diamond selection system may modify or update search parameters, the ranking, and/or the presentation order. Similarly, for example, the diamond selection system may determine whether a modification metric meets or is lower than a predetermined threshold, and in response to a modification metric meeting or being lower than the threshold, the diamond selection system may modify or update search parameters, the ranking, and/or the presentation order.

As an example, a modification metric may correspond to a round diamond shape and have an example threshold of 9. In response to the user indicating a negative preference for a listing with a round diamond, the modification metric may be increased from zero to five. In response to the user indicating a negative preference for an additional listing with a round diamond, the modification metric may be increased from five to ten. In response to the modification metric exceeding the threshold of 9, the diamond selection system may modify or update search parameters, the ranking, and/or the presentation order. For example, the diamond selection system may modify the search parameters to exclude listings with round diamonds.

The above example is illustrative and not meant to be limiting. In various embodiments, the modification metric may be a weighted average or other similar technique. For example, each positive (or negative) vote may have a pre-assigned value, which may increase (or decrease) a weighted average over time. Alternatively, the positive (or negative) voting may increment (or decrement) the running average or metric.

In various embodiments, the preference indicators 1157, 1158 provide visual feedback as a user indicates a preference. For example, as shown in FIG. 11B, the favorite indicator 1157 may change size, color, pattern, and/or some other characteristic to indicate that a user has selected the favorite indicator 1157 or made a gesture that corresponds to the favorite indicator 1157. Similarly, as shown in FIG. 11C, the discard indicator 1158 may change size, color, pattern, and/or some other characteristic to indicate that a user has selected the discard indicator 1158 or made a gesture that corresponds to the discard indicator 1158.

Figure 11D:
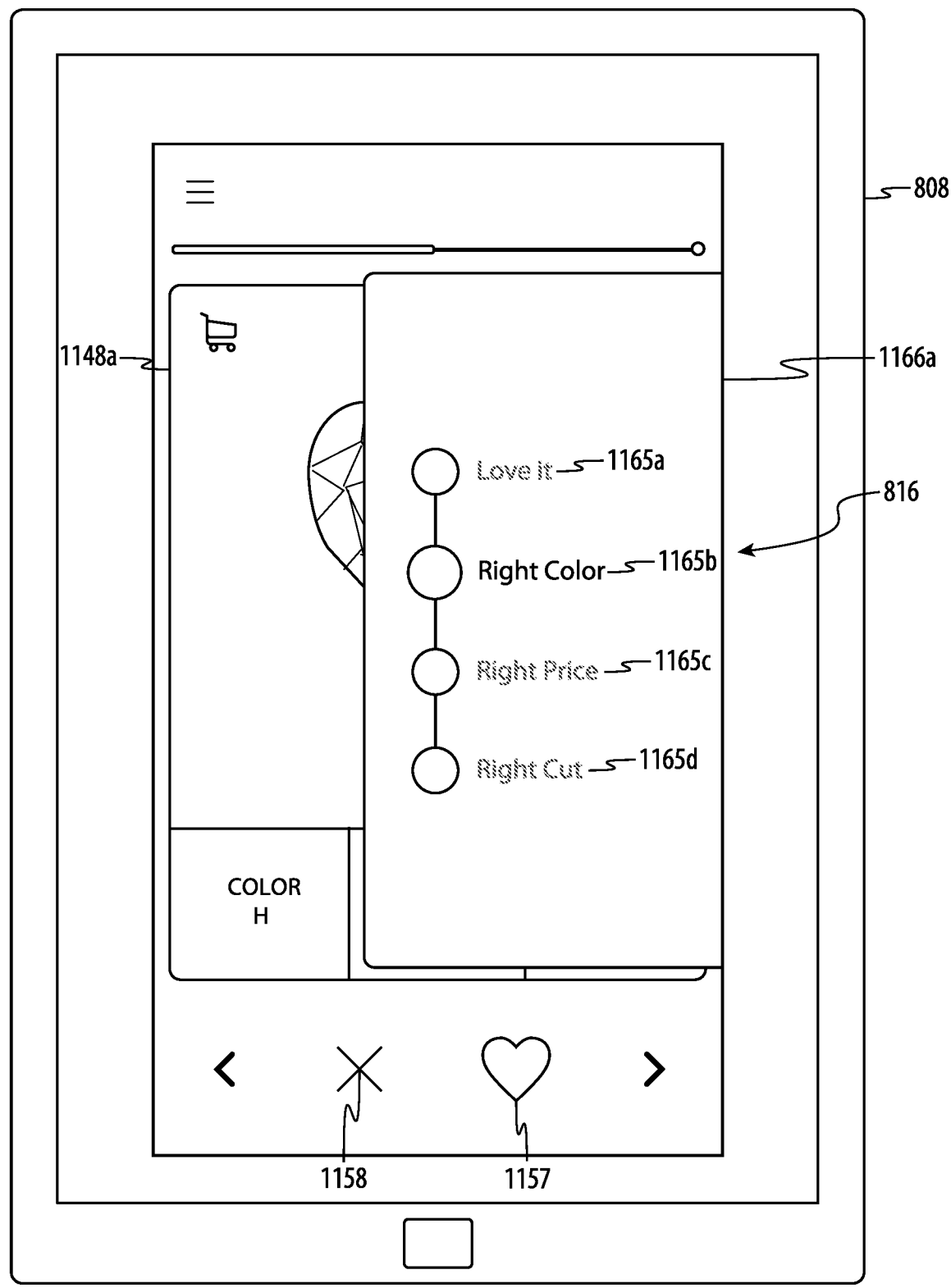
Figure 11E:
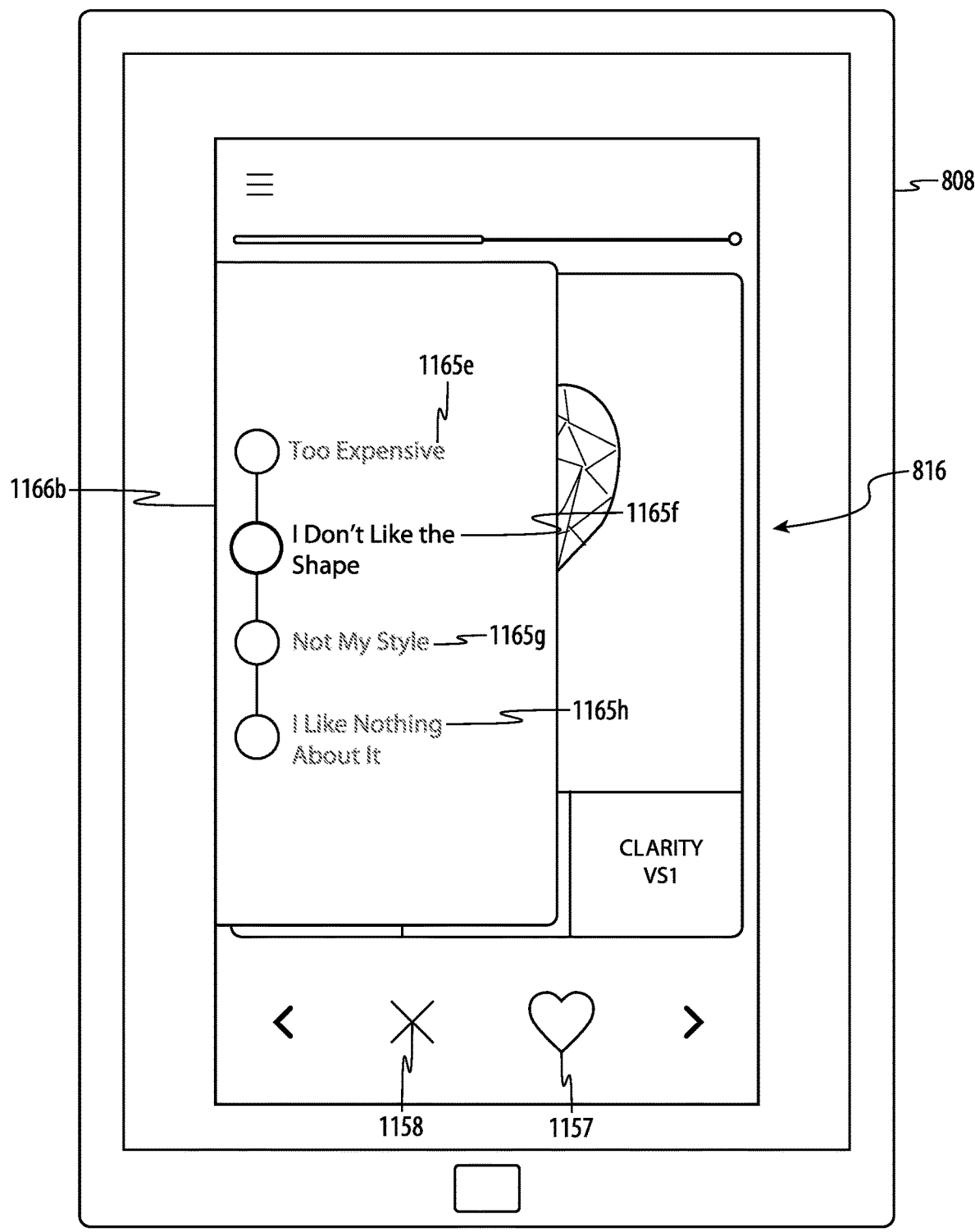

In some embodiments, the user may provide additional information regarding their selected preference for the diamond listing 1148a. For example, in response to a selection of a preference indicator and/or a gesture, the diamond selection system may display a prompt that allows a user to provide additional information about the diamond listing 1148a. FIGS. 11D and 11E depict example prompts 1166 displayed in the user interface 816, for example, in response to a user indicating a preference as described above. The prompts 1166 may provide one or more user-selectable options regarding the indicated preference. For example, as shown in FIG. 11D, in response to a user indicating a positive preference, the prompt 1166a may provide user-selectable options 1165a-d related to a user's reason for expressing a positive preference. Similarly, as shown in FIG. 11E, in response to a user indicating a negative preference, the prompt 1165b may provide user-selectable options 1165e-h related to a user's reason for expressing a negative preference. In various embodiments, the user may select one or more of the user-selectable options 1165 to provide feedback to the diamond selection system. In some embodiments, in response to the user selecting a user-selectable option 1165, the diamond selection system displays a new diamond listing 1148.

The user-selectable options 1165 may correspond to diamond features, search parameters, rankings, or some combination thereof. The diamond selection system may update the search parameters and/or rankings in response to the user selecting one or more user-selectable options. For example, in FIG. 11D, the user-selectable option 1165a ('Love it') may indicate that the user likes several or all of the diamond features and/or the price of the diamond in the diamond listing 1148a. In response to a selection of the user-selectable option 1165a, the diamond selection system may update the search parameters (e.g., determine revised or updated search parameters) to include one or more of the diamond features and/or the price of the diamond in the diamond listing 1148a. Additionally or alternatively, the diamond selection system may update the ranking (e.g., determine a revised or modified ranking) to rank one or more diamond features over one or more additional diamond features. Additionally or alternatively, the diamond selection system may update the presentation order. In some embodiments, the diamond selection system may alternatively or additionally determine an updated modification metric corresponding to one or more search parameters, as discussed above.

Similarly, the user-selectable option 1165b ('Right Color') may indicate that the user likes the color of the diamond in the diamond listing 1148a. In response to a selection of the user-selectable option 1165b, the diamond selection system may update the search parameters to include the color of the diamond in the diamond listing 1148a. The diamond selection system may additionally or alternatively update the search parameters to exclude one or more diamond colors, such as the colors besides the color of the diamond in the diamond listing 1148a. Additionally or alternatively, the diamond selection system may update the ranking, for example, to rank color over one or more diamond features. Additionally or alternatively, the diamond selection system may update the presentation order. In some embodiments, the diamond selection system may alternatively or additionally determine an updated modification metric corresponding to one or more search parameters, as discussed above.

The user-selectable option 1165c ('Right Price') may indicate that the user likes the price of the diamond in the diamond listing 1148a. In response to a selection of the user-selectable option 1165c, the diamond selection system may update the search parameters to include the price of the diamond in the diamond listing 1148a and/or adjust a price range. Additionally or alternatively, the diamond selection system may update the ranking to rank price over one or more diamond features. Additionally or alternatively, the diamond selection system may update the presentation order. In some embodiments, the diamond selection system may alternatively or additionally determine an updated modification metric corresponding to one or more search parameters, as discussed above.

The user-selectable option 1165d ('Right Cut') may indicate that the user likes the cut of the diamond in the diamond listing 1148a. In response to a selection of the user-selectable option 1165d, the diamond selection system may update the search parameters to include the cut of the diamond in the diamond listing 1148a. The diamond selection system may additionally or alternatively update the search parameters to exclude one or more diamond cuts, such as the cuts besides the cut of the diamond in the diamond listing 1148a. Additionally or alternatively, the diamond selection system may update the ranking to rank cut over one or more diamond features. Additionally or alternatively, the diamond selection system may update the presentation order. In some embodiments, the diamond selection system may alternatively or additionally determine an updated modification metric corresponding to one or more search parameters, as discussed above.

Although user-selectable options 1165 corresponding to cut, color, and price are shown as examples in FIG. 11D, the user-selectable options 1165 may correspond to any diamond features, other diamond listing characteristics, or combinations thereof. The user-selectable options 1165 may additionally or alternatively correspond to one or more additional preferences of the user, such as those relating to the user's fashion preferences, lifestyle, and the like.

Turning to FIG. 11E, the prompt 1166b may provide user-selectable options 1165e-h related to a user's reason for expressing a negative preference. The user-selectable option 1165e ('Too Expensive') may indicate that the user thinks the price of the diamond in the diamond listing 1148a is too high. In response to a selection of the user-selectable option 1165e, the diamond selection system may update the search parameters to exclude the price of the diamond in the diamond listing 1148a and/or adjust a price range. Additionally or alternatively, the diamond selection system may update the ranking to rank price over one or more diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

The user-selectable option 1165f ('I don't like the shape') may indicate that the user does not like the shape of the diamond in the diamond listing 1148a. In response to a selection of the user-selectable option 1165f, the diamond selection system may update the search parameters to exclude the shape of the diamond in the diamond listing 1148a. The diamond selection system may additionally or alternatively update the search parameters to include or exclude one or more additional diamond shapes, such as excluding diamond shapes that are similar to the shape of the diamond in the diamond listing 1148a. Additionally or alternatively, the diamond selection system may update the ranking to rank shape over one or more diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

The user-selectable option 1165g ('Not my style') may indicate that the user does not like the style of the diamond in the diamond listing 1148a, or that the user's reason for not liking the diamond is not listed in the prompt 1166. In response to a selection of the user-selectable option 1165g, the diamond selection system may update the search parameters to exclude one or more features or characteristics of the diamond in the diamond listing 1148a. Additionally or alternatively, the diamond selection system may update the ranking to rank one or more diamond features over one or more additional diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

The user-selectable option 1165h ('I like nothing about it') may indicate that the user dislikes several or all of the diamond features and/or the price of the diamond in the diamond listing 1148a. In response, the diamond selection system may update the search parameters to exclude one or more of the diamond features and/or the price of the diamond in the diamond listing 1148a. Additionally or alternatively, the diamond selection system may update the ranking to rank one or more diamond features over one or more additional diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

In some embodiments, the prompts 1166 are displayed each time a user indicates a preference. In some embodiments, the prompts 1166 are displayed only some times that a user indicates a preference. In some embodiments, the prompts 1166 are displayed responsive to a user input. The prompt 1166 may be displayed in response to a user input that is different from a gesture used to indicate a preference. In some embodiments, the user may gesture in a first manner to indicate a preference and not trigger the prompt 1166 and in a second manner to indicate a preference and/or trigger the prompt 1166. For example, a long swipe may be used to indicate a preference and not trigger the prompt 1166 and a short swipe (e.g., a half-swipe) may be used to indicate a preference and/or trigger the prompt 1166. In various embodiments, various gestures or combination of gestures may be used to indicate a preference and/or trigger the prompt 1166. For example, the gesture may be a press-and-hold gesture, a swipe-and-hold gesture, a half-swipe-and-hold gesture, and so on.

Figure 11F:
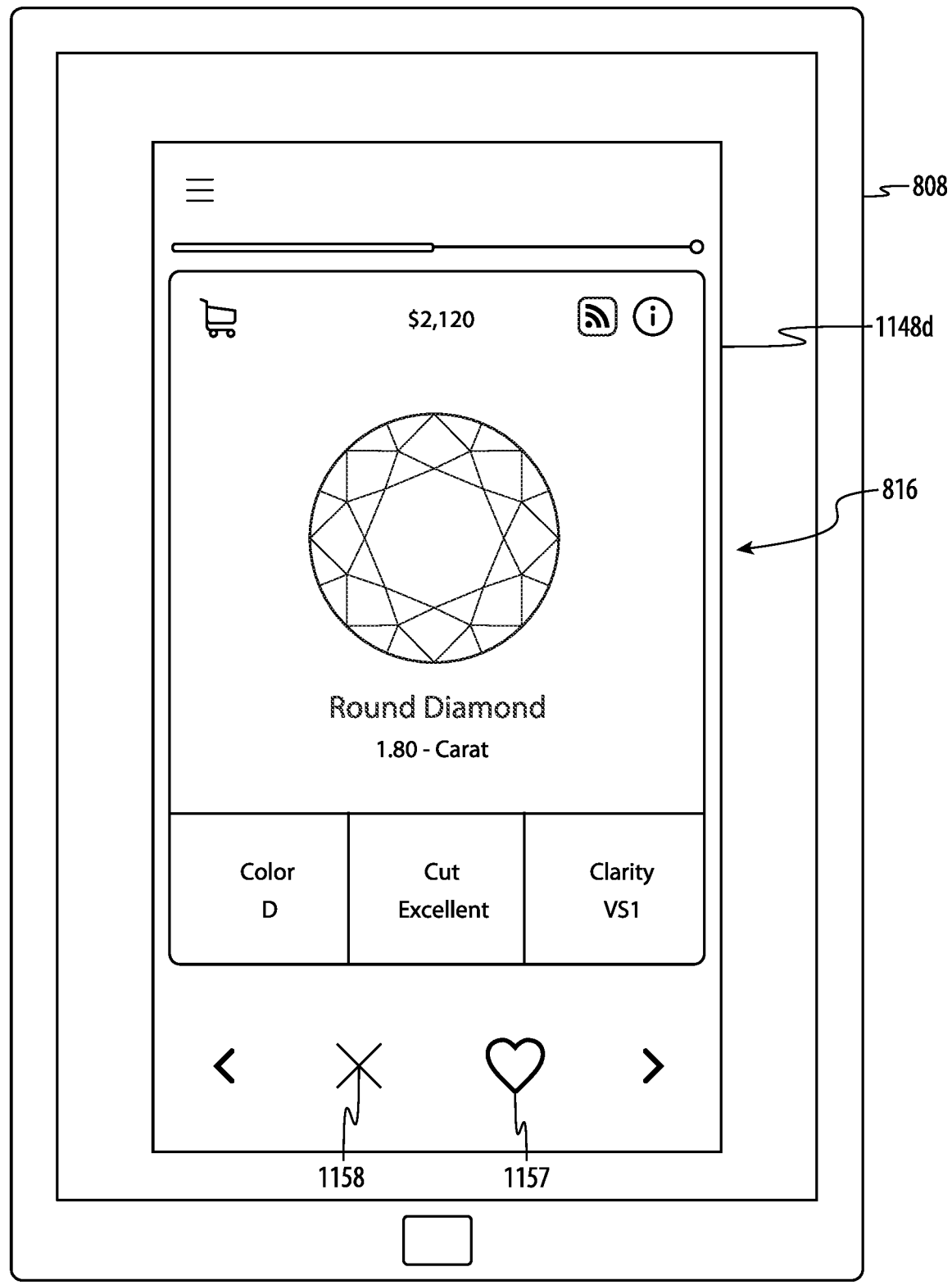

As depicted in FIG. 11F, a new diamond listing 1148d is displayed by the diamond selection system on the display of the user computing device. In some embodiments, the diamond listing 1148d is displayed in response to a selection of a preference indicator and/or a swipe to the left or the right of a previous diamond listing (e.g., diamond listings 1148a, 1148b, 1148c, etc.). The diamond listing 1148d is similar to the diamond listing 1148a, but displays information regarding a different diamond. The diamond selection system may present several diamond listings according to the determined presentation order.

As discussed above, in response to the search parameters and/or rankings being updated or modified, the diamond selection system may determine a modified set of diamond listings, a modified subset of diamond listings and/or a modified presentation order. This may occur while a user is still interacting with the user interface 816 and/or after the user's session has ended. In embodiments in which determining modified listings and/or presentation order occurs while a user is interacting with the user interface 816, the diamond listings that are presented to the user may change based on the modifications. For example, if a presentation order is adjusted based on received user preferences or additional information, an original sequence of diamond listings may be interrupted or replaced by a modified sequence of diamond listings according to the adjusted presentation order.

Figure 12:
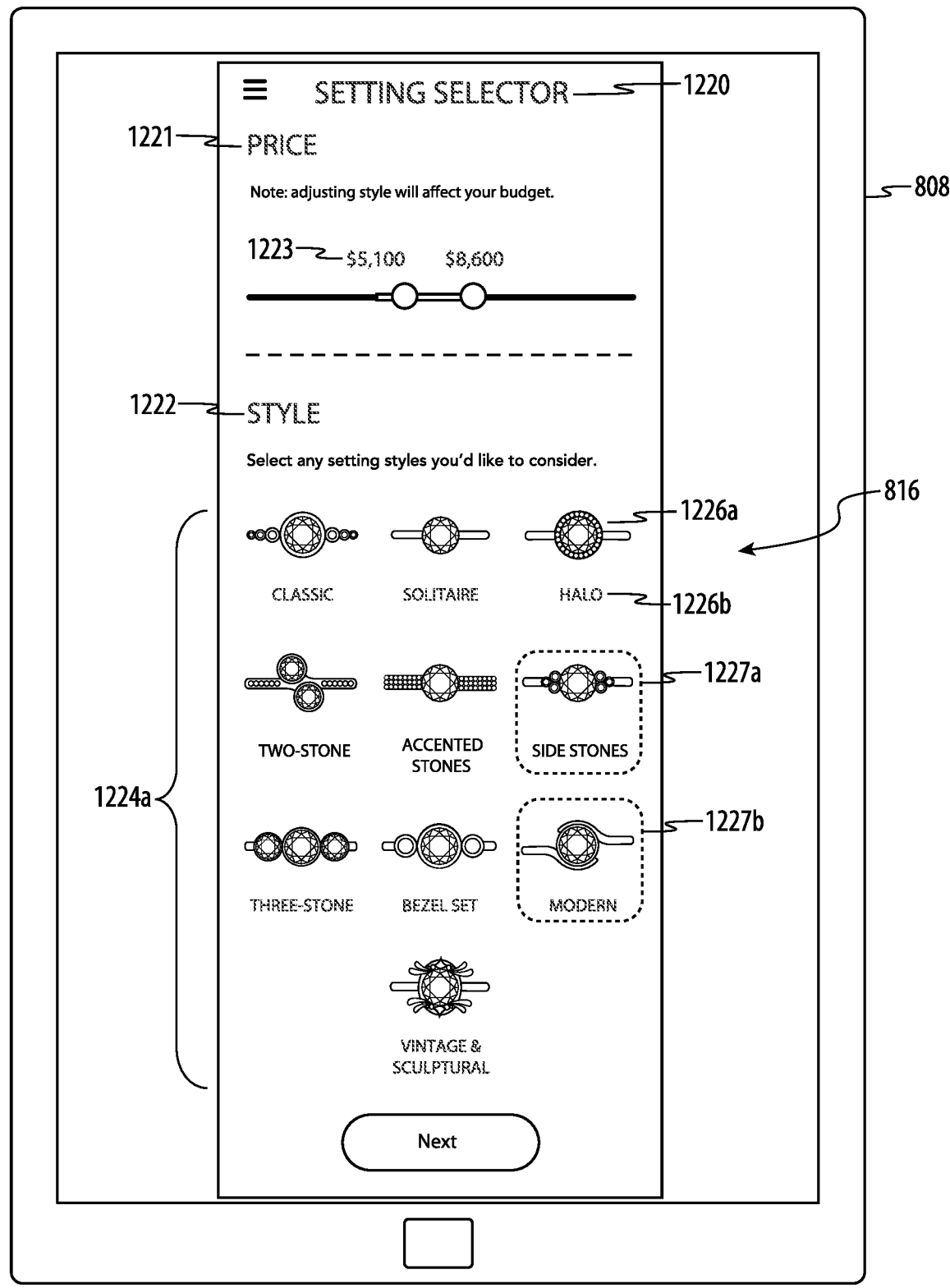
FIG. 12 depicts an example user interface generated by the diamond selection system and displayed in the portal on a user computing device.
Figure 13A:
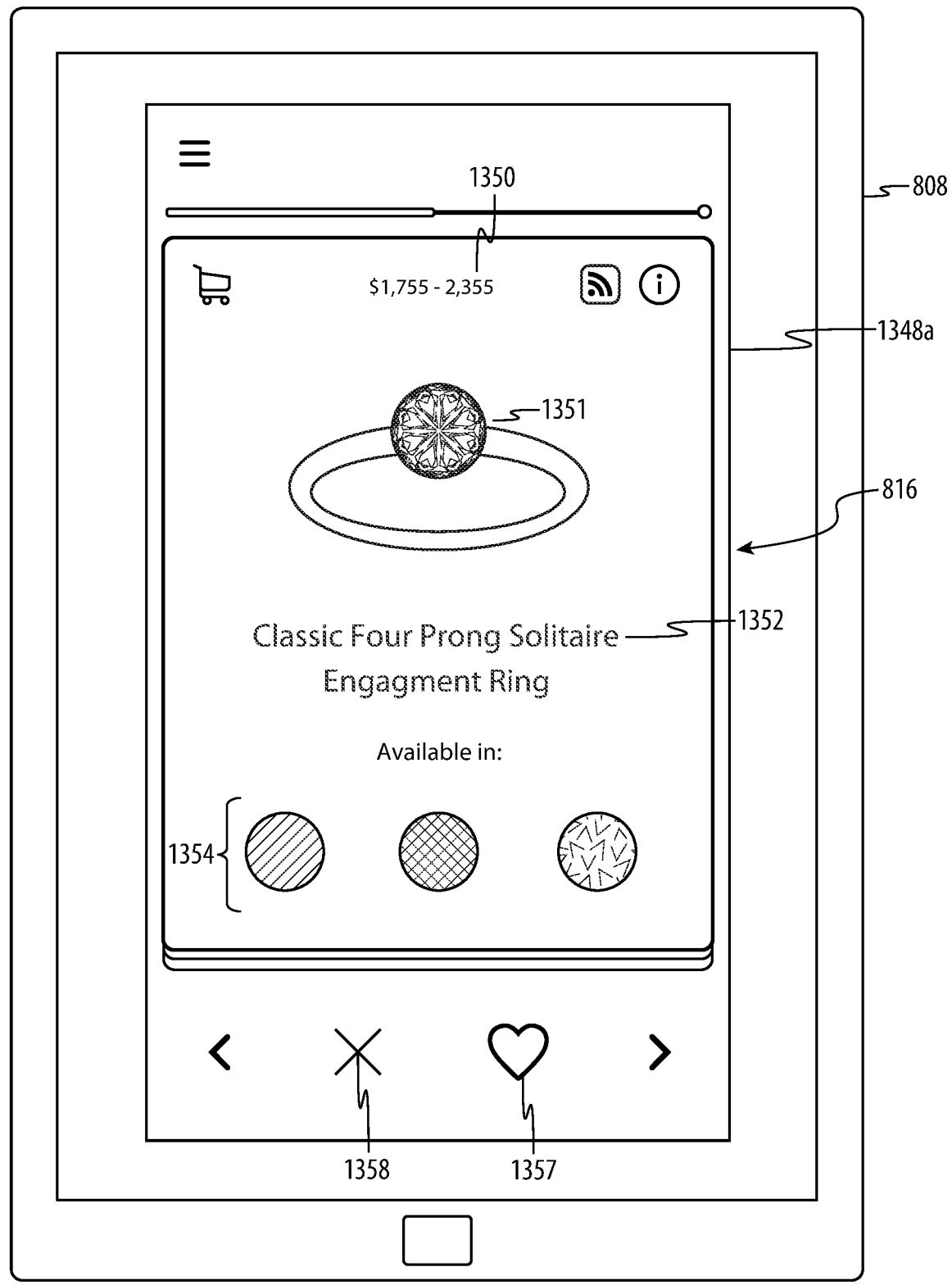
FIGS. 13A-13K depict an example user interface generated by the diamond selection system and displayed in the portal on a user computing device.
Figure 13B:
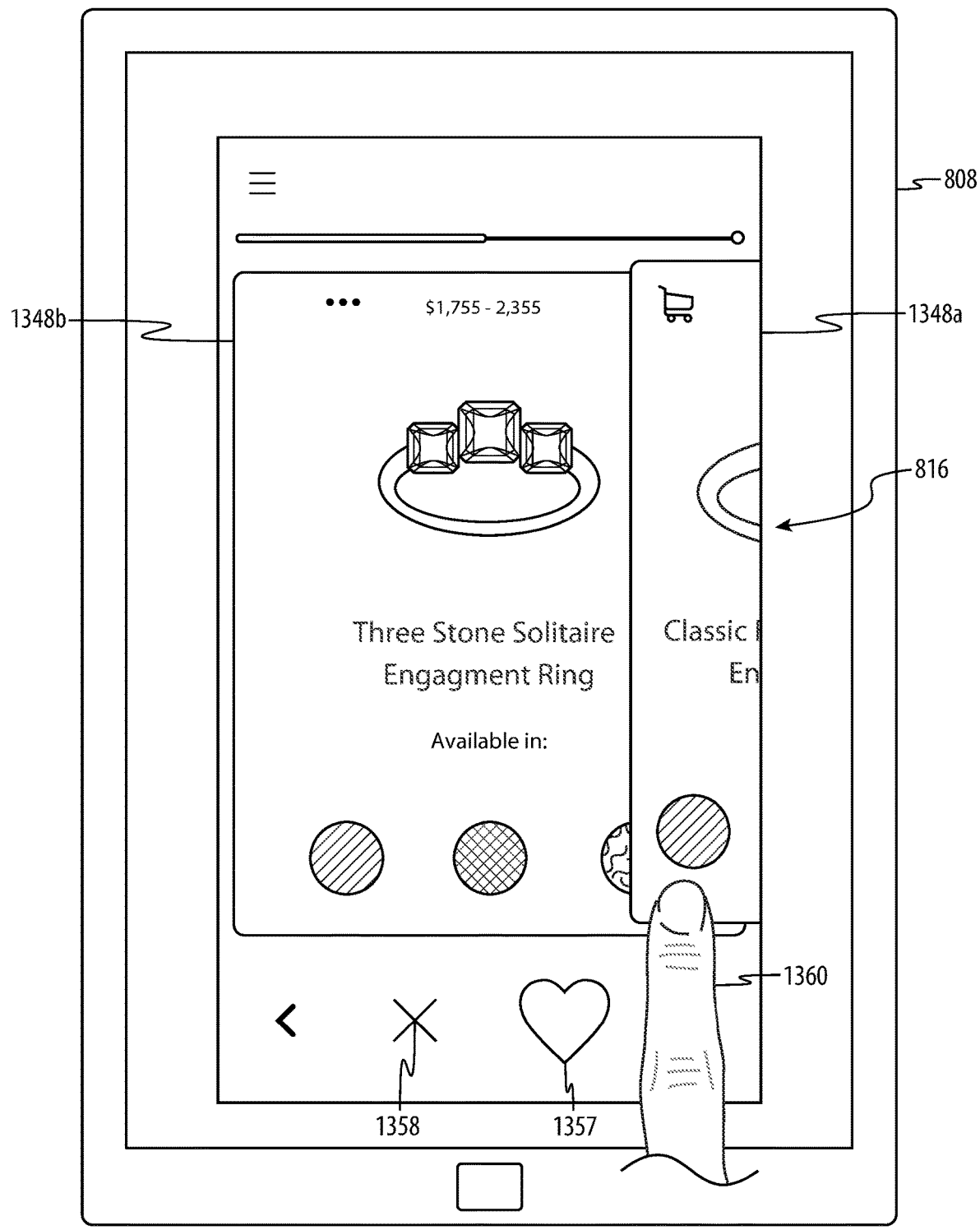
Figure 13C:
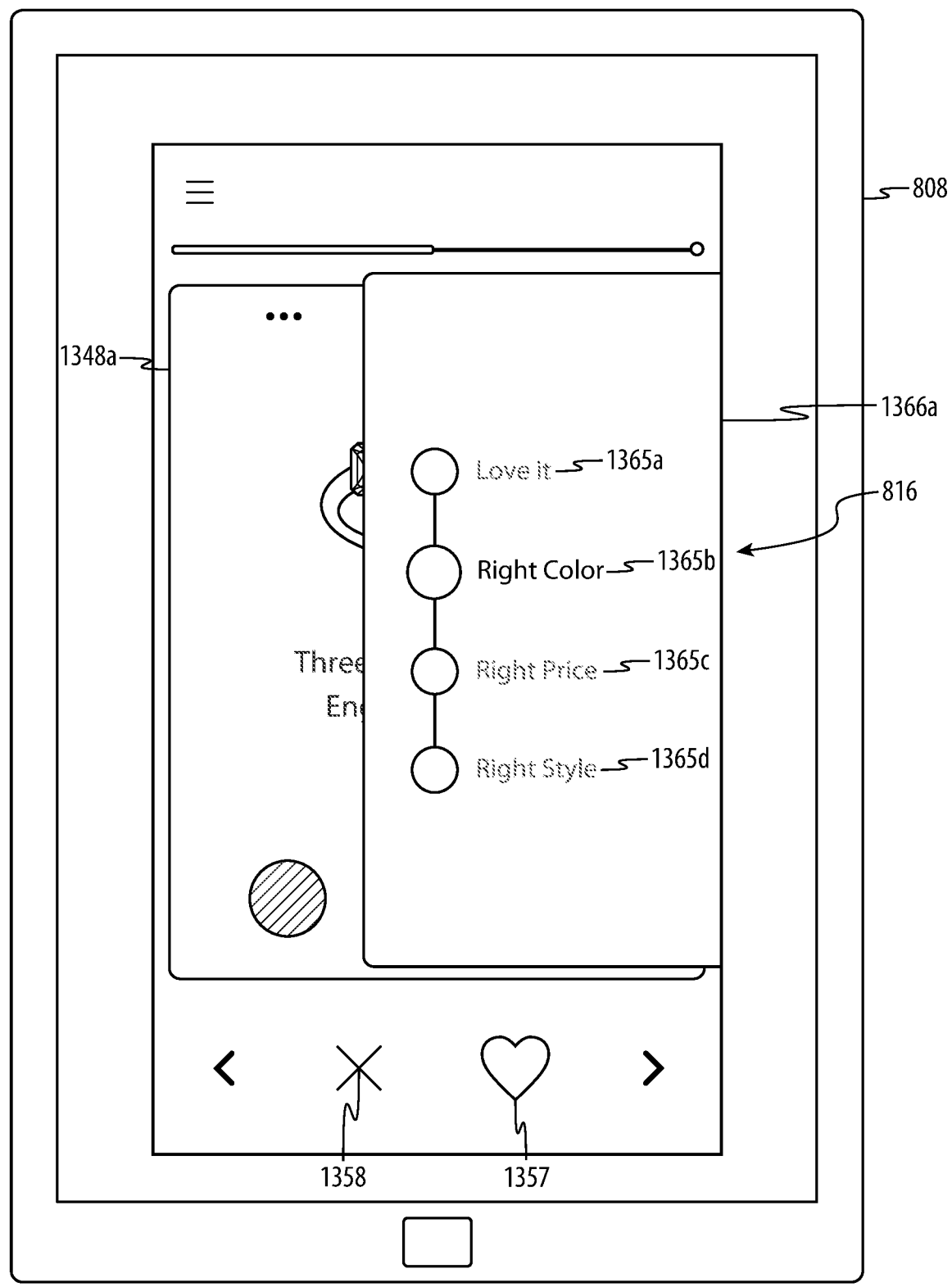
Figure 13D:
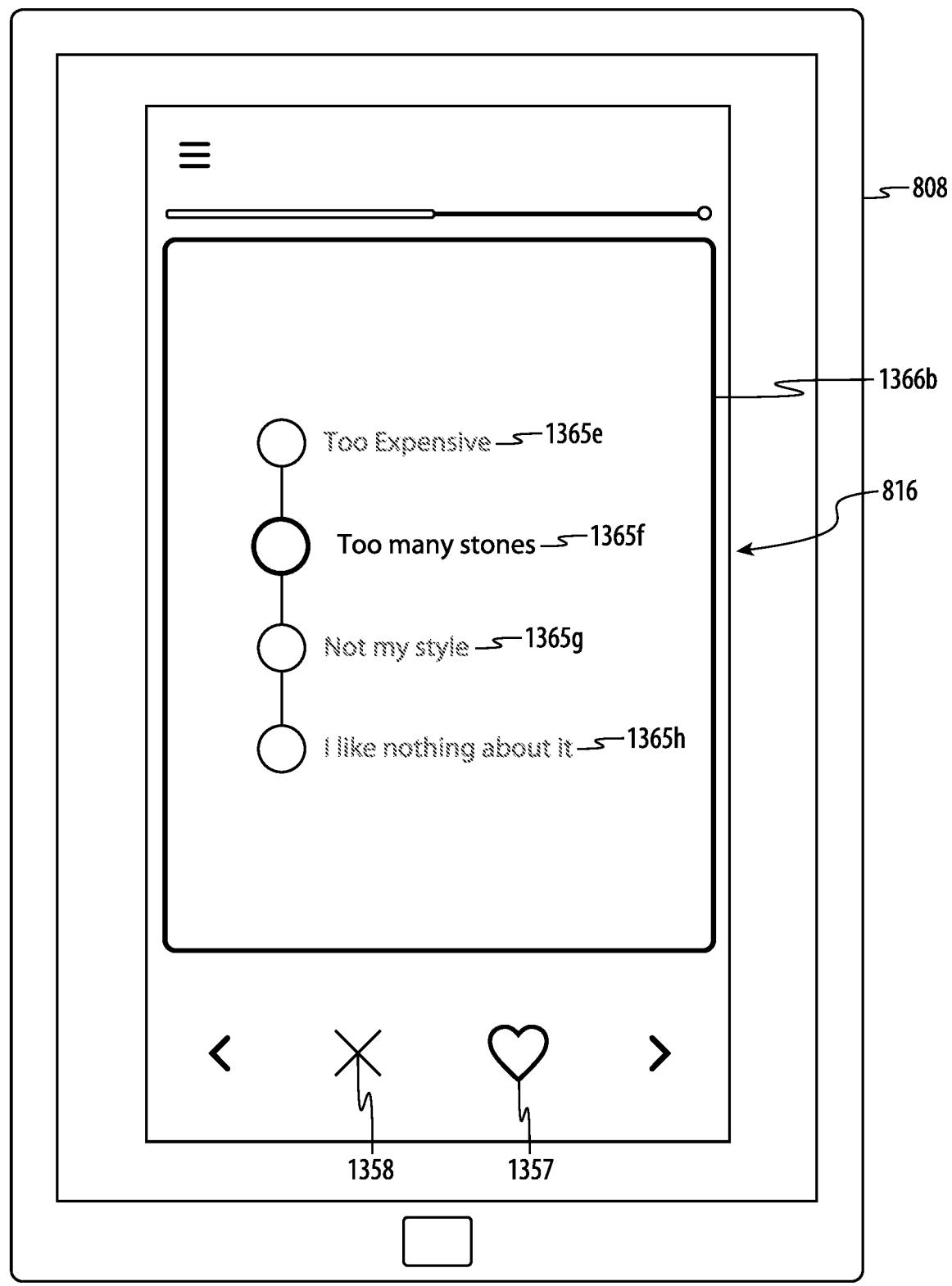
Figure 13E:
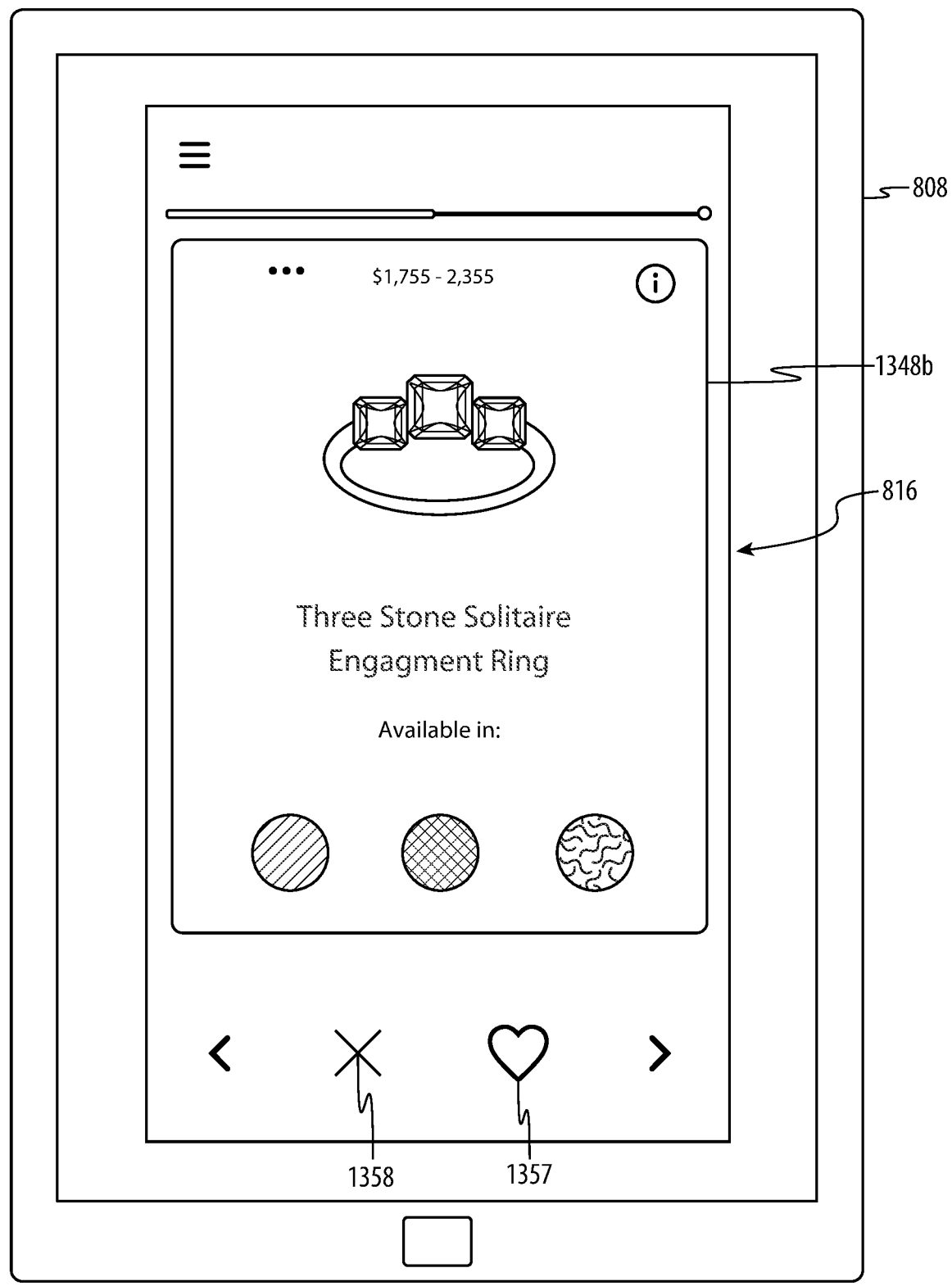
Figure 13F:
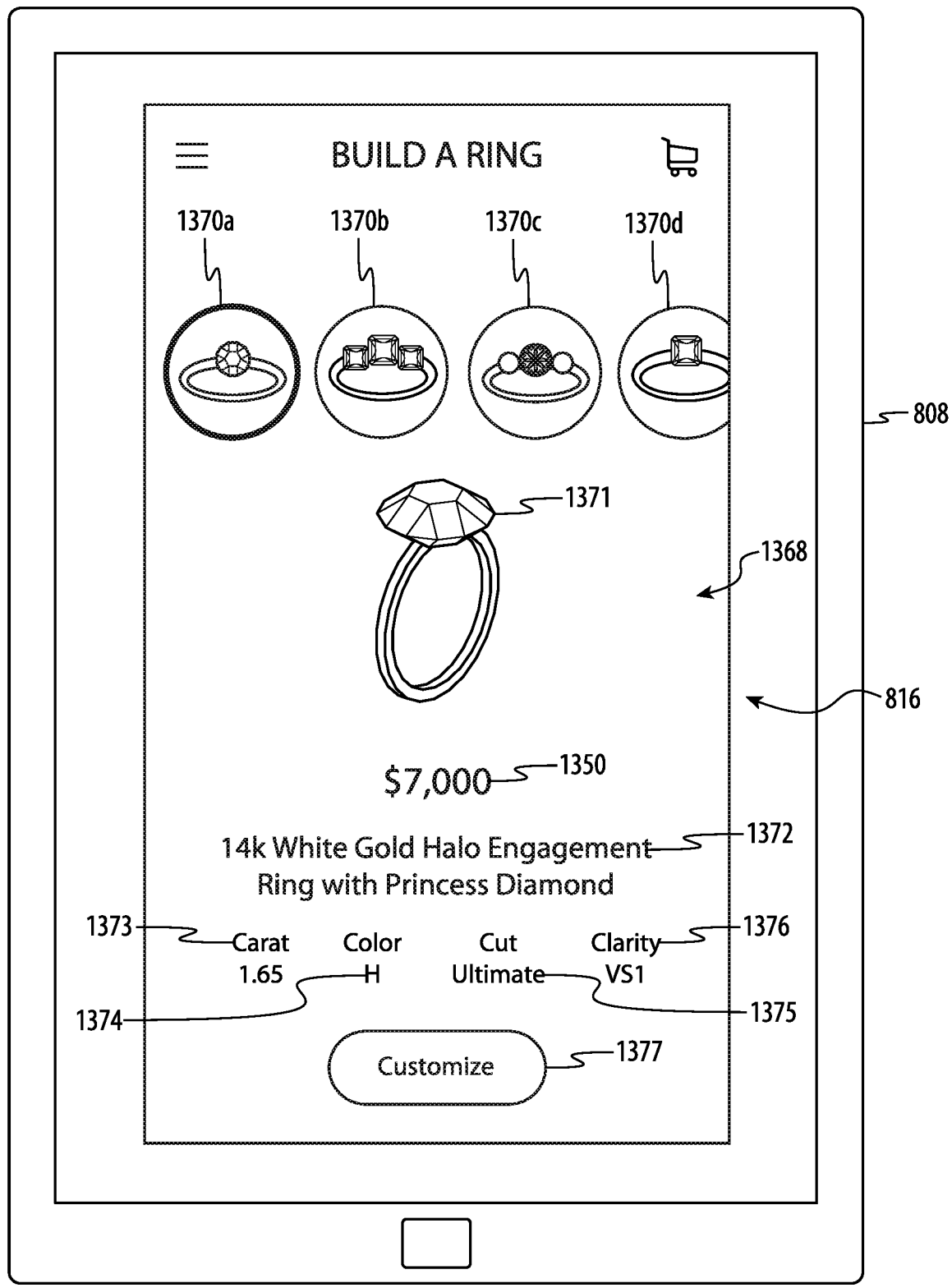
Figure 13G:
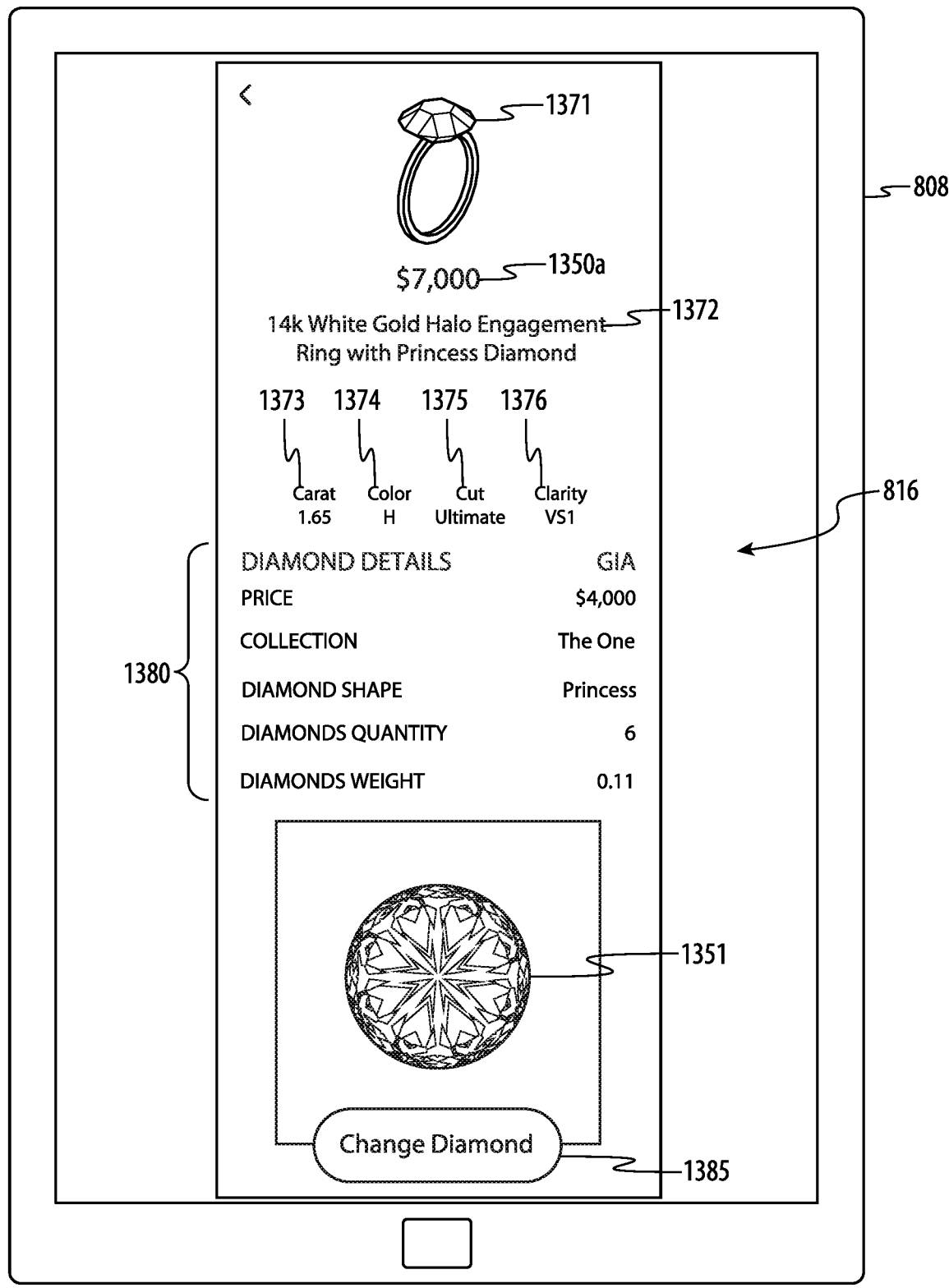
Figure 13H:
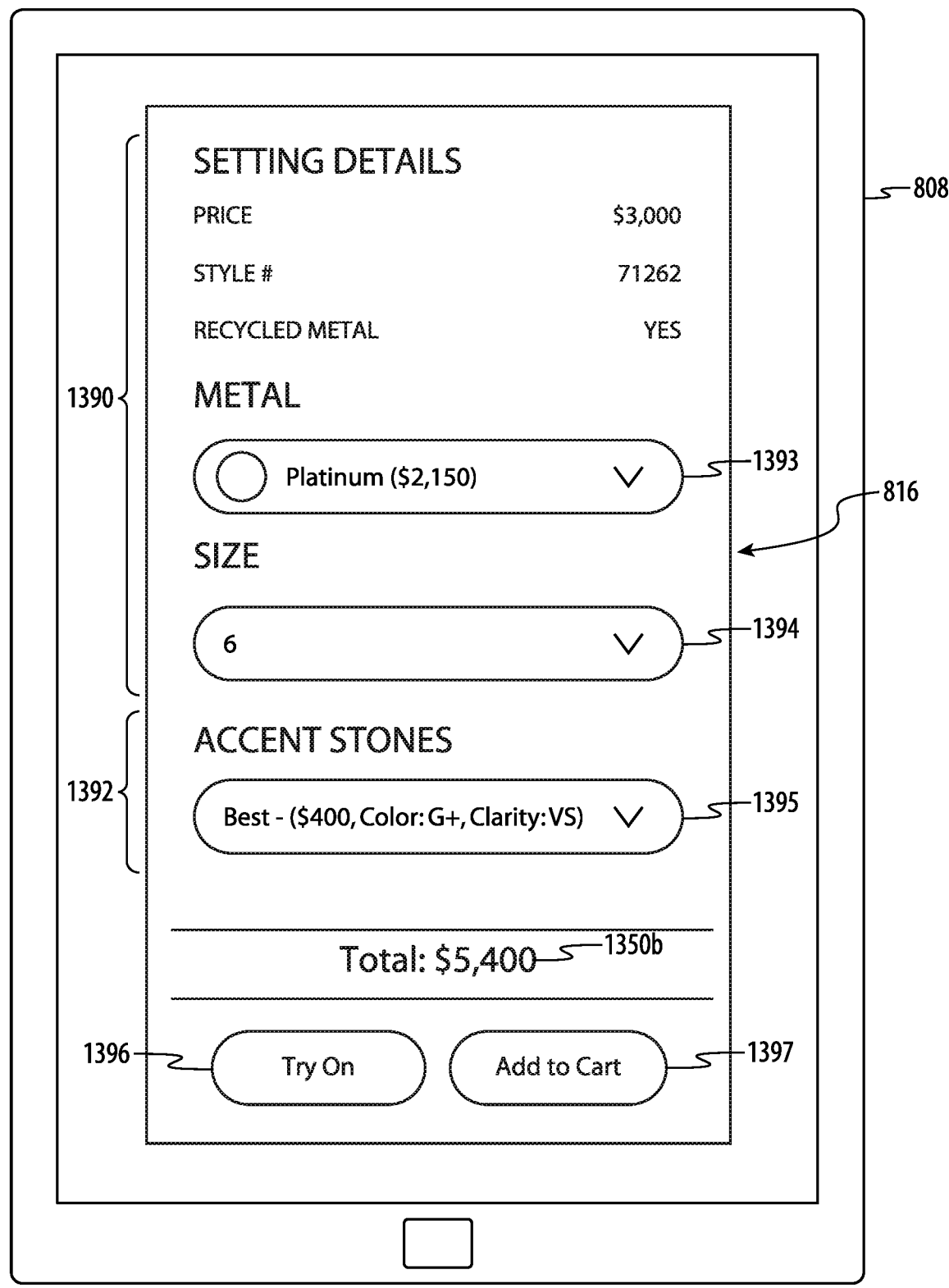
Figure 13I:
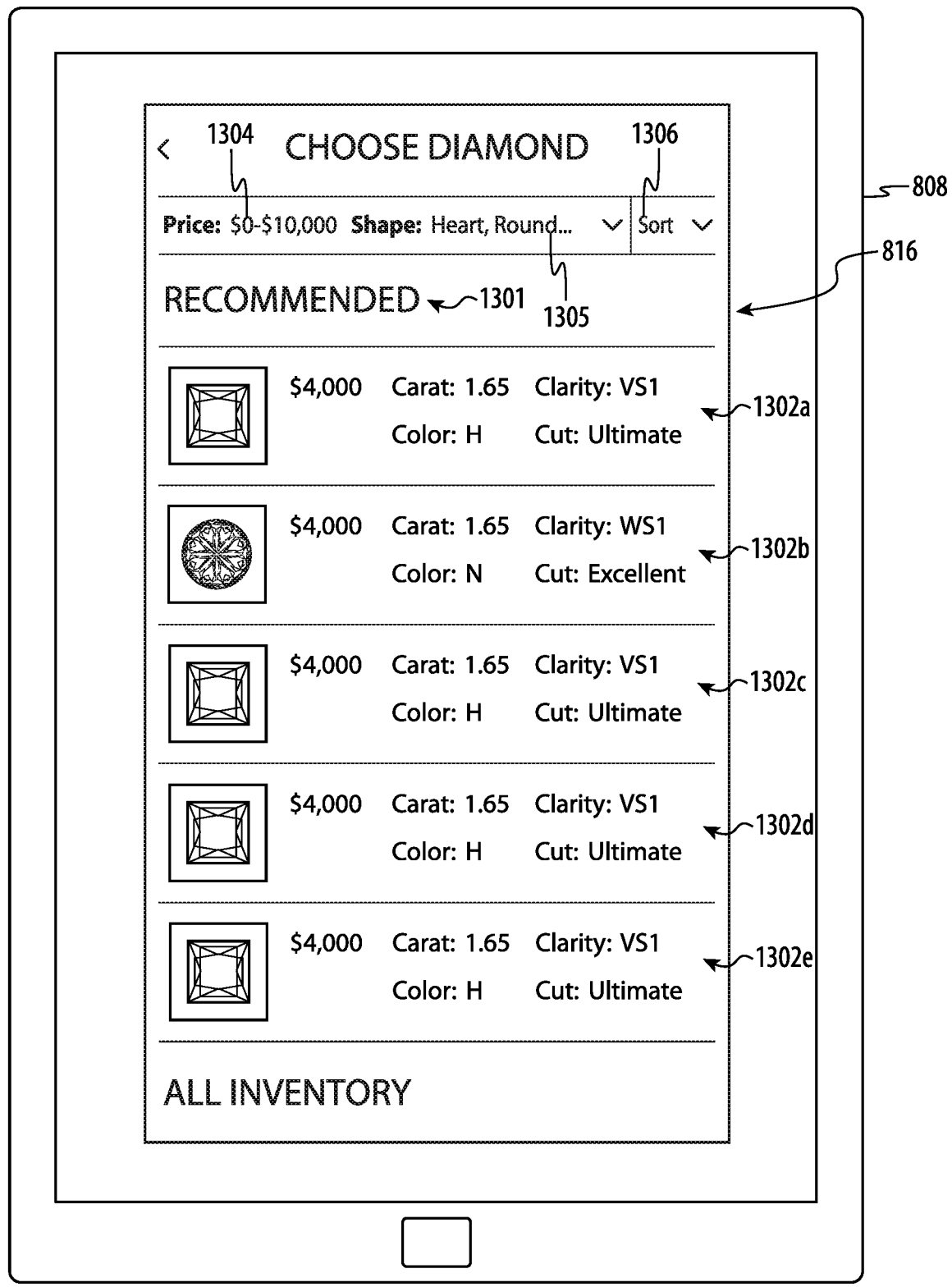
Figure 13J:
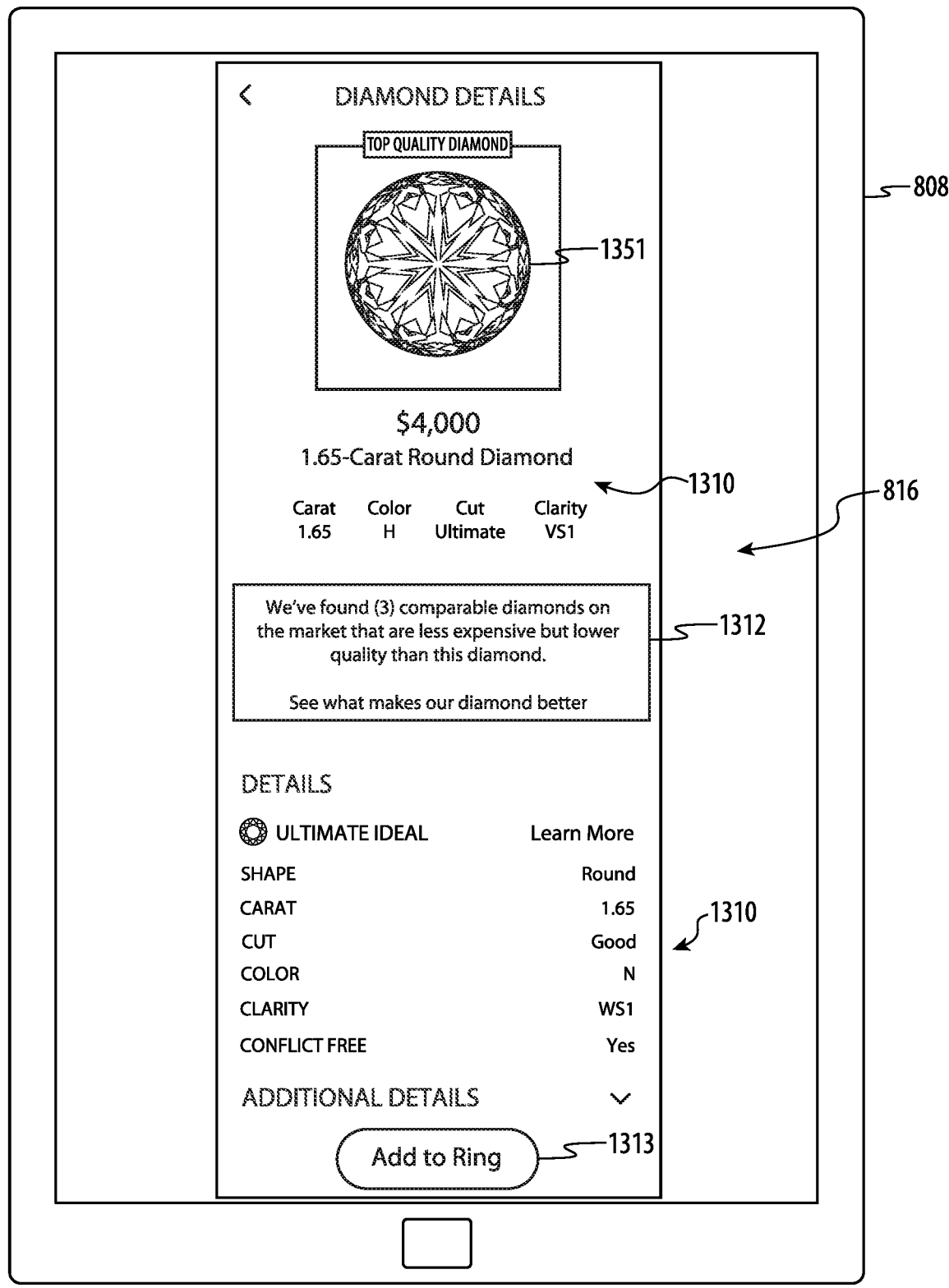
Figure 13K:
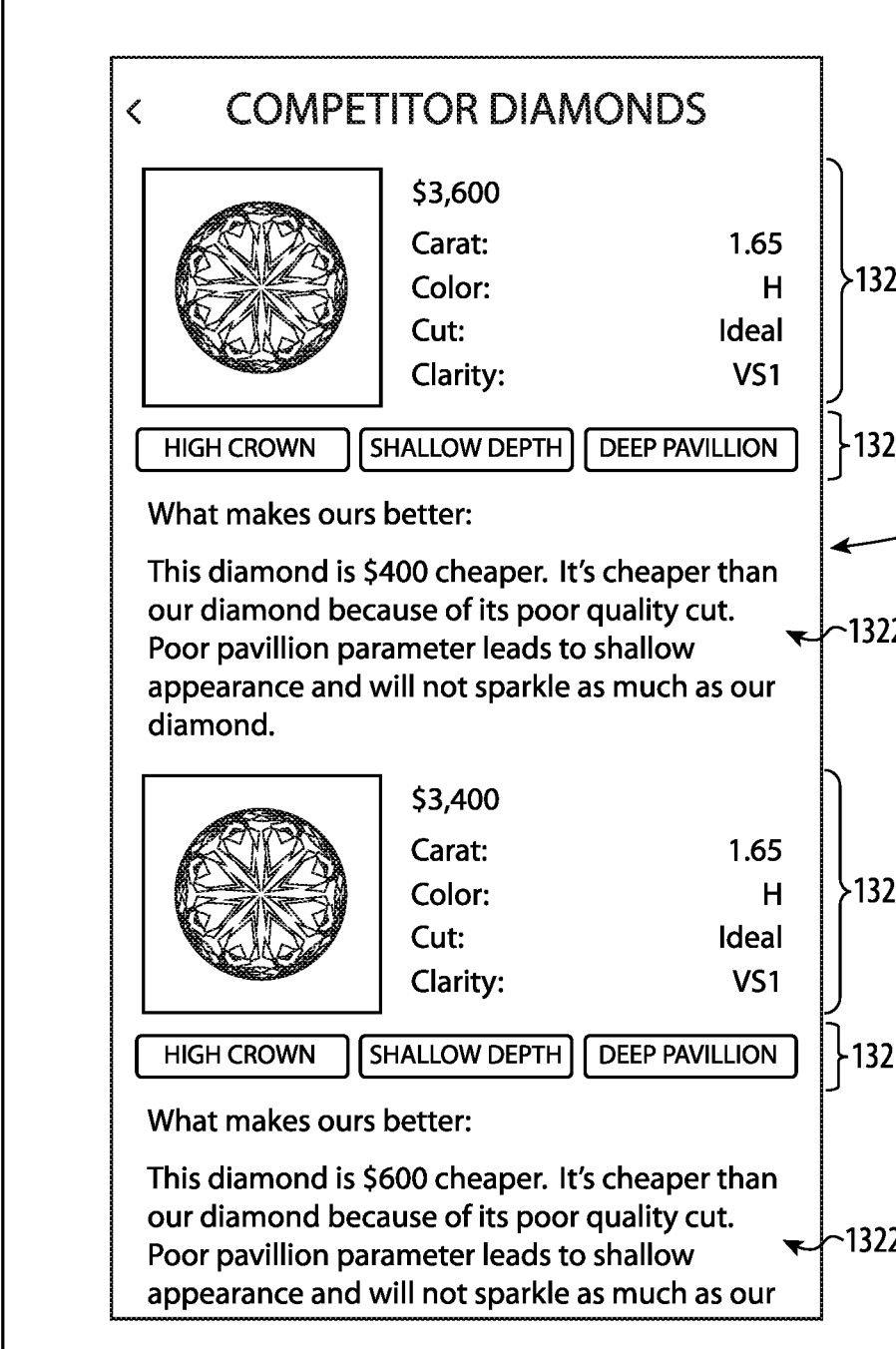

FIGS. 12-13K depict portions of the user interface 816 for presenting setting listings to users. The portion of the user interface for presenting setting listings is similar to the portion of the user interface for presenting diamond listings as shown and discussed with respect to FIGS. 9A-11F, and may include similar features and/or functionality omitted from the discussion of FIGS. 12-13K for purposes of simplicity. As shown in FIG. 12, one portion of the user interface 816 includes a title 1220 of the diamond selection system and/or other information, such as instructions on interacting with the diamond selection system. In some embodiments, another portion of the user interface 816 includes selectable items that may be used to present search parameters to users and/or receive modifications to the search parameters from users for a search of the diamond selection system.

In some embodiments, the search parameters include a price and/or one or more search categories. A portion of the user interface 816 includes a price range 1221 that may include a slider 1223 that allows a user to select a price range for the search. Another portion of the user interface 816 includes searchable diamond features or search categories, such as a style category 1222. Other setting features may be included, including colors, materials and the like. Each setting feature or search category (e.g., category 1222) includes selectable search options that correspond to a setting feature graded along a scale (e.g., set of values). The scale may be continuous, graduated, or may correspond to a series of grades or values associated with the particular setting feature or search category. The user may enter the search parameters by selecting one or more of the selectable search options (e.g., style options 1224a). In some embodiments, additional or fewer setting features may be included in the user interface 816.

The selectable search options 1224a may include an image 1226a representing the style and/or text 1226b. The image 1226a included in the style category 1222 may be an image representative of the style. The text 1228a included in the shape category 1222a may be text relevant to the style category, such as text describing style and/or a selected style. Styles may include, for example, classic, solitaire, halo, two-stone, accented stones, side stones, three-stone, bezel set, modern, and vintage and sculptural. Various styles may describe pertinent features of a setting, such as stone placement, themes, and other features.

The user may select one or more styles from the selectable text and/or images by interacting with the corresponding text and/or image. For example, a user that wishes to search for classic settings may select (e.g., by touching a corresponding region of a touch-sensitive display) the text and/or image corresponding to the classic style. In some embodiments, the user may select one option for style, while in other embodiments the user may select multiple options for style. As shown in FIG. 12, the user interface may display indicators (e.g., 1227A and 1227B) that indicate a selected style (either by user selection or pre-selection). In some cases, users may select a selected shape to de-select the style, which may remove the indicator.

In some embodiments, the categories or fields to be searched and the search parameters (e.g., search values) themselves may be represented in different ways, including using images, sliders, text, other graphical elements, or some combination thereof.

As discussed above, the search parameters may be used to conduct a search of the database to determine search results (e.g., a set of listings to be provided via the portal). For example, the diamond selection system may retrieve a set of setting listings according to the search parameters. The search process discussed above with respect to diamond listings is applicable to setting listings. In addition, some listings may include both diamond (or other stones) and settings.

Turning to FIGS. 13A-13E, a portion of the user interface 816 for presenting setting listings and receiving user preferences is shown. In various embodiments, the user interface 816 presents setting listings in response to determining predicted ring attributes and/or a search. As depicted in FIG. 13A, a setting listing 1348a is displayed by the diamond selection system on the display of a user computing device 808. In various embodiments, one or more setting listings 1348a may be displayed in the user interface 816, for example, according to the presentation order. For example, the setting listing 1348a may be a first listing in a presentation order of a subset of listings determined by the diamond selection system. In some embodiments, setting listings are displayed sequentially (e.g., one after another). The setting listing 1348a may include setting features and/or information, including one or more of a price 1350, a setting image 1351, a setting descriptor 1352 (e.g., a style), and color and/or material options 1354. In some cases, as shown in FIG. 13A, a setting is shown with a diamond. The diamond may be shown for illustrative purposes or it may be specifically selected for presentation to the user as described above.

Similar to the diamond listing 1148a of FIG. 11A, the setting listing 1348a may further include elements for users to provide user inputs regarding the setting listing using preference indicators 1357, 1358 (similar to preference indicators 1157, 1158). It will be appreciated that the functionality of the preference indicators 1357, 1358 is similar to that of the preference indicators 1157, 1158 as described with respect to FIGS. 11A-11F, in which users may provide feedback regarding setting listings and the system may present new and/or alternative setting listings in response.

In some embodiments, in response to a user indicating a preference, the setting listing 1348 is no longer displayed and a new setting listing is displayed in the user interface 816. FIG. 13B depicts a transition from the setting listing 1348a to another setting listing 1348b. In the embodiments of FIG. 13B, the setting listing 1348a transitions off of the display (e.g., slides according to a swipe or in the direction of an indicator). For example, in FIG. 13B, a finger 1360 swipes to the right while the setting listing 1348a is displayed, and the setting listing 1348a appears to slide off the display to the right, revealing a new setting listing 1348b. In some embodiments, the new setting listing 1348b is the next setting listing in a presentation order determined by the diamond selection system. Similarly, in some cases, a finger may swipe to the left while the setting listing 1348a is displayed, and the setting listing 1348a appears to slide off the display to the left, reveals a new setting listing. In various embodiments, swiping may be used to provide feedback, similar to the feedback discussed above with respect to FIGS. 11A-11F. In some cases, search parameters may be updated based on received feedback as discussed above.

In some embodiments, the user may provide additional information regarding their selected preference for the setting listing 1348a. For example, in response to a selection of a preference indicator and/or a gesture, the diamond selection system may display a prompt that allows a user to provide additional information about the setting listing 1348a. FIGS. 13C and 13D depict example prompts 1366 displayed in the user interface 816, for example, in response to a user indicating a preference as described above. The prompts 1366 may provide one or more user-selectable options regarding the indicated preference. For example, as shown in FIG. 13C, in response to a user indicating a positive preference, the prompt 1366a may provide user-selectable options 1365a-d related to a user's reason for expressing a positive preference. Similarly, as shown in FIG. 13D, in response to a user indicating a negative preference, the prompt 1366b may provide user-selectable options 1365e-h related to a user's reason for expressing a negative preference. In various embodiments, the user may select one or more of the user-selectable options 1365 to provide feedback to the diamond selection system. In some embodiments, in response to the user selecting a user-selectable option 1365, the diamond selection system displays a new setting listing 1348.

The user-selectable options 1365 may correspond to setting features, diamond features, search parameters, rankings, or some combination thereof. The diamond selection system may update the search parameters and/or rankings in response to the user selecting one or more user-selectable options, similar to the functionality described above with respect to FIGS. 11A-11F.

As depicted in FIG. 13E, a new setting listing 1348b is displayed by the diamond selection system on the display of the user computing device. In some embodiments, the setting listing 1348b is displayed in response to a selection of a preference indicator and/or a swipe to the left or the right of a previous setting listing (e.g., setting listing 1348a). The setting listing 1348b is similar to the setting listing 1348a, but displays information regarding a different setting. The diamond selection system may present several setting listings according to the determined presentation order.

As discussed above, in response to the search parameters and/or rankings being updated or modified, the diamond selection system may determine a modified set of setting listings, a modified subset of setting listings and/or a modified presentation order. This may occur while a user is still interacting with the user interface 816 and/or after the user's session has ended. In embodiments in which determining modified listings and/or presentation order occurs while a user is interacting with the user interface 816, the setting listings that are presented to the user may change based on the modifications. For example, if a presentation order is adjusted based on received user preferences or additional information, an original sequence of setting listings may be interrupted or replaced by a modified sequence of setting listings according to the adjusted presentation order.

Turning to FIGS. 13F-13K, a portion of the user interface 816 for providing one or more user interfaces for users to customize diamonds and/or settings and/or view additional details regarding particular diamond listings, setting listings, and/or ring listings.

As depicted in FIG. 13F, a ring listing 1368 is displayed by the diamond selection system on the display of a user computing device 808. In various embodiments, one or more ring listings 1368 may be displayed in the user interface 816, for example, in response to a user providing feedback regarding diamond and/or setting listings. For example, the ring listing 1368 may include ring attributes determined to be preferred ring attributes. In some embodiments, multiple ring listings may be provided, and the user interface 816 may include selectors 1370a, 1370b, 1370c, and 1370d for navigating between different ring listings. The ring listing 1368 may include diamond features, setting features, and/or information, including one or more of a price 1350, a ring image 1371, a ring descriptor 1372 (e.g., a setting descriptor and a diamond descriptor), a diamond weight 1373, a color 1374, a cut 1375, and a clarity rating 1376.

The ring listing 1368 may further include elements for users to provide user inputs regarding the ring listing 1368. For example, the diamond selection system may include an element 1377 for receiving a user input to customize the displayed ring. Customizing the ring may include changing a diamond and/or setting of the ring. FIGS. 13G-13H illustrate an example portion of the user interface 816 for customizing a ring. The portion of the user interface 816 may be accessed, for example, by selecting the element 1377 of FIG. 13F. The customization view of FIGS. 13G-13H may include information from the ring listing (e.g., a price 1350a, a ring image 1371, a ring descriptor 1372 (e.g., a setting descriptor and a diamond descriptor), a diamond weight 1373, a color 1374, a cut 1375, and a clarity rating 1376). The customization view of FIGS. 13G-13H may include additional information about the diamond and/or the setting, including diamond details 1380, a diamond image 1351, setting details 1390, and a setting image (not shown in FIGS. 13G-13H), accent stone details 1392, and a price as customized 1350b.

The customization view of FIGS. 13G-13H may include elements for users to provide user inputs to customize the ring. For example, the customization interface may include an element 1385 to change the diamond of the ring, element 1393 to change a metal of the setting, element 1394 to change a size of the setting, and element 1395 to change accent stones of the ring. The price as customized 1350b may reflect an updated price of the ring according to user inputs to customize the ring. The customization interface may additionally include elements 1396 and 1397 to try the ring on and/or add the ring to a cart.

FIG. 13I illustrates an example portion of the user interface 816 for choosing a diamond. The portion of the user interface 816 may be accessed, for example, by selecting the element 1385 of FIG. 13G. The portion of the user interface 816 for choosing a diamond may include one or more diamond listings 1302a, 1302b, 1302c, 1302d, 1302e, each of which may include diamond features, such as price, weight, clarity, color, cut, and a diamond image. In some cases, the diamond listings may include recommended diamond listings 1301. The recommended diamond listings may be determined similarly to the diamond listings discussed above. Recommended diamond listings may be displayed separately from (e.g., before) other diamonds of the diamond selection system. The diamond listing view of FIG. 13I may include elements 1304, 1305, 1306 for filtering (e.g., by price, diamond features, etc.) and/or sorting displayed listings. A user input may select diamonds displayed in the interface of FIG. 13I to add a diamond to a ring (e.g., the ring shown in FIGS. 13G-H). In some cases, selecting a diamond displayed in the interface of FIG. 13I accesses a portion of the user interface 816 for providing more information about the diamond, such as shown in FIG. 13J.

The detail view of FIG. 13J may include a diamond image 1351, diamond details 1310, and an element 1313 to add the diamond to the ring (e.g., the ring shown in FIGS. 13G-13H). The detail view of FIG. 13J may further include a comparison element 1312 that includes comparison information about competitor diamonds, as discussed herein. In some cases, selecting the comparison element 1312 accesses a portion of the user interface 816 for providing additional comparison information, such as shown in FIG. 13K.

The comparison view of FIG. 13K includes comparison information for one or more competitor diamonds. The comparison information may include diamond features 1320a, 1320b of the competitor diamonds, including characterizations 1321a, 1321b of the diamond features, such as crown height, depth, pavilion indicators, and the like. The comparison information may include advantages 1322a, 1322b of the diamond of the diamond of the diamond selection system (e.g., the diamond shown in FIG. 13J) compared to the competitor diamonds or products. In some instances, the advantages 1322a, 1322b may be characterized as disadvantages of the competitor diamonds or products. The advantages may be ring attributes that are associated with a higher quality diamond and/or setting. The advantages and/or disadvantages with regard to certain ring attributes may explain differences in other ring attributes, such as price. For example, a diamond and/or setting of the diamond selection system may cost more than a competitor diamond and/or setting, but the diamond and/or setting of the diamond selection system may feature a higher quality cut or clarity that accounts for the difference in price. The comparison information may include a qualitative description of measurable differences between the two products including a particular visual or perceptible difference between the products.

One may appreciate that the user interface 816 discussed with respect to FIGS. 8A-13K is an example user interface, and other user interfaces may be used to receive search parameters and/or present diamond and/or setting listings. In some cases, one or more of the portions of the user interface 816 described with respect to FIGS. 8A-13K may be omitted. For example, in some cases, the portions of the user interface described in FIGS. 10A-11F are omitted, and a hybrid setting and diamond selector that includes one or more aspects discussed with respect to FIGS. 9A, 9B, and 12 is presented to receive search parameters.

Figure 14:
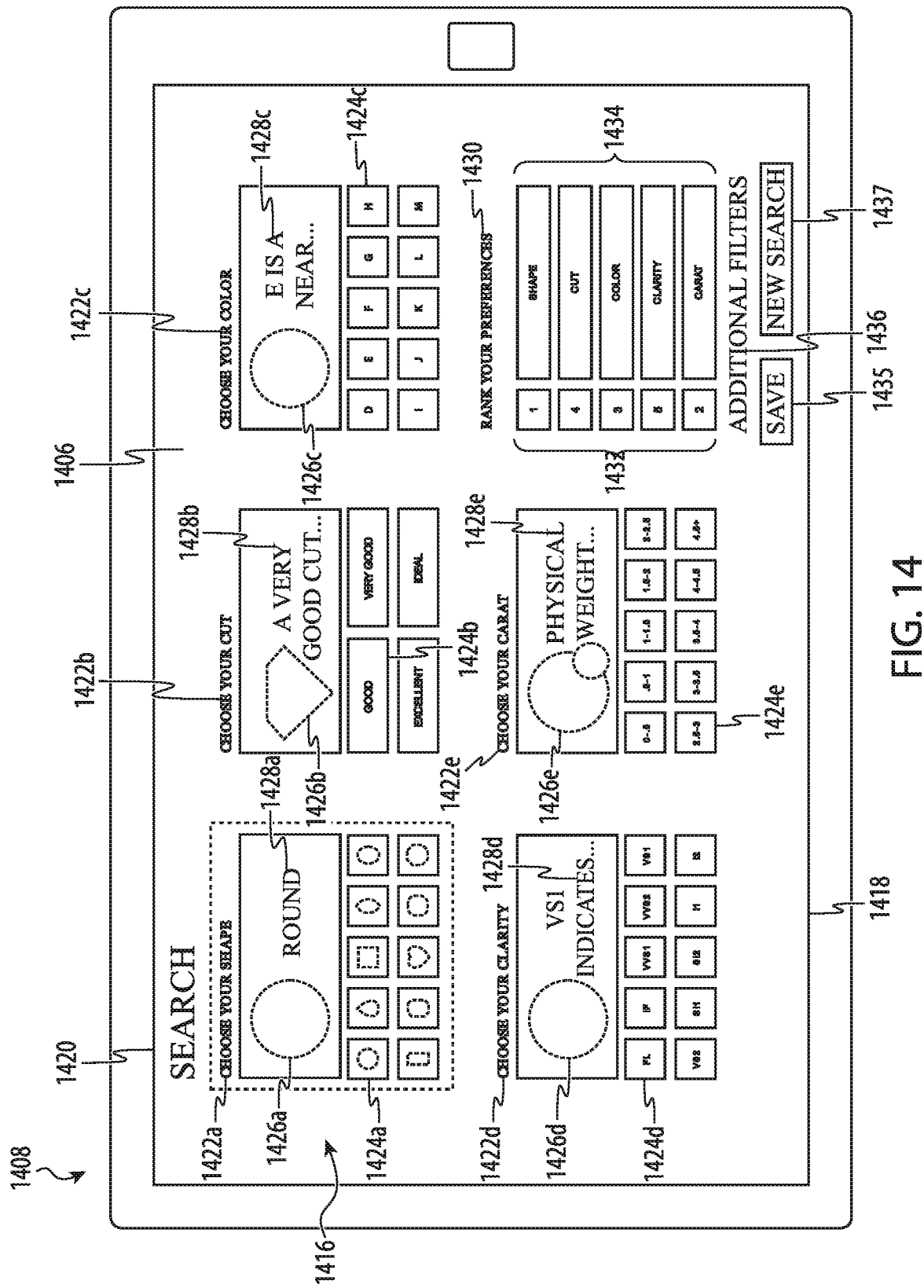
FIG. 14 depicts an example user interface generated by the diamond selection system and displayed in the portal on a user computing device.

FIGS. 14-24 depict example user interfaces for implementing the diamond selection system. FIG. 14 depicts an example user interface generated on a portal 1406 (e.g., a remote portal). The user interface may be used to implement the diamond selection system or diamond search interface. In particular, a user may access the diamond selection system or diamond search interface using the portal 1406, operating on a computing device 1408 (e.g., a personal computing system). In the implementation shown in FIG. 14, the portal 1406 to the diamond selection system or diamond search interface is accessed using a web browser or other similar Internet-enabled application. The portal 1406 may be used to access a website or may operate through another application executed on the computing device 1408.

In the present example, the portal 1406 includes a user interface 1416 on a display 1418 of a computing device 1408. In the following example, the computing device 1408 is a portable electronic device, such as a tablet or smartphone. This is provided as merely an illustrative example. In other embodiments, the computing device 1408 may include, without limitation, a desktop computing system, a notebook computing system, a terminal, an electronic kiosk, or other computing device configured to operate a portal 1406. In the present example, the user interface 1416 may include one or more portions that allow for interaction with the portal 1406, the diamond selection system, a third-party system, and/or the services provided by the American Gem Society (AGS).

As shown in FIG. 14, one portion of the user interface 1416 includes a title 1420 of the diamond selection system and/or other information, such as instructions on interacting with the diamond selection system. Another portion of the user interface 1416 includes searchable diamond features or search categories 1422a-1422e. In the present embodiment, the search categories 1422a-1422e are represented by a corresponding selectable graphical representation or thumbnail. Each diamond feature or search category 1422a-1422e includes selectable search options 1424a-1424e, that correspond to a diamond feature graded along a scale (e.g., set of values). The scale may be continuous, graduated, or may correspond to a series of grades or values associated with the particular diamond feature or search category. The user may enter the search parameters by selecting one or more of the selectable search options 1424a-1424e. The searchable diamond feature or search categories 1422a-1422e may include the diamond shape 1422a, cut 1422b, color 1422c, clarity 1422d, and weight (in carats) 1422e. In some embodiments, additional or fewer diamond features may be included in the user interface 1416.

Another portion of the user interface 1416 may include a diamond feature ranking 1430. The diamond feature ranking 1430 includes selectable options 1432 to rank the search results according to preferred diamond features 1434. The ranking 1430 may be applied by the user at any time during the selection process and may be updated or modified after receiving a set of search results. The user interface 1416 may include additional options, such as additional filters 1436, an option to save search parameters 1435, or an option to conduct a new search 1437.

With respect to the searchable diamond feature or search categories 1422a-1422e, a first diamond feature or search category may be the shape of the diamond 1422a. A diamond's shape 1422a typically refers to the shape a diamond has been cut into from its rough mined shape. Diamond shapes include, but are not limited to, round, princess, emerald, asscher, marquise, oval, radiant, pear, heart, cushion, trillion, and baguette. The user interface 1416 includes the shape of the diamond 1422a as a category or field to be searched, and may include an image 1426a representing the shape, text 1428a, and selectable search options 1424a. The image 1426a included in the shape category 1422a may be an image representative of the shape, and in some embodiments the image 1426a may change as a user selects one of the selectable search options 1424a (e.g., to show the selected shape). The text 1428a included in the shape category 1422a may be text relevant to the shape category, such as text describing shapes and/or a selected shape.

The user may select a shape from the selectable search options 1424a by interacting with the corresponding search option 1424a. For example, a user that wishes to search for round shaped diamonds may select (e.g., by touching a corresponding region of a touch-sensitive display) round from the search options 1424a. In some embodiments, the user may select one option 1424a for shape, while in other embodiments the user may select multiple options 1424a for shape. Once the search is submitted, the diamond selection system then searches for diamond listings which match the selected shape option(s) 1424a.

A second diamond feature or search category may be the cut of the diamond 1422b. A diamond's cut 1422b typically refers to the quality of the cut which has been made to give the diamond its shape. The cut quality may refer to the ratio between dimensions of the diamond, such as width versus depth. A diamond's cut 1422b is typically graded according to a standard issued by a rating agency, such as the Gemological Institute of America (GIA), the American Gem Society (AGS), the European Gemological Laboratory (EGL), the Diamond High Council (HRD), the International Gemological Institute (IGI), the International Confederation of Jewelry, Silverware, Diamonds, Pearls, and Stones (CIBJO), and so on. Diamond cut ratings may include, but are not limited to, poor, fair, good, very good, excellent, ideal, and so forth. Diamond cut ratings may vary by the rating agency.

The user interface 1416 includes the quality of the cut 1422*b* as a category or field to be searched, and may include an image 1426*b* representing the cut, text 1428*b*, and selectable search options 1424*b*. The image 1426*b* included in the cut category 1422*b* may be an image representative of cut quality, and in some embodiments the image 1426*b* may change as a user selects one of the selectable search options 1424*b*. The text 1428*b* included in the cut category 1422*b* may be text relevant to the category, such as text describing the meaning of cut ratings and/or a description of a selected cut.

The user may select a cut quality from the selectable search options 1424*b* by interacting with the corresponding search option 1424*b*. For example, a user that wishes to search for excellent cut diamonds may select "Excellent" from the search options 1424*b*. In some embodiments, the user may select one option 1424*b* for cut, while in other embodiments the user may select multiple options 1424*b* for cut. Once the search is submitted, the diamond selection system then searches for diamond listings in accordance with the selected cut option(s) 1424*b*.

In some embodiments, the diamond selection system may search only for items which match the selected cut option 1424*b*. However, because the quality of a cut is graded on a scale, it may be understood (or the user may input as a further option) that similar cuts would be acceptable as well. Accordingly, the diamond selection system may also include similar cuts in the results list. For example, a user may select "Excellent" from the search options 1424*b*, and the diamond selection system may include very good and/or ideal cut diamonds as well in the search results. Typically, the search results would be ordered with the matching cut(s) appearing first, followed by similar cuts.

A third diamond feature or search category may be the color of the diamond 1422*c*. A diamond's color 1422*c* typically refers to whether the diamond is colorless (generally more desirable) or has some slight yellow color under natural light conditions. A diamond's color 1422*c* is typically graded according to a standard issued by a rating agency, such as GIA, AGS, EGL, HRD, IGI, CIBJO, and so on. Diamond color ratings may include, but are not limited to, D (absolutely colorless), E, F, G, H, I, J, K-Z (noticeable color). Diamond color ratings may vary by the rating agency.

The user interface 1416 includes the diamond color 1422*c* as a category or field to be searched, and may include an image 1426*c* representing the color, text 1428*c*, and selectable search options 1424*c*. The image 1426*c* included in the color category 1422*c* may be an image representing the color scale of diamonds, and in some embodiments the image 1426*c* may change as a user selects one of the selectable search options 1424*c* (e.g., by including an indicator for where the selected option 1424*c* appears on the scale). The text 1428*c* included in the color category 1422*c* may be text relevant to the category, such as text describing the meaning of color ratings and/or a description of a selected color.

The user may select a color from the selectable search options 1424*c* by interacting with the corresponding search option 1424*c*. For example, a user that wishes to search for F color diamonds may select "F" from the search options 1424*c*. In some embodiments, the user may select one option 1424*c* for color, while in other embodiments the user may select multiple options or a range of options 1424*c* for color. Once the search is submitted, the diamond selection system then searches for diamond listings in accordance with the selected color option(s) 1424*c*.

In some embodiments, the diamond selection system may search only for items which match the selected color option 1424*c*. However, because the color is graded on a scale in which differences between colors may be minute, it may be understood (or the user may input as a further option) that similar colors would be acceptable as well. Accordingly, the diamond selection system may also include similar colors in the results list. For example, a user may select "F" from the search options 1424*c*, and the diamond selection system may include D, E, and G color diamonds as well in the search results. Typically, the search results would be ordered with the matching color(s) appearing first, followed by similar colors.

A fourth diamond feature or search category may be the clarity of the diamond 1422*d*. A diamond's clarity 1422*d* typically refers to whether the diamond includes flaws (referred to as inclusions), and the visibility of the inclusions under 10× magnification. A diamond's clarity 1422*d* is typically graded according to a standard issued by a rating agency, such as GIA, AGS, EGL, HRD, IGI, CIBJO, and so on. Diamond clarity ratings may include, but are not limited to F (flawless), IF, VVS1, VVS2, VS1, VS2, SI1, SI2, I1, I2, and I3 (included). Diamond clarity ratings may vary by the rating agency.

The user interface 1416 includes the clarity of the diamond 1422*d* as a category or field to be searched, and may include an image 1426*d* representing clarity, text 1428*d*, and selectable search options 1424*d*. The image 1426*d* included in the clarity category 1422*d* may be an image representing the clarity/inclusions of diamonds, and in some embodiments the image 1426*d* may change as a user selects one of the selectable search options 1424*d* (e.g., by including an indicator for the amount/size of inclusions typical in the selected option 1424*d*). The text 1428*d* included in the clarity category 1422*d* may be text relevant to the category, such as text describing the meaning of clarity ratings and/or a description of a selected clarity rating.

The user may select a clarity rating from the selectable search options 1424*d* by interacting with the corresponding search option 1424*d*. For example, a user that wishes to search for VVS2 diamonds may select "VVS2" from the search options 1424*d*. In some embodiments, the user may select one option 1424*d* for clarity, while in other embodiments the user may select multiple options or a range of options 1424*d* for clarity. Once the search is submitted, the diamond selection system then searches for diamond listings in accordance with the selected clarity option(s) 1424*d*.

In some embodiments, the diamond selection system may search only for items which match the selected clarity option 1424*d*. However, because the clarity of a diamond is graded on a scale in which variations between grades may be minute, it may be understood (or the user may input as a further option) that similar clarity grades would be acceptable as well. Accordingly, the diamond selection system may also include similar clarity grades in the results list. For example, a user may select "VVS2" from the search options 1424*d*, and the diamond selection system may include VVS1, VS1, and VS2 graded diamonds as well in the search results. Typically, the search results would be ordered with the matching clarity grade(s) appearing first, followed by similar clarity grades.

A fifth diamond feature or search category may be the weight of the diamond 1422*e*. A diamond's weight 1422*e* is typically measured in carats, and the carat weight typically indicates a general size of the diamond (as the density of a diamond is relatively constant). The user interface 1416 includes the weight of the diamond 1422e as a category or field to be searched, and may include an image 1426e representing weight and/or size, text 1428e, and selectable search options 1424e. The image 1426e included in the weight category 1422e may be an image representing the weight and/or size of diamonds (e.g., an image comparing the size of a certain carat weight to a recognizable object), and in some embodiments the image 1426e may change as a user selects one of the selectable search options 1424e (e.g., by showing the size of diamonds in the selected option 1424e). The text 1428e included in the weight category 1422e may be text relevant to the category, such as text describing the weight and/or typical uses of diamonds within a selected weight range.

The user may select a range of diamond carat weights from the selectable search options 1424e by interacting with the corresponding search option 1424e. For example, a user that wishes to search for 1-1.5 carat diamonds may select "1-1.5" from the search options 1424e. In some embodiments, the user may select a range for weight, while in other embodiments the user may select multiple weight range options 1424e or a larger weight range. Once the search is submitted, the diamond selection system then searches for diamond listings in accordance with the selected weight option(s) 1424e.

In some embodiments, the diamond selection system may search only for items within the selected weight range option 1424e. However, because the weight of the diamonds is broken into discrete weight ranges, it may be understood (or the user may input as a further option) that diamonds slightly outside the selected weight range 1424e or in adjacent weight ranges would be acceptable as well. Accordingly, the diamond selection system may also include diamonds outside the selected weight range(s) in the results list. For example, a user may select "1-1.5" from the search options 1424e, and the diamond selection system may include diamonds in the 0.5-1 and/or 1.5-2 weight ranges in the search results, whether the entire of the adjacent ranges or a subset of the adjacent ranges. Typically, the search results would be ordered in ascending or descending order by weight, though this is not required.

With respect to the diamond feature ranking 1430, the user may interact with the diamond feature ranking 1430 in order to indicate a preferred order of search results. Some or all of the diamond features 1422a-1422e may be included as preferred or ranked diamond features 1434. The user may select an ordered option 1432 for some or all of the ranked diamond features 1434. For example, as depicted the user may set a "1" for shape, a "2" for carat weight, a "3" for color, a "4" for cut, and a "5" for clarity. The selectable ranking options 1432 indicate to the diamond selection system that the user prefers diamonds matching the selected shape option first, followed by diamonds matching the selected carat weight, followed by color, followed by cut, and followed by clarity.

Accordingly, when the search is submitted to the diamond selection system, search results may be populated in accordance with the selected diamond features or selectable options. In some embodiments, the search results may also be determined based on the diamond feature ranking 1430. For example, diamonds matching all search parameters may be first in the search results. The search results may then include diamonds matching the first four categories, but which are similar but not an exact match for the fifth ranked category (e.g., clarity). The search results may then include diamonds matching the first three categories, but which are similar but not an exact match for the fourth or fifth ranked categories (e.g., cut or clarity). The ranking of search results may continue in a similar manner.

In some implementations, the search results may include all diamonds that match the user's selected diamond features or selectable options. The list of matching diamonds may be further filtered or grouped using the diamond feature ranking 1430 to include a subset of the search results that are more closely matched to those search categories that were ranked by the user as higher or highest. In some cases, the subset of search results is then ordered according to those that most closely match highly-ranked diamond features or search parameters. Furthermore, the user may modify or update the relative rank of two or more search categories or diamond features, which may be used to determine a modified or updated subset of listings and/or a modified or updated order.

While the above examples have been given with respect to particular examples, other examples are included in the present disclosure. For example, in some embodiments a user may be required to select at least one option in each search category/diamond feature and to rank the categories before submitting a search. In some embodiments, the user need only select at least one option in a subset of the search categories before submitting a search. The ranking may further be optional, or the method of ranking the search results may vary. While the search categories have been depicted with selectable options, in other embodiments the user may input options through an adjustable range (e.g., a graphical slide selector).

In some embodiments, the user interface 1416 may include an option to save 1435 search parameters. Search parameters may be saved to a user profile, temporarily saved within a session, or otherwise stored for later retrieval. The saved search parameters may be stored and recalled during a subsequent session or later on during the same session. The option to save 1435 may be presented in the portion of the user interface depicted in FIG. 14, or in other portions of the user interface such as those depicted below with respect to FIGS. 15-24. Accordingly, a user may use the save 1435 option to save search parameters, search results, or later modified search parameters and/or results. In some instances, the save 1435 option may store the search parameters, the search results, and/or other session related activities or settings.

The user interface 1416 may further include an option to conduct a new search 1437. Selecting the new search 1437 may clear some or all of the search parameters entered or selected by the user. In some cases, the new search 1437 clears all prior search data associated with the user. Alternatively, the new search 1437 may clear only the most recently entered search parameters (e.g., the criteria entered using the interface of FIG. 14) and maintain or preserve other user settings or preferences. In some embodiments, search parameters and/or results may persist after an initial search, and the new search option 1437 may allow a user to conduct a search without the persistent parameters and/or results. The new search option 1437 may be presented in the portion of the user interface depicted in FIG. 14, or in other portions of the user interface such as those depicted below with respect to FIGS. 15-24.

Figure 15:
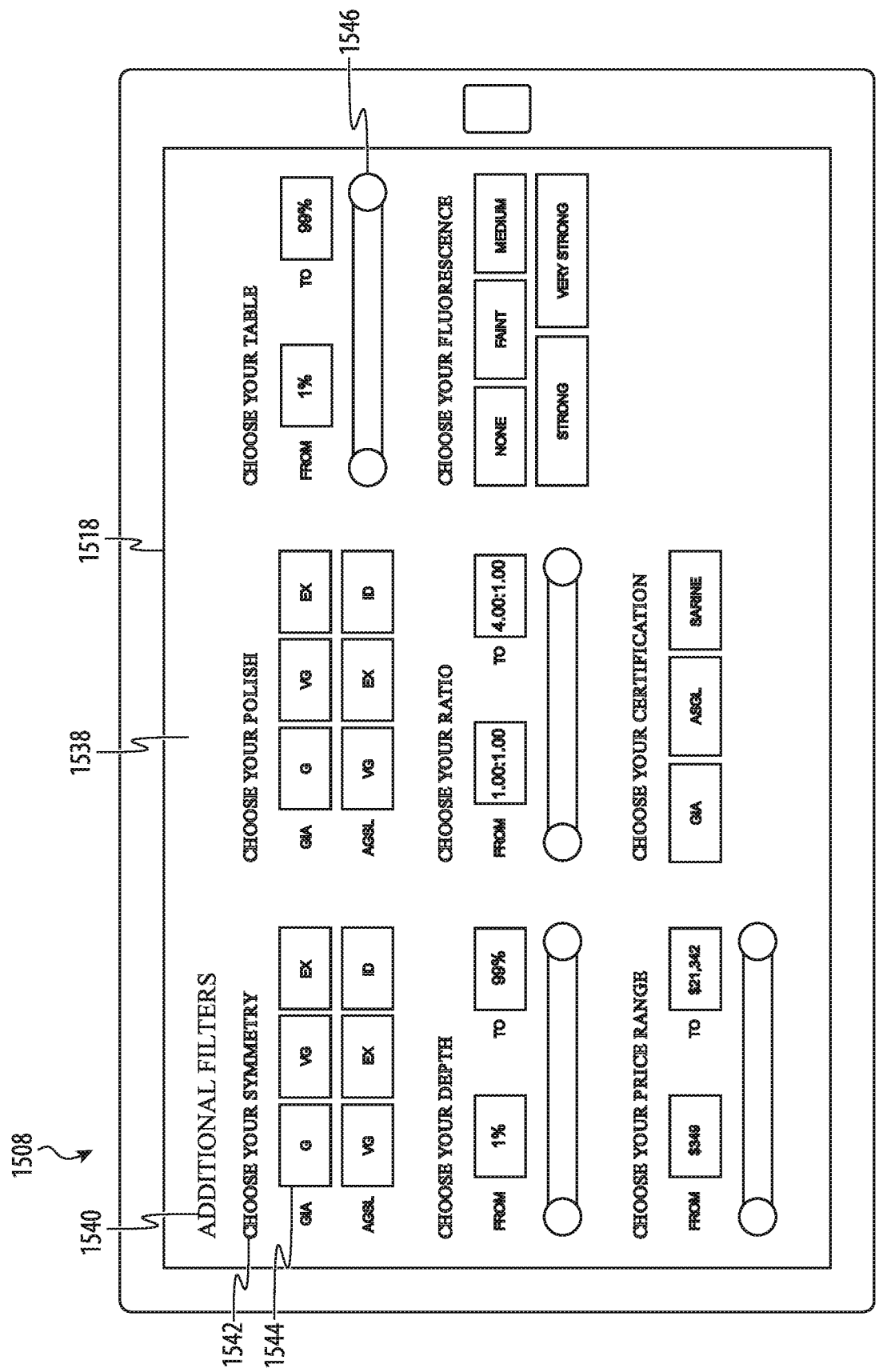
FIG. 15 depicts an additional filter interface, which may be presented to a user that selects the additional filters option of FIG. 14.

As shown in FIG. 14, the user may be presented with an option to select additional filters 1436. FIG. 15 depicts an additional filter interface 1538, which may be presented to a user that selects the additional filters option of FIG. 14. As depicted in FIG. 15, an example additional filter interface generated by the diamond selection system on the display

1518 of a user computing device 1508 is shown displaying one or more interactive portions for use by a user.

The additional filter interface 1538 may include a title 1540 of the additional filter interface 1538 and/or other information, such as instructions on the additional filters 1542. Another portion of the additional filter interface 1538 may include additional search filters 1542. Each additional search filter 1542 may correspond to further gemological features or other features associated with diamond listings. The additional search filters may include the symmetry rating of a diamond, the polish rating, the table percentage, the depth percentage, the ratio, the fluorescence, the price range, and the certification authority. In some embodiments, additional or fewer search filters 1542 may be included in the additional filter interface 1538.

Each search filter 1542 includes text identifying the search filter 1542 and selectable options 1544 and/or an adjustable range 1546 (e.g., a graphical slide selector). In some embodiments, some or all of the search filters 1542 may further include additional images and/or text to represent and/or further explain the search filter 1542. A user may select options 1544 and/or adjust a range (e.g., move a graphical slide selector) 1546 for some or all additional search filters 1542 and apply those in addition to the search parameters as depicted in FIG. 14.

Similar to the search parameters depicted in FIG. 14, once the search is submitted, the diamond selection system then searches for diamond listings in accordance with the selected option(s) 1544 and/or range(s) 1546 of the additional search filters 1542. In some embodiments, the diamond selection system may search only for items which match the selected options 1544 or ranges 1546. However, because many of the options 1544 and ranges 1546 represent scaled values or grades, it may be understood (or the user may input as a further option) that similar features associated with a given search filter 1542 would be acceptable as well. Accordingly, the diamond selection system may also include similar features to the selected options and/or ranges 1546.

Figure 16A:
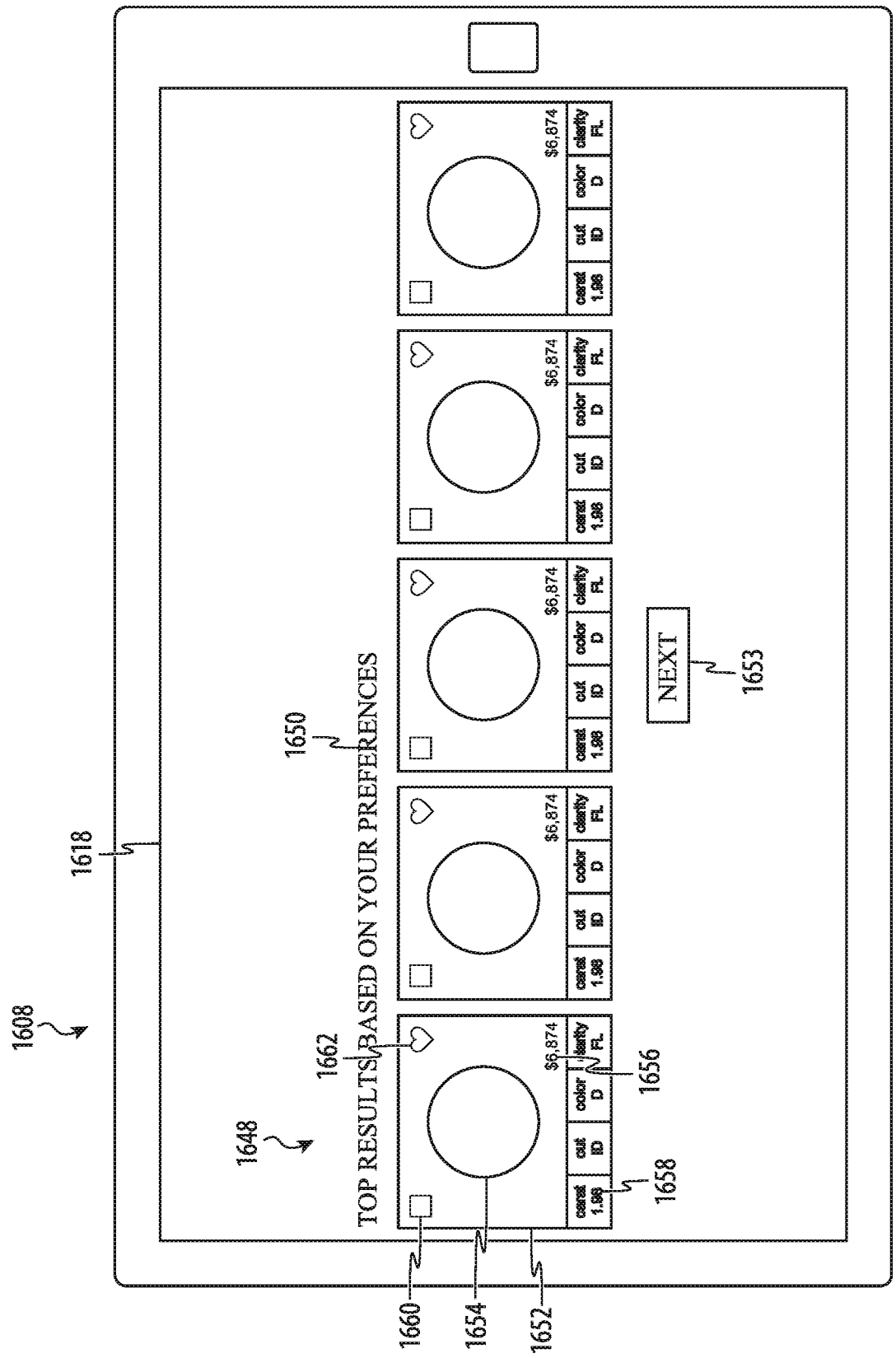
FIG. 16A depicts an example search results list generated in response to a user submitting search parameters to the diamond selection system.

Turning to FIG. 16A, a search results list 1648 is depicted. The search results list 1648 may be generated in response to the submission of search parameters (such as depicted in FIG. 14), the ranking or preferences (such as depicted in FIG. 14), and/or additional search filters (such as depicted in FIG. 15). As depicted in FIG. 16A, a search results list 1648 is generated by the diamond selection system on the display 1618 of a user computing device 1608. The search results list 1648 includes text 1650 and a graphical representation of diamond listings 1652 generated in response to user search parameters.

In some cases, the list 1648 is a subset of all of the diamond listings that match the user's search parameters. For example, the matching diamond listings that are retrieved from the database that match the user's criteria may be further curated using the user's preferences or ranking of the various search categories. In particular, those diamond listings that are more closely matched to search categories that the user indicated as having a higher rank or preference may be selected over diamond listings that are less closely matched to higher ranked search categories. Furthermore, in some implementations, the list 1648 may be ordered in accordance with the rank or preference of the various search categories with diamond listings having the closest match for the highest ranked search category earlier or higher in the presentation order or list order. Additional search results may be presented in response to user selection of a "Next" option 1653.

The text 1650 in the search results list 1648 may include a title, and may include additional information relevant to the search (e.g., number of search results). Each diamond listing 1652 may include an image 1654 (e.g., an image of the diamond associated with the listing 1652) and additional information related to the diamond listing 1652. The diamond listings 1652 may be arrayed on the search results list 1648 in an appropriate manner, for example, in one or more rows and/or columns.

The additional information included with each diamond listing 1652 may include a price 1656 (which may be expressed in an appropriate denomination, such as U.S. dollars, euros, pounds sterling, and so on) and/or gemological features 1658 of the diamond. The gemological features 1658 may include any relevant features, such as carat weight, cut, color, and clarity.

In some embodiments, a diamond listing 1652 may also be interactive with a user. For example, the diamond listing 1652 may include an option to add a diamond to a favorites list 1662. Selecting the favorites list option 1662 may associate the diamond listing 1652 with a list of diamond listings 1652 for later review and interaction. The diamond listing 1652 may further include a graphical indication that it has been added to the favorites list 1662 (e.g., by filling in the heart representing the favorites list). The user may further interact with the diamond listing 1652 by selecting the listing 1652, such as through a checkbox 1660. Selecting the checkbox 1660 may allow further interactions, such as adding the diamond listing 1652 to a shopping cart, comparing multiple diamond listings 1652, removing the diamond listing 1652 from the results list, and so on.

Figure 16B:
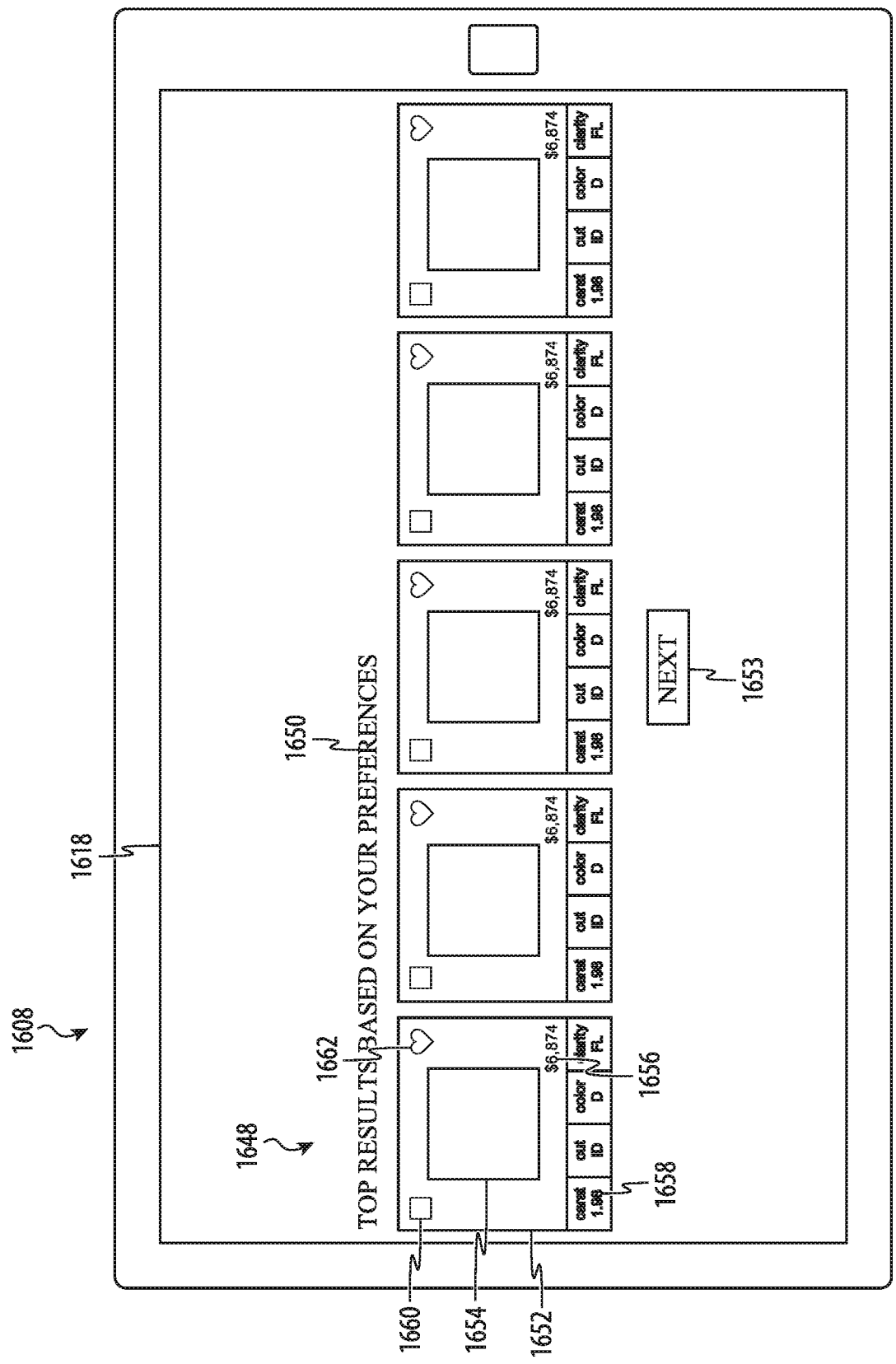
FIG. 16B depicts an additional list of further search results.

In some implementations, the user may select further search results for viewing. As shown in FIG. 16A, the user may select an option 1653 (e.g., "Next"), which may prompt the system to depict further search results. FIG. 16B depicts an example of further or additional search results that may be presented in response to a user selection. In particular, the additional results of FIG. 16B may be presented in response to user selection of a "Next" option 1653. In some implementations, selecting the "Next" option 1653 may present to a user an additional list 1648 of search results, which may be the next most relevant set of results matching the user's search parameters. The additional list 1648a may be a subset of all of the additional diamond listings that match the user's search parameters, and the "Next" option 1653 may remain available for displaying further search results. The user may continue to view and browse additional search results by continuing to select the corresponding "Next" options.

As shown in FIG. 16B, curated diamond listings 1652a appearing in the additional list 1648a may be similar to the diamond listings 1652 of FIG. 16A. The list 1648 and additional list 1648a may be curated or developed using the user's preferences and/or the user's ranking of the various search categories. In one example, a user may rank diamond shape lower than some or all other search parameters. In the example depicted in FIGS. 16A and 16B, the first five curated diamond listings 1652 in the list 1648 (depicted in FIG. 16A) may be most closely matched to the user's more highly ranked search parameters. As the user explores deeper into the search results (e.g., by selecting the "Next" option 1653) the search results may remain closely matched to the more highly ranked search parameters but diverge from the lower ranked criteria. In particular, a lower ranked preference for diamond shape may result in a set of diamond listings 1652a that allow some variability in diamond shape while still closely matching the other more highly ranked search parameters.

Figure 17:
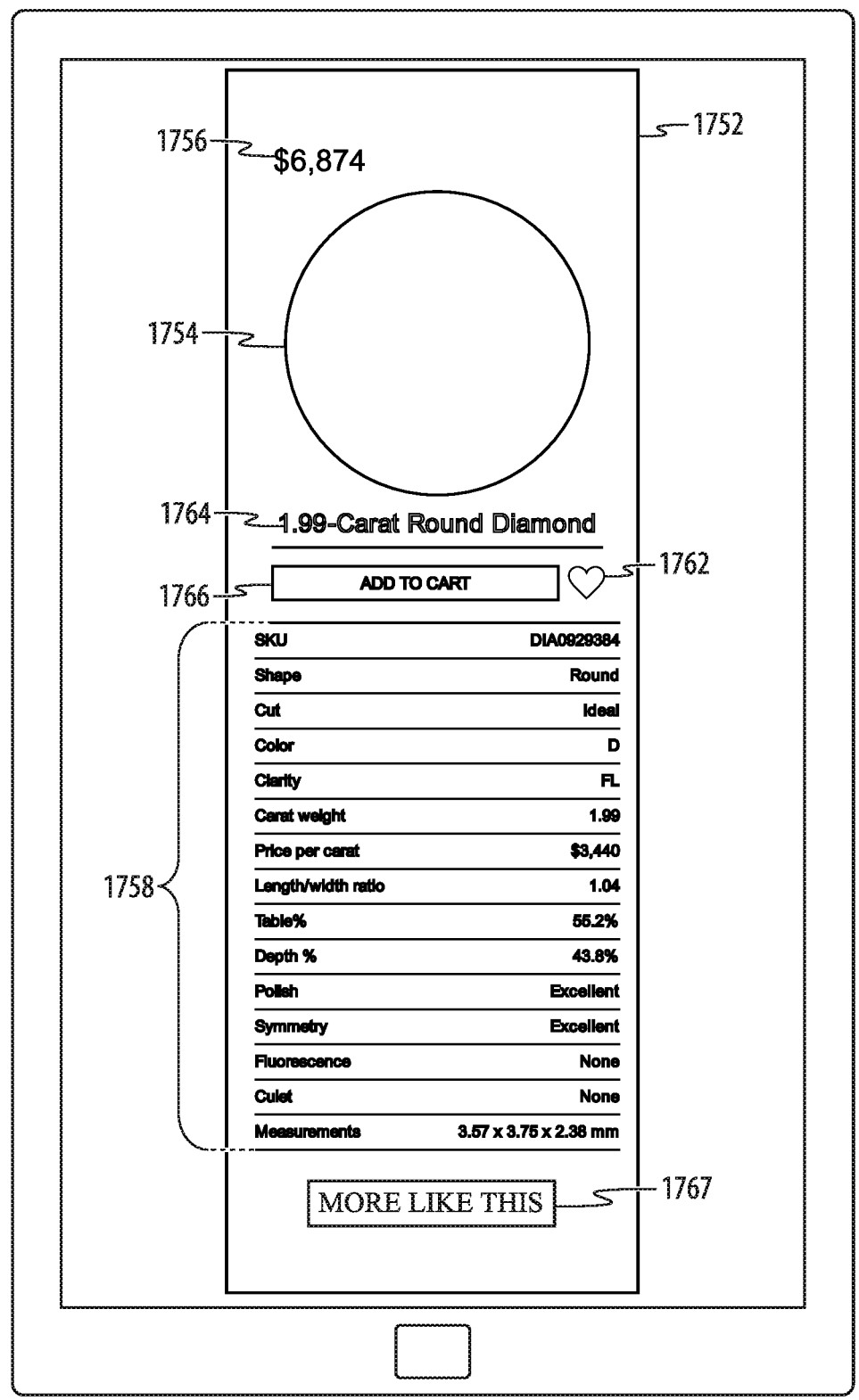
FIG. 17 depicts an example of a detailed diamond listing.

In some embodiments, selecting a diamond listing 1652 (e.g., by selecting the checkbox 1660 or by selecting the diamond listing 1652 itself) may generate further details of the diamond listing 1652, as depicted in FIG. 17. FIG. 17 depicts a detailed diamond listing 1752. The detailed diamond listing 1752 may be displayed as a sole page, or it may be overlaid on another interface, such as the results list depicted in FIGS. 16A and 16B.

The detailed diamond listing 1752 of FIG. 17 includes an image 1754, which may be an image of the diamond represented by the diamond listing 1752. In some embodiments, the detailed diamond listing 1752 may include multiple images of the associated diamond and/or an interactive or three-dimensional image of the diamond. The detailed diamond listing 1752 further includes a price 1756 and text 1764 associated with the diamond (e.g., a description of the diamond and/or additional details related to the diamond).

The detailed diamond listing 1752 includes additional information 1758 on the associated diamond. The additional information 1758 may be listed under various categories. Examples of the additional information 1758 categories include an item identification (SKU), shape, cut, color, clarity, carat weight, price per carat, length/width ratio, table percentage, depth percentage, polish, symmetry, fluorescence, culet, and measurements. In some embodiments, additional or less information may be included in the detailed diamond listing 1752.

In some embodiments, a detailed diamond listing 1752 may also be interactive with a user. For example, the detailed diamond listing 1752 may include an option to add a diamond to a favorites list 1762. Selecting the favorites list option 1762 may associate the detailed diamond listing 1752 with a list of diamond listings for later review and interaction. The detailed diamond listing 1752 may further include a graphical indication that it has been added to the favorites list 1762 (e.g., by filling in the heart representing the favorites list). The user may further interact with the detailed diamond listing 1752 by adding the diamond listing 1752 to a shopping cart 1766. Other interactive features may be included in the detailed diamond listing 1752 as appropriate.

For example, the detailed diamond listing 1752 may include a "More Like This" option 1767, in order to retrieve additional diamond listings similar to the detailed diamond listing 1752. In some embodiments, the similar diamond listings may be selected from among the existing search results depicted in FIGS. 16A and 16B. In other embodiments, a new search may be performed to select similar diamond listings from the database of the diamond selection system. In still other embodiments, the detailed diamond listing 1752 may be cross-referenced with other listings through data tags, an index, or similar data structure and a search of these cross-references may be conducted.

Figure 18:
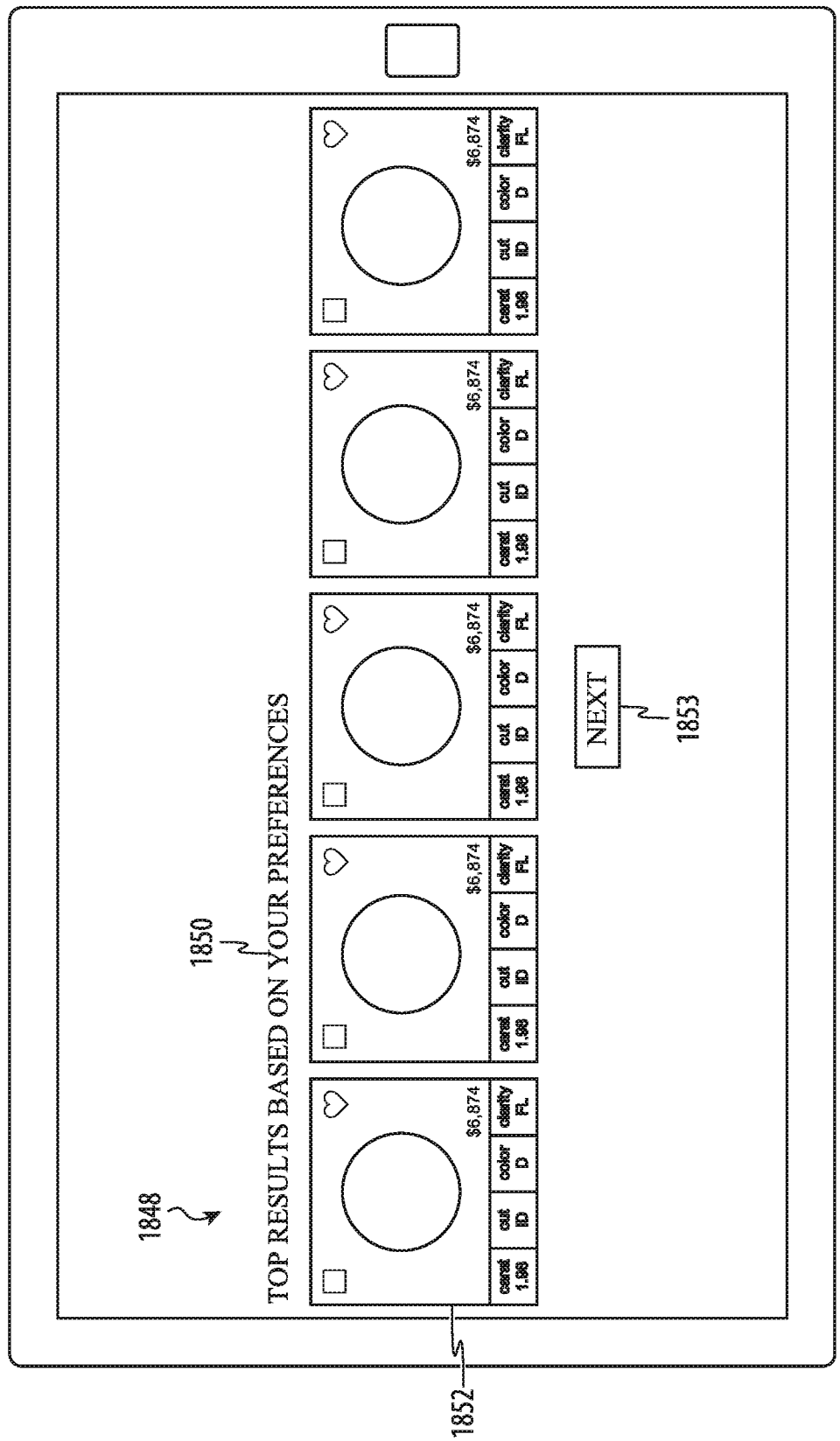
FIG. 18 depicts an example list of search results that may correspond to a user selection or preference.

Turning to FIG. 18, once a user has selected the "More Like This" option 1767, a new list 1848 of diamond listings is generated. The new list 1848 may be arranged in accordance with a ranking previously set by a user (e.g., at FIG. 14), or the user may set a new ranking (e.g., through an additional dialog box) and the new list 1848 may be arranged accordingly. Similar to the ranking described with respect to FIGS. 14, 16A, and 16B, the diamond features may be ranked from highest to lowest.

In retrieving and arranging diamond listings 1852 which are "More Like This," the diamond selection system may retrieve diamond listings which match at least some of the features of the diamond listing of FIG. 17. A search range may be set for each diamond feature according to the selected ranking; the highest ranked diamond feature may have a small or no range, and the range to be searched may increase with each lower ranked feature. For example, if color is ranked first and weight is ranked second, all search results may be required to match the color of the diamond listing of FIG. 17, while the search results may include diamonds within 0.05 carats of the same diamond listing. The search results may include a broader range of values for each lower ranked diamond feature.

After the search results have been retrieved, they may be arranged according to the selected ranking in a new list 1848 and displayed to the user. The new list 1848 may be displayed in a similar manner as depicted above with respect to FIGS. 16A and 16B. For example, the new list 1848 includes text 1850 relevant to the search results and graphical representations of diamond listing 1852. Additional search results may be presented in response to user selection of a "Next" option 1853. In some implementations, the search results may be used to provide additional details to the user using an overlay or pop-up window display.

Figure 19:
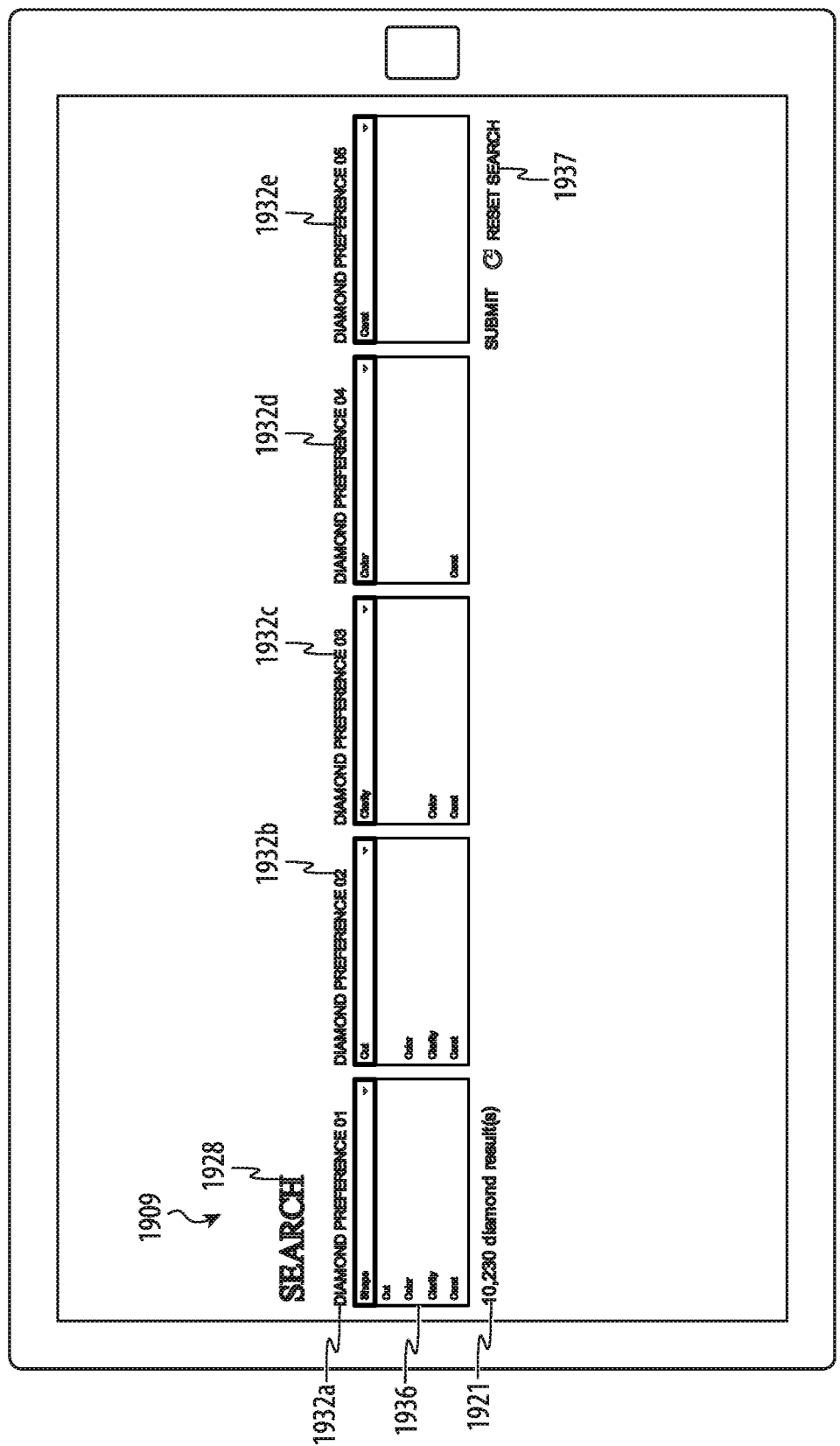
FIG. 19 depicts a ranking menu for ranking search results.

Turning to FIG. 19, in some embodiments a user may refine a search by selecting an additional ranking. FIG. 19 depicts a ranking menu 1909 for ranking search results after an initial query (as depicted in FIGS. 16A and 16B) or another search (as depicted in FIG. 18). The menu 1909 may be a separate interface, or it may be presented adjacent to the search results on a same interface. One portion of the ranking menu 1909 includes a title 1922 of the diamond selection system and/or other information, such as instructions on interacting with the ranking feature. The ranking menu 1909 may further include additional information 1921, such as the number of results if the additional ranking is applied. Another portion of the ranking menu 1909 includes diamond ranking options 1932*a*-1932*e* in which the user may select an ordered list of diamond features 1936.

In some embodiments, this additional ranking may be applied to the existing search, such that the number of results is further refined and/or reordered. For example, re-ranking diamond features 1936 higher than the initial search may filter those features 1936 more tightly (e.g., through a narrower range), excluding diamond listings which were previously included. In other embodiments, the additional ranking may replace the initial ranking.

The ranking menu 1909 may further include an option to reset the search 1937, which may return the user to the user interface depicted in FIG. 14. In some examples, the reset search option 1937 may instead reset the additional ranking, returning the results to the initial search results.

Figure 20:
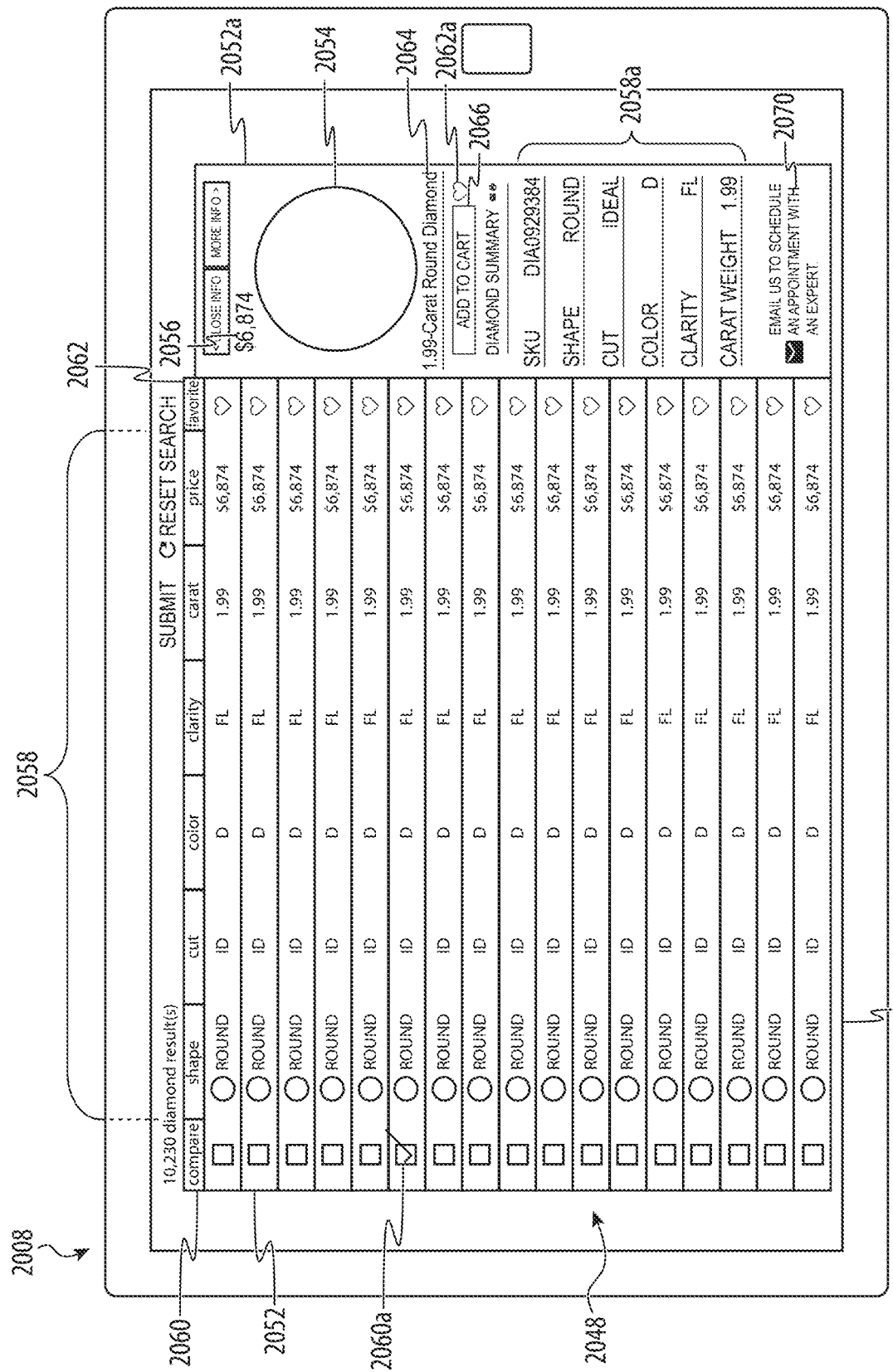
FIG. 20 depicts another example search results list.

FIG. 20 depicts another example search results list generated in response to the submission of search parameters (such as depicted in FIG. 14) and/or additional search filters (such as depicted in FIG. 15). As depicted in FIG. 20, a search results list 2048 is generated by the diamond selection system on the display 2018 of a user computing device 2008. The search results list 2048 includes diamond listings 2052 generated in response to user search parameters and arranged in rows, having columns of details related to each diamond listing 2052.

The columns of information associated with the diamond listings 2052 include gemological features 2058. The columns may also include interactive columns 2060, 2062. The gemological features 2058 associated with the diamond listings 2052 may include the shape, cut, color, clarity, carat weight, and price. In some embodiments additional or fewer columns may be included in the search results list 2048.

The interactive columns 2060, 2062 may include an option to add a diamond to a favorites list (e.g., diamond listings 2052). Selecting a favorites list option may associate the diamond listing 2052 with a list of diamond listings 2052 for later review and interaction. The diamond listing 2052 may further include a graphical indication that it has been added to the favorites list 2062a (e.g., by filling in the heart representing the favorites list). Another interactive column 2060 may allow a user to select one or more diamond listings 2052. Selecting a checkbox 2060a may allow further interactions, such as adding the listing 2052 to a shopping cart, comparing multiple listings 2052, removing the listing 2052 from the results list, and so on.

In some embodiments, selecting the checkbox 2060a may generate a detailed diamond listing 2052a. The detailed diamond listing 2052a may be displayed adjacent the search results list 2048. In some embodiments, the detailed diamond listing 2052a may be displayed as a sole page, or it may be overlaid on the search results list 2048.

The detailed diamond listing 2052a includes an image 2054, which may be an image of the diamond represented by the detailed diamond listing 2052a. In some embodiments, the detailed diamond listing 2052a may include multiple images of the associated diamond and/or an interactive or three-dimensional image of the diamond. The detailed diamond listing 2052a further includes a price 2056 and text 2064 associated with the diamond (e.g., a description of the diamond and/or additional details related to the diamond).

The detailed diamond listing 2052a includes additional information 2058a on the associated diamond. The additional information 2058a may be listed under various categories. Examples of the additional information 2058a categories include an item identification (SKU), shape, cut, color, clarity, carat weight, price per carat, length/width ratio, table percentage, depth percentage, polish, symmetry, fluorescence, culet, and measurements. In some embodiments, additional or less information may be included in the detailed diamond listing 2052a.

In some embodiments, a detailed diamond listing 2052a may also be interactive with a user. For example, the detailed diamond listing 2052a may include an option to add a diamond to a favorites list 2062a and/or a graphical indication that it has been added to the favorites list 2062. The user may further interact with the detailed diamond listing 2052a by adding the diamond listing 2052 to a shopping cart 2066. Other interactive features may be included in the detailed diamond listing 2052a, such as an option to communicate with a representative 2070.

Figure 21:
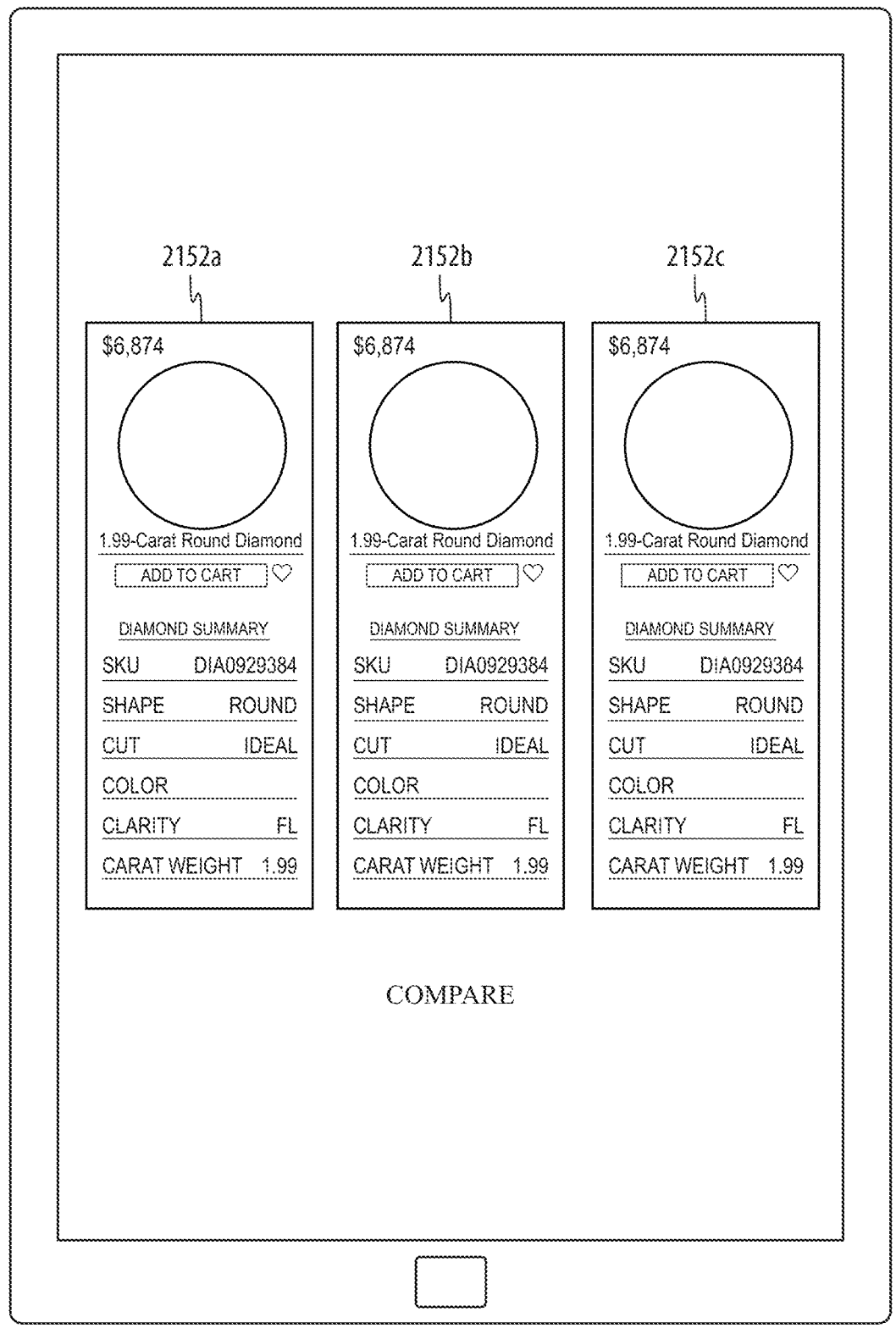
FIG. 21 depicts an example comparison of multiple diamond listings.

FIG. 21 depicts an example comparison of multiple diamond listings. As described with respect to FIGS. 16A, 16B, and 20, multiple diamond listings 2152a, 2152b, 2152c may be selected for comparison. After the diamond listings 2152a, 2152b, 2152c have been selected, the user interface may present detailed diamond listings 2152a, 2152b, 2152c adjacent each other for comparison. The detailed diamond listings 2152a, 2152b, 2152c may be similar to the detailed diamond listings described above with respect to FIGS. 17 and 20.

Figure 22:
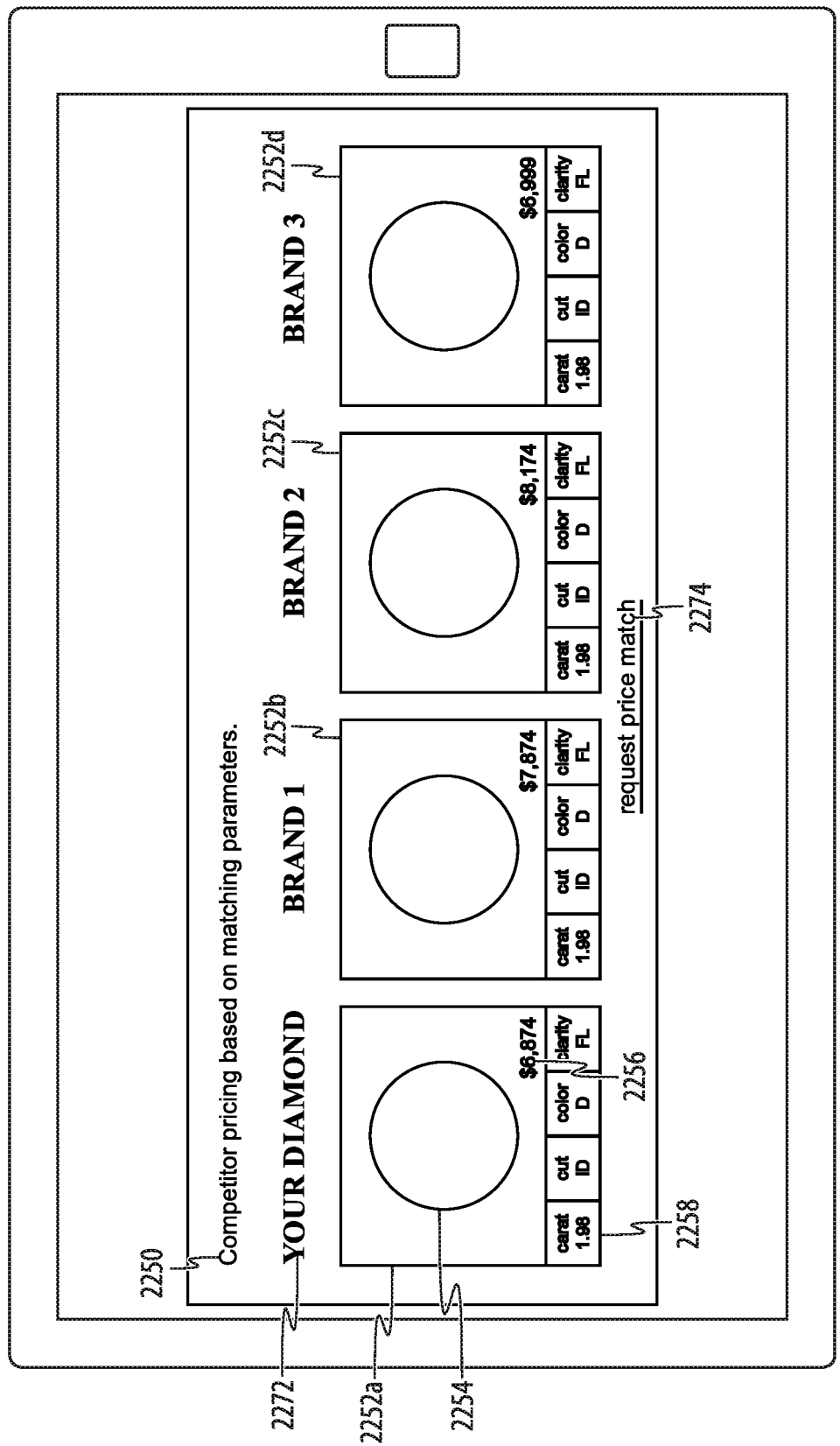
FIG. 22 depicts an example price comparison with third-party diamond listings.

FIG. 22 depicts an example price comparison with third-party diamond listings. In some embodiments, the user may select a diamond listing 2252a for a price comparison with diamond listings 2252b, 2252c, 2252d available through one or more third-party systems. The diamond listing 2252a may be selected for third-party price comparison from any search results lists or detailed diamond listings, such as described above with respect to FIGS. 16A-21.

After a diamond listing 2252a has been selected for third-party price comparison, the diamond selection system may present one or more third-party diamond listings 2252b, 2252c, 2252d to the user. In some cases, the diamond selection system may communicate with one or more third-party systems (e.g., systems of diamond vendors) to search for diamond listings to be included in the database of the diamond selection system. Thus the diamond selection system may present third-party diamond listings 2252b, 2252c, 2252d for comparison from its database.

In other cases, the diamond selection system may search for third-party diamond listings 2252b, 2252c, 2252d when a request for comparison has been made. Third-party diamond listings 2252b, 2252c, 2252d may be made available to the diamond selection system, or the diamond selection system may extract information from third-party systems to generate third-party diamond listings 2252b, 2252c, 2252d.

Third-party diamond listings 2252b, 2252c, 2252d may be searched for based on having the same or similar gemological features as the selected diamond listing 2252a. Once the third-party diamond listings 2252b, 2252c, 2252d have been selected, they may be presented to the user through a user interface alongside the selected diamond listing 2252a. The user interface includes text 2250 and a graphical representation of the diamond listings 2252a-2252d.

The text 2250 may include a title relevant to the presentation of a price comparison, and may include additional information relevant to the comparison (e.g., number of search results). Each diamond listing 2252a-2252d may include an image 2254 (e.g., an image of the diamond associated with the listing) and additional information related to the diamond listings 2252a-2252d. The diamond listings 2252a-2252d may be arrayed on the search results list in an appropriate manner, for example, in one or more rows and/or columns.

The additional information included with each diamond listing 2252a-2252d may include a price 2256 and/or gemological features 2258 of the diamond. The gemological features 2258 may include any relevant features, such as carat weight, cut, color, and clarity. Each diamond listing 2252a-2252d may also include information 2272 regarding the source of the diamond listing 2252a-2252d (e.g., the name of the vendor). Further options may be presented to the user as well, such as an interactive option to request a price match 2274 from the diamond selection system.

The examples provided above with respect to FIGS. 14-22 are generally directed to a system and techniques for curating a set of diamond listings or candidate diamonds from a very large set of potential candidates. As described above, a user can use the system described above to generate a small list of potential diamonds and, ultimately, select a single diamond that best satisfies their preferences or meets their particular criteria.

Figure 23:
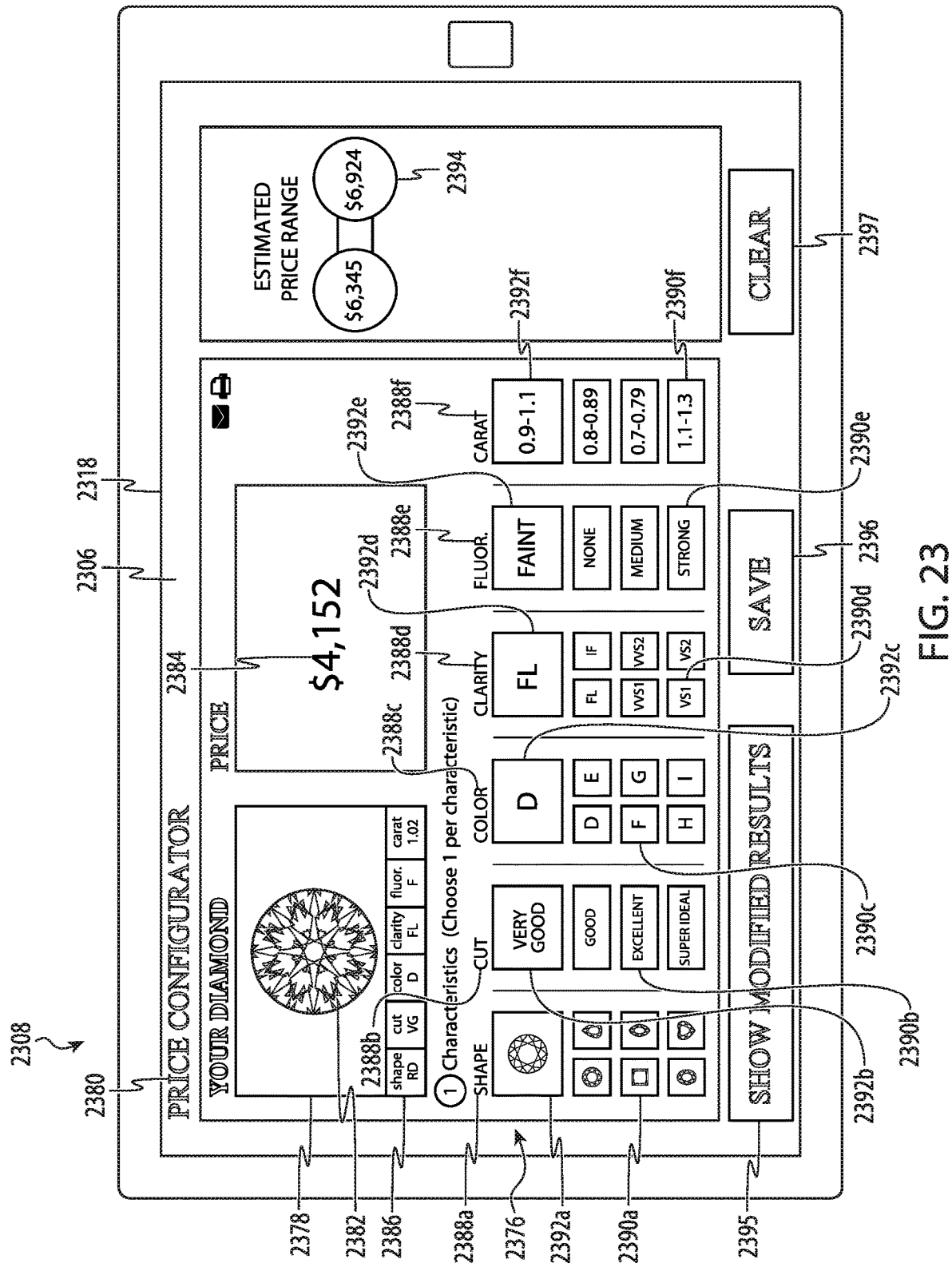
FIG. 23 depicts an example user interface for searching for additional diamonds having features similar to an initially selected diamond listing.

However, in some instances, the selected diamond may not fit the user's budget or may otherwise not be cost appropriate. FIGS. 23 and 24, discussed below, describe an example user interface for starting with a selected diamond and varying one or more characteristics in order to generate a new estimated price range or list of potential diamond listings or candidates. The user interface of FIGS. 23 and 24 may be particularly useful for visualizing the effect on price if a user has more flexibility with a diamond characteristic. For example, if a user does not have a strong preference for the quality of a diamond cut, the user may select a lower or reduced quality option through the user interface and generate a new estimated price range. The user may also view a new set of diamond listings that satisfies the modified or adapted criteria that deviates from the initial diamond selection as specified by the user.

FIG. 23 depicts an example user interface for searching for additional diamonds having features similar to an initially selected diamond or diamond listing. The user interface 2376 may be generated or displayed on a portal 2306 operating on a computing device 2308 (e.g., a personal computing system). In some embodiments, the portal 2306 may be a remote portal operating the user interface 2376, which may access a diamond selection system or diamond search interface, such as described in FIG. 1 above.

In the present example, the portal 2306 includes a user interface 2376 on a display 2318 of a computing device 2308, such as a tablet or smartphone (or other computing devices, such as a desktop computing system, a notebook computing system, a terminal, an electronic kiosk, and so on). In the present example, the user interface 2376 may include one or more portions that allow for interaction with the portal 2306, the diamond selection system, a third-party system, and/or the services provided by the American Gem Society (AGS).

The user interface 2376 depicted in FIG. 23 may be generated in response to a selection of an initial diamond listing 2378. It is not necessary that the initial diamond listing 2378 be selected from the user interface 2376. In fact, the initial diamond listing 2378 is typically selected as a result of a previous search, such as described above with respect to FIGS. 14-22, by entry into the system of a diamond listing identifier, or by another method. For example, a detailed diamond listing such as described with respect to FIG. 17 may include an option to find similar diamond listings. Once a specific diamond is selected, the user interface 2376 depicted in FIG. 23 may be used to search for additional diamonds having features similar to the specific diamond that has been selected (represented by, for example, the initial diamond listing 2378).

Once a diamond corresponding to the initial diamond listing 2378 is selected, the user interface 2376 may be generated. As shown in FIG. 23, one portion of the user interface 2376 includes a title 2380 of the diamond search feature and/or other information, such as instructions on interacting with the diamond search feature. The user interface 2376 may include the initial diamond listing 2378, which may include an image 2382 (e.g., an image of the diamond associated with the initial diamond listing 2378) and additional information related to the initial diamond listing 2378.

The additional information included with the initial diamond listing 2378 may include a price 2384 (which may be expressed in an appropriate denomination, such as U.S. dollars, euros, pounds sterling, and so on) and/or gemological features 2386 of the diamond. The gemological features 2386 may include any relevant features, such as shape, carat weight, cut, color, clarity, and fluorescence.

Another portion of the user interface 2376 includes searchable diamond features or search categories 2388a-2388f. In the present embodiment, the search categories 2388a-2388f are represented by a corresponding selectable graphical representation or thumbnail. Each diamond feature or search category 2388a-2388f includes selectable search options 2390a-2390f that correspond to the diamond feature (e.g., shape 2390a, cut 2390b, color 2390c, clarity 2390d, fluorescence 2390e, and carat weight 23900. In some embodiments, the diamond feature represented by the search category 2388a-2388f is graded along a scale (e.g., set of values). The scale may be continuous, graduated, or may correspond to a series of grades or values associated with the particular diamond feature or search category.

In some embodiments, when the user interface 2376 is first generated, indicia 2392a-2392f of one of the selectable options may be included for at least some of the diamond features or search categories 2388a-2388f. Each indicia 2392a-2392f represents a value (or range of values) which corresponds to a feature of the initial diamond listing 2378. For example, the initial diamond listing 2378 may have a round shape, which may be represented by an indicium 2392a (e.g., a graphic or textual representation) of "round" under the search category 2388a of shape.

Similarly, the value "very good" may be represented by an indicium 2392b under the cut search category 2388b and the value "D" may be represented by an indicium 2392c under the color search category 2388c. The value "FL" may be represented by an indicium 2392d under the clarity search category 2388d, the value "faint" may be represented by an indicium 2392e under the fluorescence search category 2388e, and the range of values "0.9-1.1" may be represented by an indicium 2392f under the carat weight search category 2388f.

Accordingly, the indicia 2392a-2392f under each diamond feature or search category 2388a-2388f may represent values for the features of the initial diamond listing 2378. In some embodiments, the indicia 2392a-2392f may appear as enlarged selectable options 2390a-2390f, such as depicted in FIG. 23. In other embodiments, the indicia 2392a-2392f may be visually represented in a different manner, such as highlighted selectable options 2390a-2390f, arrows adjacent selectable options 2390a-2390f, and so on.

In some embodiments, when the user interface 2376 is first generated, an estimated price range 2394 may be provided, which may correspond to diamond listings having features which match or nearly match the features of the initial diamond listing 2378. For example, initiating the search feature illustrated in FIG. 23 (e.g., through selection of an initial diamond listing 2378) may cause the portal 2306 to request a search of a database of diamond listings for a set of diamond listings matching or nearly matching the features of the initial diamond listing 2378. The results of the search may provide a range of prices for diamonds having matching or nearly matching features, which may be displayed as the estimated price range 2394.

A user may desire to search for additional diamond listings and/or an updated price range 2394 having one or more diamond features which are modified from the initial diamond listing 2378. For example, a user may explore changes in the price range 2394 which result from increasing or decreasing the grade of a diamond feature, represented by a search category 2388a-2388f.

Thus the user interface 2376 may generate a price range 2394, additional diamond listings, and additional information for diamond listings having features similar to the initially selected diamond listing 2378. The user may modify the values (or range of values) of diamond features being searched by selecting one or more of the selectable search options 2390a-2390f which is different from the indicia 2392a-2392f corresponding with the initial diamond listing 2378. For example, the user may modify the set of values from those corresponding to the initial diamond listing 2378 by selecting a different search option 2390b for the diamond cut category 2388b. Values for other search categories may additionally or alternatively be modified, such as the shape 2388a, color 2388c, clarity 2388d, fluorescence 2388e, or weight (in carats) 2388f. In some embodiments, additional or fewer diamond features may be included in the user interface 2376.

In an example, a user may wish to obtain a price range 2394 and/or obtain additional diamond listings which have an emerald shape, but which otherwise have similar features to the initial diamond listing 2378. To do so the user may select search option 2390a corresponding to the emerald shape (e.g., by touching a corresponding region of a touch-sensitive display). In some embodiments, the user may select one option 2390a for shape, while in other embodiments the user may select multiple options 2390a for shape.

Once the shape search option 2390a has been modified from the value corresponding to the initial diamond listing 2378 (e.g., the value represented by the indicium 2392a), an estimated price range 2394 may be generated. In some embodiments, a previous price range 2394 corresponding to the initial diamond listing 2378 may be updated, or a new price range 2394 may be generated (e.g., where an initial price range 2394 was not generated). For example, after the shape search option 2390a or diamond feature value has been modified, the portal 2306 may request a search of a database of diamond listings. The results of the search may provide a range of prices for diamonds having matching or nearly matching features to the modified set of values or search options 2390a-2390f, which may be displayed as the estimated price range 2394. Additionally or alternatively, the user may select the button 2395 "Show Modified Results," which may update the price range 2394 and/or generate a new set of diamond listings, as shown in FIG. 24.

In another example, a user may wish to obtain a price range 2394 and/or obtain additional diamond listings which have a higher or lower quality cut. As shown in FIG. 23, the initial diamond listing 2378 has a diamond cut quality of "Very Good." The user may want to increase the cut quality to one of the selectable options 2390b (e.g., "Good," "Excellent," or "Super Ideal"). Selecting one of the selectable options 2390b may automatically generate a new or updated estimated price range 2394. Alternatively, the user may select the button 2395 "Show Modified Results," which may update the price range 2394 and/or generate a new set of diamond listings, as shown in FIG. 24.

In other examples, the user may modify the values associated with different diamond features or search categories 2388b-2388f. Some of these values, such as cut, may be graded on a scale. A search based on the modified values or options 2390a-2390f selected through the user interface 2376 may include only items which match the selected modified values or options 2390a-2390f. However, because the diamond feature is graded on a scale, it may be understood (or the user may input as a further option) that similar values along the grade would be acceptable as well. Accordingly, the diamond selection system may also include similar grades of diamonds in the results list. For example, a user may modify the cut option 2390b from "Very Good" to "Excellent," and the diamond selection system may include very good and/or ideal cut diamonds as well in the search results.

In some embodiments, the user interface 2376 may also include one or more buttons 2395, 2396, 2397 to perform additional operations. For example, a "Show Modified Results" button 2395 may cause the user interface 2376 to display a set of diamond listings matching or nearly matching the modified search parameters (e.g., the values associated with the initial diamond listing 2378 and any modified values). This may generate search results to be displayed in a list or set of diamond listings, as shown in FIG. 24 or in a manner similar to the examples described above with respect to FIGS. 16A-18 and 20-22. Similar to the examples described with respect to FIGS. 14-22, a user may also be able to rank diamond features in an order to indicate a preferred order of search results, whether before requesting the set of listings, once the set of listings has been displayed, or both.

In some embodiments, the user interface 2376 may also include an option to save 2396 search parameters. Search parameters may be saved to a user profile, temporarily saved within a session, or otherwise stored for later retrieval. The saved search parameters may be stored and recalled during a subsequent session or later on during the same session.

The user interface 2376 may further include an option to clear the search 2397. Selecting the clear search button 2397 may clear some or all of the search parameters entered or selected by the user. In some cases, the clear search button 2397 returns each search category 2388a-2388f to the values corresponding to the initial diamond listing 2378 (e.g., the values represented by the indicia 2392a-2392f). In some embodiments, the clear search button 2397 may clear all prior search data associated with the user and/or return to another search function (e.g., the user interface depicted in FIG. 14).

FIG. 24 depicts an example search result that may be generated using the user interface 2376 of FIG. 23. As shown in FIG. 24, a user interface 2400 may be presented that includes a set of diamond listings that satisfies the modified criteria generated using the user interface 2376 of FIG. 23. In particular, the set of diamond listings has characteristics 2402 that match or correlate to the modified characteristics generated using the user interface 2376 of FIG. 23. As shown in FIG. 24, the set of diamond listings includes the modified cut option 2404 (which may have been changed from "Very Good" (or "VG") to "Ideal" (or "ID"). Also, as shown in FIG. 24, the prices 2406 correspond to or correlate with the updated price range 2394 of FIG. 23.

Similar to the other examples described above with respect to FIGS. 16A-22, the user can select one or more of the diamond listings to obtain more information, to find diamonds like the selected diamond, or perform other functions described above. Additionally, the user may select one of the diamond listings and then return to the user interface 2376 of FIG. 23 to then further manipulate the preferred criteria or characteristics of the desired diamond, and initiate another search similar to that described above with respect to FIG. 23.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

In particular, while the above examples are described with respect to a system for searching for diamonds, this disclosure is not limited to diamonds alone, but can also be extended to systems which incorporate other gemstones (e.g., precious gems). Typically, a search system according to the present disclosure will search for gemstones having features which similarly have varying qualities, such as the quality of cut, the clarity of the gemstone, the size and/or weight of the gemstone, and similar features. Examples may include, but are not limited to, beryl gems (e.g., emerald and aquamarine), amethyst, quartz, corundum (e.g., sapphire and ruby), alexandrite, zircon, and so on. Further, this disclosure can be extended to systems which incorporate other jewelry items, including settings, rings, pendants, bracelets, necklaces, earrings, and the like. The systems and techniques described herein may also be applied to other articles for purchase including various retail items and other goods offered for sale that have a variety of characteristics or qualities that may be searched and selected in accordance with the embodiments described herein.

What is claimed is:

1. A computer-implemented method for automatically determining search parameters for a jewelry selection system having an interactive search interface, the computer-implemented method performed using one or more processors of a computer system, the computer-implemented method comprising:
   causing display of, on a personal mobile device, a user interface for selecting a jewelry product;
   receiving, via the user interface, a username for an account of a user of a social media network, the account associated with an image set accessible using the username;
   in response to authenticating the account using the username, performing computer vision object recognition to determine a set of user classification labels associated with the image set;
   determining a set of predicted jewelry attributes by providing the set of user classification labels to a predictive model;
   determining search parameters for the interactive search interface based on the set of predicted jewelry attributes; and
   causing display of a jewelry listing based on the search parameters.

2. The method of claim 1, wherein determining the set of predicted jewelry attributes comprises determining a matching group of training data sets by determining a measure of similarity between the set of user classification labels and classification labels of one or more training data sets stored by the jewelry selection system.

3. The method of claim 2, wherein determining the set of predicted jewelry attributes comprises determining at least one of a probability distribution or a mathematical average of a jewelry attribute among multiple training data sets of the matching group of training data sets.

4. The method of claim 1, wherein the search parameters comprise a diamond shape and one or more search categories, each search category corresponding to a diamond feature graded along a scale.

5. The method of claim 1, further comprising:
   determining, based on the search parameters, a set of jewelry listings for presentation in the user interface;
   determining a presentation order of a set of jewelry listings based on the search parameters; and
   displaying at least a portion of the set of jewelry listings in the user interface.

6. The method of claim 5, wherein:
   the set of jewelry listings is a first set of jewelry listings; and
   the presentation order is a first presentation order; and
   the method further comprises:
   receiving a user input indicating a preference regarding a listing of the first set of jewelry listings;
   updating the search parameters based on the preference;
   determining a second set of jewelry listings based on the updated search parameters; and
   determining a second presentation order for the second set based on the updated search parameters.

* * * * *